(12) United States Patent
Jenkins

(10) Patent No.: US 12,709,877 B2
(45) Date of Patent: Aug. 18, 2026

(54) LIQUID CONTROL APPARATUS AND RELATED METHODS

(71) Applicant: Delta Faucet Company, Indianapolis, IN (US)

(72) Inventor: Andrew Geoffrey Jenkins, Wellington (NZ)

(73) Assignee: Delta Faucet Company, Indianapolis, IN (US)

(*) Notice: Subject to any disclaimer, the term of this patent is extended or adjusted under 35 U.S.C. 154(b) by 0 days.

(21) Appl. No.: 19/095,887

(22) Filed: Mar. 31, 2025

(65) Prior Publication Data

US 2025/0223786 A1 Jul. 10, 2025

Related U.S. Application Data

(63) Continuation of application No. 17/266,569, filed as application No. PCT/IB2019/056705 on Aug. 7, 2019, now Pat. No. 12,264,462.

(30) Foreign Application Priority Data

Aug. 7, 2018 (AU) ................................ 2018902862
Jun. 12, 2019 (AU) ................................ 2019902038

(51) Int. Cl.
*E03B 7/07* (2006.01)
*A23L 2/54* (2006.01)
(Continued)

(52) U.S. Cl.
CPC ................ *E03B 7/072* (2013.01); *A23L 2/54* (2013.01); *B01F 23/2363* (2022.01);
(Continued)

(58) Field of Classification Search
CPC . E03B 7/072; E03B 7/074; A23L 2/54; B67D 1/0855; B67D 1/0888;
(Continued)

(56) References Cited

U.S. PATENT DOCUMENTS 3,192,952 A 7/1965 Botnik
4,515,692 A 5/1985 Chandler et al.
(Continued)

FOREIGN PATENT DOCUMENTS

CN 212273129 U 1/2021
EP 2845957 A1 3/2015
(Continued)

OTHER PUBLICATIONS

Home Depot, Hot Water Tank and Filtration System for Hot Water Dispensers, retrieved on Jun. 10, 2021 from https://www.homedepot.com/p/InSinkErator-Hot-Water-Tank-and-Filtration-System-for-Hot-Water-Dispensers-HWT-F1000S/204400247, 9 pages.
(Continued)

*Primary Examiner* — Kelsey E Cary
(74) *Attorney, Agent, or Firm* — Bose McKinney & Evans LLP

(57) ABSTRACT

Apparatuses and methods for liquid control are provided. A liquid control apparatus may be for selectively treating and/or substituting a liquid flow from at least one of a plurality of supply lines. The ultimate liquid flow is for dispensing to a user by way of a liquid supply fixture such as a tap. The apparatus comprises a liquid conditioning module for connection in-line with at least one of the plurality of supply lines. The liquid conditioning module receives a diverted liquid flow of the at least one supply line from an upstream portion of the supply line. It then outputs a selectively treated and/or substituted liquid flow for returning to a downstream portion of the supply line for dispensing to the user. The apparatus has at least one flow sensor, each flow sensor associated with one of the plurality of supply lines. It has a controller, the controller configured to receive information indicative of the liquid flow of at least one of the plurality of supply lines from the at least one flow sensor.
(Continued)

The controller, upon the occurrence of a predetermined flow characteristic, is operable to activate the liquid conditioning module to treat and/or substitute the liquid flow from one or more of the liquid conditioning module connected supply lines in order to provide a treated and/or substituted liquid flow at the liquid supply fixture.

19 Claims, 28 Drawing Sheets

(51) Int. Cl.

| | |
|---|---|
| ***B01F 23/236*** | (2022.01) |
| ***B01F 25/313*** | (2022.01) |
| ***B01F 25/421*** | (2022.01) |
| ***B01F 25/4314*** | (2022.01) |
| ***B67D 1/00*** | (2006.01) |
| ***B67D 1/08*** | (2006.01) |
| ***B67D 1/12*** | (2006.01) |
| ***E03C 1/02*** | (2006.01) |
| *B01F 23/231* | (2022.01) |
| *B01F 101/14* | (2022.01) |

(52) U.S. Cl.
CPC ...... *B01F 25/3131* (2022.01); *B01F 25/4231* (2022.01); *B01F 25/43141* (2022.01); *B67D 1/008* (2013.01); *B67D 1/0855* (2013.01); *B67D 1/0857* (2013.01); *B67D 1/0888* (2013.01); *B67D 1/0895* (2013.01); *B67D 1/1202* (2013.01); *E03B 7/074* (2013.01); *E03C 1/02* (2013.01); *A23V 2002/00* (2013.01); *B01F 23/231121* (2022.01); *B01F 23/231265* (2022.01); *B01F 2101/14* (2022.01); *B67D 2210/0001* (2013.01); *B67D 2210/00118* (2013.01); *E03C 2201/40* (2013.01)

(58) Field of Classification Search
CPC ..... B67D 1/1202; E03C 1/02; E03C 2201/40; E03C 2201/45; A23V 2202/00
See application file for complete search history.

(56) References Cited

U.S. PATENT DOCUMENTS

| | | | |
|---|---|---|---|
| 4,698,860 | A | 10/1987 | Hafner |
| 4,918,426 | A | 4/1990 | Butts et al. |
| 5,057,214 | A | 10/1991 | Morris |
| 5,173,178 | A | 12/1992 | Kawashima |
| 5,545,322 | A | 8/1996 | Cheng |
| 5,915,851 | A | 6/1999 | Wattrick et al. |
| 6,058,971 | A | 5/2000 | Palmer |
| 6,065,694 | A | 5/2000 | D'alayer |
| 7,303,666 | B1 | 12/2007 | Mitsis |
| 7,753,074 | B2 | 7/2010 | Rosko et al. |
| 8,307,851 | B2 | 11/2012 | Warsowe |
| 8,469,054 | B2 | 6/2013 | Lang et al. |
| 8,479,771 | B2 | 7/2013 | Campbell et al. |
| 8,939,429 | B2 | 1/2015 | Sawaski et al. |
| RE45,373 | E | 2/2015 | Allen, Jr. |
| 8,968,568 | B2 | 3/2015 | Armour |
| 9,243,391 | B2 | 1/2016 | Jonte et al. |
| 9,328,485 | B2 | 5/2016 | Shaffer |
| 9,409,758 | B2 | 8/2016 | McHale |
| 9,528,249 | B2 | 12/2016 | Gompper |
| 9,739,039 | B2 | 8/2017 | Chang |
| 9,926,688 | B2 | 3/2018 | Tuin |
| 10,081,932 | B2 | 9/2018 | Seggio et al. |
| 10,183,871 | B2 | 1/2019 | Ye |
| 10,227,758 | B2 | 3/2019 | Tang et al. |
| 10,227,760 | B2 | 3/2019 | Horwitz et al. |
| 10,267,022 | B2 | 4/2019 | Veros et al. |
| 10,450,203 | B2 | 10/2019 | Schuster |
| 10,471,375 | B1 | 11/2019 | Zerban |
| 10,472,252 | B2 | 11/2019 | Schuster |
| 10,640,393 | B2 | 5/2020 | Cobb et al. |
| 10,675,573 | B2 | 6/2020 | Miller et al. |
| 10,767,354 | B2 | 9/2020 | Tracy |
| 10,830,493 | B2 | 11/2020 | Jeon et al. |
| 10,894,727 | B2 | 1/2021 | Yu et al. |
| 10,947,138 | B2 | 3/2021 | Rosko |
| 10,982,419 | B2 | 4/2021 | Baker et al. |
| 11,001,509 | B2 | 5/2021 | Schuster |
| 11,136,751 | B2 | 10/2021 | Frackelton |
| 11,352,772 | B2 | 6/2022 | Ye |
| 11,549,243 | B2 | 1/2023 | Jeong et al. |
| 11,549,244 | B2 | 1/2023 | Alteon |
| 11,571,642 | B2 | 2/2023 | Sandahi |
| 11,662,753 | B2 | 5/2023 | Birchfield et al. |
| 11,702,329 | B2 | 7/2023 | Funke |
| 11,739,510 | B2 | 8/2023 | Gibson |
| 11,753,293 | B2 | 9/2023 | Torak et al. |
| 11,760,619 | B2 | 9/2023 | Mills et al. |
| 11,772,952 | B2 | 10/2023 | Dahan |
| 11,886,208 | B2 | 1/2024 | Rodenbeck et al. |
| 11,952,758 | B2 | 4/2024 | Zhou et al. |
| 12,061,489 | B2 | 8/2024 | Hobbs et al. |
| 12,116,758 | B2 | 10/2024 | Pitsch et al. |
| 2005/0092665 | A1 | 5/2005 | Kirchner |
| 2014/0352799 | A1 | 12/2014 | Rosko |
| 2016/0040405 | A1 | 2/2016 | Talsma |
| 2017/0327386 | A1 | 11/2017 | Chen et al. |
| 2018/0085723 | A1 | 3/2018 | Perkins |
| 2018/0186655 | A1 | 7/2018 | Cobb |
| 2019/0010061 | A1 | 1/2019 | Mayer |
| 2019/0016608 | A1 | 1/2019 | Chen et al. |
| 2020/0167717 | A1 | 5/2020 | Anderson |
| 2020/0299941 | A1 | 9/2020 | Veros et al. |
| 2020/0326734 | A1 | 10/2020 | Rodenbeck |
| 2021/0236991 | A1 | 8/2021 | Schneidewend |
| 2021/0262207 | A1 | 8/2021 | Jenkins |
| 2021/0403305 | A1 | 12/2021 | Wu |
| 2022/0121228 | A1 | 4/2022 | Hobbs et al. |
| 2022/0145601 | A1 | 5/2022 | McAlpine |
| 2022/0178122 | A1 | 6/2022 | Grybush et al. |
| 2022/0307245 | A1 | 9/2022 | Kinicki et al. |
| 2022/0324738 | A1 | 10/2022 | Kang |
| 2022/0396500 | A1 | 12/2022 | Bae |
| 2023/0064960 | A1 | 3/2023 | Chen et al. |
| 2023/0134260 | A1 | 5/2023 | Funke et al. |
| 2023/0139384 | A1 | 5/2023 | Funke et al. |
| 2023/0160187 | A1 | 5/2023 | Wawrla |
| 2023/0257249 | A1 | 8/2023 | Dahan |
| 2023/0304272 | A1 | 9/2023 | Lance et al. |
| 2023/0340765 | A1 | 10/2023 | Dahan |
| 2023/0357052 | A1 | 11/2023 | Park |
| 2023/0358333 | A1 | 11/2023 | Groning |
| 2023/0366182 | A1 | 11/2023 | Scheffer |
| 2024/0017981 | A1 | 1/2024 | Johann |
| 2024/0026664 | A1 | 1/2024 | Tack et al. |
| 2024/0083771 | A1 | 3/2024 | Meier et al. |

FOREIGN PATENT DOCUMENTS

| | | |
|---|---|---|
| WO | WO 2017/135429 | 8/2017 |
| WO | WO 2018/131028 | 7/2018 |
| WO | WO 2019/147023 | 8/2019 |
| WO | WO 2019/172531 | 9/2019 |
| WO | WO 2020/162153 | 8/2020 |
| WO | WO 2020/165004 | 8/2020 |
| WO | WO 2020/167717 | 8/2020 |
| WO | WO 2021/213943 | 10/2021 |
| WO | WO 2022/106283 | 5/2022 |
| WO | WO 2022/173889 | 8/2022 |
| WO | WO 2022/232872 | 11/2022 |
| WO | WO 2022/233746 | 11/2022 |
| WO | WO 2023/043905 | 3/2023 |
| WO | WO 2023/180470 | 9/2023 |
| WO | WO 2023/194498 | 10/2023 |
| WO | WO 2023/233318 | 12/2023 |

(56) References Cited

FOREIGN PATENT DOCUMENTS

| | | |
|---|---|---|
| WO | WO 2023/249951 | 12/2023 |
| WO | WO 2024/011624 | 1/2024 |
| WO | WO 2024/073045 | 4/2024 |

OTHER PUBLICATIONS

Home Depot, Strainer with Push Button Release Mechanism with Optional Brushed Nickel or Chrome Buttons, retrieved on Jun. 10, 2021 from https://www.homedepot.com/p/Glacier-Bay-Strainer-with-Push-Button-Release-Mechanism-with-Optional-Brushed-Nickel-or-Chrome-Buttons-7043-207SS/207144317, 8 pages.

Culligan, Clearlink Pro Home Under Sink Water Filter Wireless Accessory, retrieved on May 28, 2021 from https://www.culligan.com/product/clearlink-pro-home-under-sink-water-filter-wireless-accessory, 9 pages.

The Home Depot, Under Sink Dual Flow Water Filtration System, retrieved on May 28, 2021 from https://www.homedepot.com/p/GE-Under-Sink-Dual-Flow-Water-Filtration-System-GXK285JBL/206501304, 10 pages.

4
70
69,72

4
73
70
61
63

4
73
70
63
69,72

4
70
63

4
70
73
69,72

4
73
70
69
69,72

4
73
61
70
74

4
70
74
69,72

4
73
61
70
69,72
65,67
75

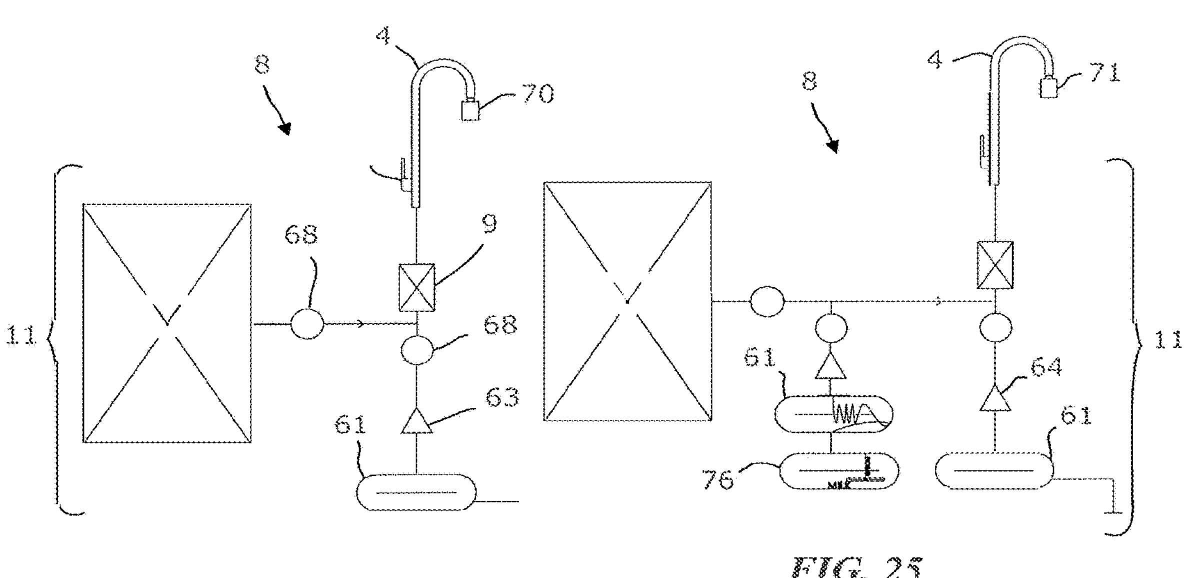
FIG. 24
FIG. 25
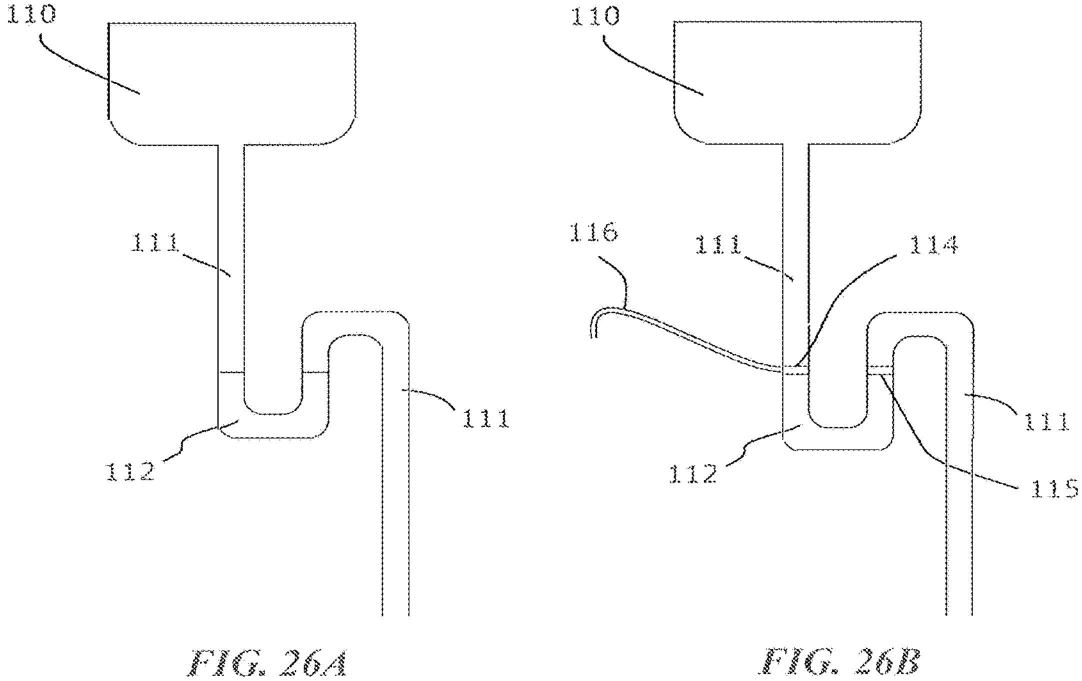
FIG. 26A
FIG. 26B 8
4
99
5
11

1
2
8
4
99
5
11

1
2

8
4
3
5
11

1
2
103
104
4
8
105
3
5
11

1
2

8
4
103
11
106
5

1
2
8
4
11
106
5

1
2

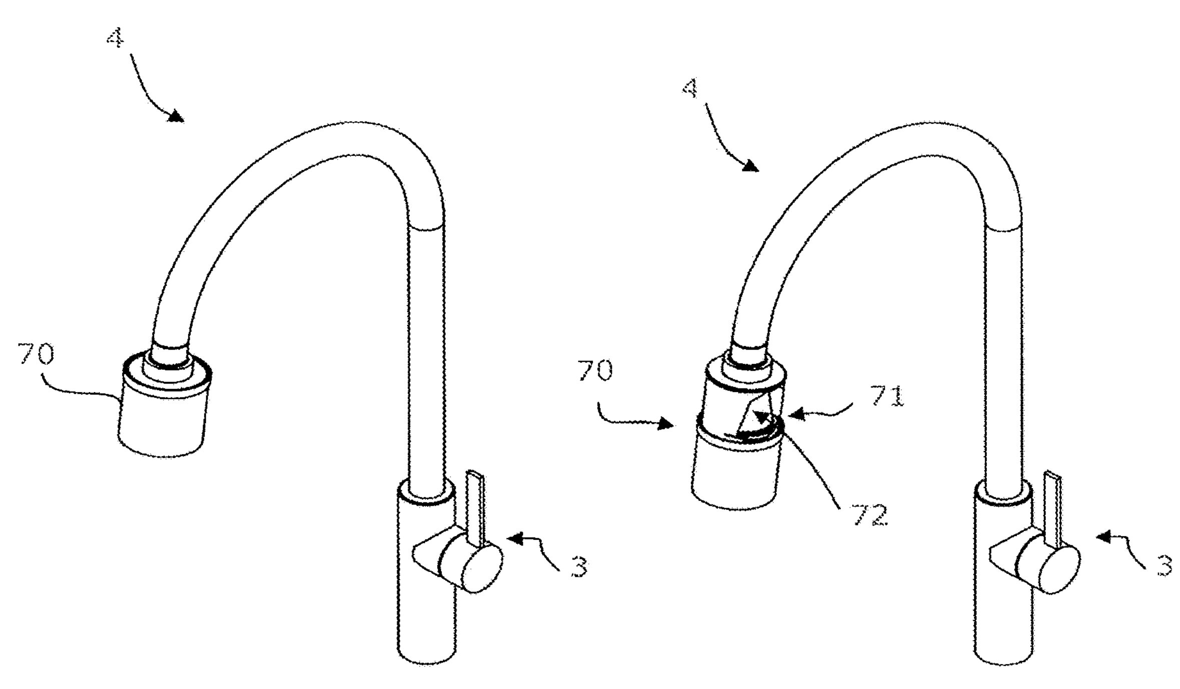
FIG. 29A
FIG. 29B
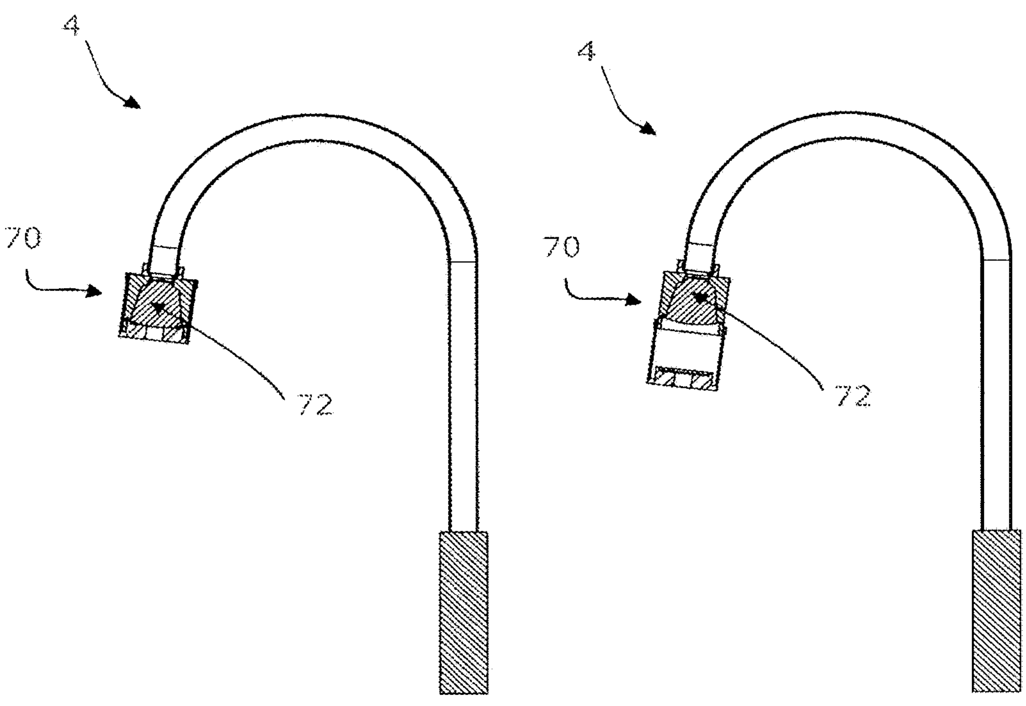
FIG. 30A
FIG. 30B 120
123
121

122
120
121

124
120
123
121

125
124
122

LIQUID CONTROL APPARATUS AND RELATED METHODS

CROSS-REFERENCE TO RELATED APPLICATION

This application is a continuation of U.S. patent application Ser. No. 17/266,569, filed Feb. 5, 2021, which is a U.S. national stage entry of International Patent Application No. PCT/IB2019/056705, filed Aug. 7, 2019, which claims priority to Australian Patent Application No. 2018902862, filed Aug. 7, 2018 and Australian Patent Application No. 2019902038, filed Jun. 12, 2019, the entire contents of each of which are incorporated by reference herein.

FIELD OF THE INVENTION

The present invention relates to apparatuses and methods for liquid control, and more particularly but not solely to an apparatus and method for inline connection with the fluid inlet lines of a fluid supply fixture for modifying the fluid supplies.

Since ancient times, civilizations have sought to deliver water supplies to their people. Over millennia from the Roman aqueducts to the public waterworks of the Industrial Revolution, public water supply systems have become commonplace throughout the developed and developing world.

Domestic and industrial water supplies are often dispensed from outlets or fixtures such as taps or a mixer for a user to consume. In addition to providing fresh water, many outlets provide hot water.

While these developments have provided widespread convenience and improvements in living standards, consumers have continued to demand other types of liquid to be delivered to them. For example, in many workplaces it is common in addition to a hot and cold water faucet to have hot water boilers for providing boiling water. Or, many domestic or workplace kitchens also have separate outlets for providing filtered or chilled water supplies.

In addition to these, carbonated water supplies are also becoming increasingly popular. A wide range of products exist for use by consumers to carbonate quantities of fresh water. These may also introduce flavouring to the water. In commercial settings such as cafes specific carbonated water outlets may be provided, which take an inlet of fresh water and carbonate it for dispensing.

In alternative to treatments of supplied fresh water, there is also consumer demand for convenient dispensing of other liquid types. For example, a keg of beer or cask of wine may be plumbed in to a tapware fixture for dispensing to a user.

These plethora of possible liquids to be dispensed provide a wide degree of potential choice to a user, but kitchens or other dispensing locations are often practically limited by the number of faucets which may be installed. Additionally, the installation of faucets and the associated plumbing and hardware is costly and does not lend itself to being response to trends in consumer demand.

It is an object of the present invention to provide a liquid control apparatus or related apparatus and methods which overcome or at least partially ameliorates at least one or more of the abovementioned disadvantages, or which at least provides the public with a useful choice.

Additionally or alternately, it is an object of the present invention to provide a liquid control apparatus for inline location on the hot and cold water supply lines of water supply fixture or set of fixtures to selectively modify the flow from either or both of the hot or cold water supply lines in response to flow or flow changes sensed on at least one of the hot and cold water supply lines.

Additionally or alternately, it is an object of the present invention to provide a consumable for unitary use with a liquid supply apparatus, the consumable to provide both a material or substance for use by the liquid control apparatus in selectively modifying a ducted flow of liquid and a battery power source for supplying electrical power to the liquid control apparatus.

Additionally or alternately, it is an object of the present invention to provide a chamber for use in the modifying of a ducted flow of liquid delivered from a liquid source, by the dissolution of a gas into the liquid.

Additionally or alternately, it is an object of the present invention to provide a method of modifying the ducted flow of liquid from at least two liquid sources.

For the purpose of this specification, where method steps are described in sequence, the sequence does not necessarily mean that the steps are to be chronologically ordered in that sequence, unless there is no other logical manner of interpreting the sequence.

Additional features and advantages of the present invention will become apparent to those skilled in the art upon consideration of the following detailed description of illustrative embodiments exemplifying the best mode of carrying out the invention as presently perceived.

SUMMARY OF THE INVENTION

In a first aspect, the present invention may broadly relate to a liquid control apparatus for selectively treating and/or substituting a liquid flow from at least one of one or more supply lines to an outlet to a user by way of a liquid supply fixture, the apparatus comprising an assembly for connection in-line with at least one of the one or more supply lines, the assembly comprising an inlet and an outlet associated with each at least one supply line and a fluid connection between each inlet and its respective outlet to allow liquid to be passed from an upstream portion of the supply line to a downstream portion of the supply line for outletting to the user by the liquid supply fixture, the liquid control apparatus configured, responsive to an input, to provide a treated and/or substituted liquid flow at the liquid supply fixture.

In a further aspect, the invention may broadly relate to a liquid control apparatus for selectively treating and/or substituting a liquid flow from at least one of one or more supply lines to an outlet to a user by way of a liquid supply fixture, the apparatus selectively treating and/or substituting the liquid flow responsive to one or more sensed flows or one or more changes of flow in the one or more supply lines.

In a further aspect, the invention may broadly relate to a liquid modification device, the device for diverting a liquid flow from a liquid source for modification then return to a relatively downstream portion of the liquid source for delivery to a liquid supply fixture.

In a further aspect, the invention may broadly relate to a liquid control apparatus for interdiction of a liquid source at a liquid supply line, the liquid control apparatus operable to provide a selective modification of a liquid from the liquid source and then to return the modified liquid to a relatively downstream portion of the liquid supply line.

In a further aspect, the invention may broadly relate to a liquid control apparatus for selectively treating and/or substituting the liquid flow of either or both of a domestic cold water supply line and a domestic hot water supply line, the treatment and/or substitution being responsive at least in part to a sensed flow characteristic of liquid flow in one or both of the cold water supply line and the hot water supply line.

In a further aspect, the invention may broadly relate to an expansion kit for the brewing of a beverage, the expansion kit for use with a liquid supply fixture and associated liquid control apparatus, the expansion kit comprising an expansion module for association with a liquid conditioning module of the liquid control apparatus and having a heater and a pump, and an attachment for connection to an outlet of the liquid supply fixture, the attachment for retaining one or more consumables to be used in at least a final stage of a brewing of a beverage.

In a further aspect, the invention may broadly relate to a method of providing a selective treatment and/or substitution of a liquid flow from at least one liquid source, the method comprising the step of providing a predetermined treatment and/or substitution responsive to the sensing of an associated predetermined flow characteristic of a flow of at least one of the at least one liquid sources.

In a further aspect, the invention may broadly relate to an in-line drain connection for providing a secondary waste connection to a drainage system having a p-trap, the in-line drain connection comprising two parts for installation at either end of the p-trap between the p-trap and the adjacent drain line parts, where at least one of the two parts comprises waste inlet for providing the secondary waste connection to the drainage system.

In a further aspect, the present invention may be said to broadly consist in a liquid control apparatus for selectively modifying ducted flow of liquid delivered from at least two liquid sources to one liquid supply outlet or respective liquid supply outlets, the apparatus comprising a flow controller able to receive the at least two ducted flows as at least two flow controller input streams and independently control the flow rate of the at least two ducted flows through the flow controller for ducted output from the flow controller to (a) one liquid supply outlet or respective liquid supply outlets where the flow from the at least two liquid sources is mixed at or downstream of the flow controller and upstream of the one liquid outlet or (b) to respective said liquid supply outlets (e.g., for mixing after the outlets), a flow sensor for each of said at least two ducted flows (preferably upstream of said flow controller) a flow modifier, upstream of said flow sensors and downstream of said at least two liquid sources, the flow modifier able to (a) receive said at least two ducted flows as at least two flow modifier input streams from said at least two liquid sources, and
(b) selectively modify at least one said flow modifier input stream dependent on flow sensed at each said flow sensor, and
(c) output each said at least two flow modifier input streams for delivery as said flow controller input streams to said flow controller.

Preferably the selective modification comprises an in-line modification of said at least one flow modifier input stream.

Preferably the flow modifier comprises at least one set of a direct flow path and a diverted flow path, such that at least one flow modifier input stream is able to be diverted from the direct flow path to the diverted flow path in order to selectively modify the at least one flow modifier input stream.

Preferably each at least one set of direct flow path and diverted flow path comprise a valve for diverting the associated flow modifier input stream between the direct flow path and the diverted flow path.

Preferably the valve is controlled dependent on flow sensed at each said flow sensor.

Preferably the valve defaults to passing flow through the direct flow path.

Preferably the flow modifier selectively modifies at least one said flow modifier input stream dependent on a predetermined flow characteristic of the flow sensors of each of the at least two ducted flows.

Preferably the selective modification of the at least one flow modifier input streams by the flow modifier may be ceased dependent on flow sensed at each said flow sensor.

Preferably the selective modification may be ceased dependent on a ceasing of flow sensed at each said flow sensor.

Preferably the selective modification may be ceased dependent on a predetermined flow characteristic of each of the at least two ducted flows.

Preferably the predetermined flow characteristic of the flow sensors comprises a fluctuation of flow.

Preferably the predetermined flow characteristic of the flow sensors comprises a fluctuation of flow by the flow sensor of a first of the at least two ducted flows.

Preferably the predetermined flow characteristic of the flow sensors comprises a fluctuation of flow by the flow sensor of the first of the at least two ducted flows and a substantially constant flow by the flow sensor of a second of the at least two ducted flows.

Preferably the predetermined flow characteristic of the flow sensors comprises a fluctuation of flow by the flow sensor of the first of the at least two ducted flows and a substantially constant flow by the flow sensors of each of the other at least two ducted flows.

Preferably the predetermined flow characteristic of the flow sensors comprises a fluctuation of flow by the flow sensors of two or more of the at least two ducted flows.

Preferably the fluctuation of flow comprises a change between a first flow threshold and a second flow threshold.

Preferably the first flow threshold is
a) a zero or substantially zero flow, or
b) a full or substantially full flow, and the second flow threshold is the other of (a) or (b).

Preferably the fluctuation between the first flow threshold and second flow threshold occurs within a predetermined time limit.

Preferably the predetermined time limit is less than 5 seconds.

Preferably the predetermined time limit is less than 2.5 seconds.

Preferably the predetermined time limit is less than 1 second.

Preferably the fluctuation of flow comprises a pattern of fluctuations.

Preferably the pattern of fluctuations comprises a plurality of changes between a first flow threshold and a second flow threshold.

Preferably the first flow threshold is
a) a zero or substantially zero flow, or
b) a full or substantially full flow, and the second flow threshold is the other of (a) or (b).

Preferably the pattern of fluctuations occur within a predetermined time limit.

Preferably the predetermined time limit is less than 5 seconds.

Preferably the predetermined time limit is less than 2.5 seconds.

Preferably the predetermined time limit is less than 1 second.

Preferably more than one said flow modifier input stream is able to be selectively modified by the flow modifier.

Preferably a first flow modifier input stream is able to be selectively modified dependent on a first predetermined flow characteristic of flow sensed at each said flow sensor, and a second flow modifier input stream is able to be selectively modified dependent on a second predetermined flow characteristic of flow sensed at each said flow sensor.

Preferably the each of the first predetermined flow characteristic and second predetermined flow characteristic comprise a fluctuation of flow by the flow sensors of at least one of the at least two ducted flows.

Preferably the each of the first predetermined flow characteristic and second predetermined flow characteristic comprise a fluctuation of flow by the flow sensors of at least two of the at least two ducted flows.

Preferably the each of the first predetermined flow characteristic and second predetermined flow characteristic comprise a fluctuation of flow by the flow sensors of each of the at least two ducted flows.

Preferably the fluctuation of flow comprises a change between a first flow threshold and a second flow threshold.

Preferably the first flow threshold is a) a zero or substantially zero flow, or b) a full or substantially full flow, and the second flow threshold is the other of (a) or (b).

Preferably the fluctuation between the first flow threshold and second flow threshold occurs within a predetermined time limit.

Preferably the predetermined time limit is less than 5 seconds.

Preferably the predetermined time limit is less than 2.5 seconds.

Preferably the predetermined time limit is less than 1 second.

Preferably for either the first predetermined flow characteristic or the second predetermined flow characteristic, any of the at least two ducted flows not comprising a fluctuation of flow comprise a substantially constant flow.

Preferably a substantially constant flow may be a zero flow.

Preferably the fluctuation of flow comprises a pattern of fluctuations.

Preferably the pattern of fluctuations comprises a plurality of changes between a first flow threshold and a second flow threshold.

Preferably the first flow threshold is a) a zero or substantially zero flow, or b) a full or substantially full flow, and the second flow threshold is the other of (a) or (b).

Preferably the pattern of fluctuations occur within a predetermined time limit.

Preferably each of the fluctuations of the pattern of fluctuations occur within a predetermined time limit.

Preferably the predetermined time limit is less than 5 seconds.

Preferably the predetermined time limit is less than 2.5 seconds.

Preferably the predetermined time limit is less than 1 second.

Preferably flow sensed comprises a flow rate.

Preferably flow rate is either a) indicative of the presence or absence of a flow, or b) is a volumetric flow rate.

Preferably when the flow modifier selectively modifies at least one flow modifier input stream dependent on flow sensed at each said flow sensor to provide for at least one of a) carbonation, b) ozonation, c) nitrogenation, d) filtration, e) heating, f) chilling, or g) replacement of at least one of the at least two flow modifier input streams.

Preferably the flow modifier selectively modifies more than one of the at least two flow modifier input streams, each with a different one or combination of (a) to (g).

Preferably the flow modifier is capable of providing more than one selective modification to at least one of the at least two flow modifier input streams.

Preferably the replacement of at least one of the at least two flow modifier input streams comprises a replacement of the associated liquid source with an alternative liquid source.

Preferably the liquid control apparatus is programmable such that the predetermined flow characteristic may be programmed by a user.

Preferably the at least two liquid sources each carry a pressurized liquid.

Preferably there are two liquid sources, comprising a cold water source and a hot water source.

Preferably the flow controller comprises a plumbing fixture or set of plumbing fixtures, such as a fixer faucet or an at least two taps, each tap associated with one of the at least two ducted flows.

Preferably the flow of liquid through the supply lines is caused by an operation of the liquid supply fixture by a user.

Preferably the flow modifier comprises one or more of a) a sand filtration unit, b) a carbon filtration unit, c) a membrane filtration unit, d) a reverse osmosis filtration unit, e) a water softener, f) a carbonator, g) a oxegeator, h) a nitrogenator, i) a pH conditioner, j) a flavourer, or k) a chiller unit.

Preferably the liquid control apparatus comprises at least one consumable for use in the flow modifier.

Preferably the at least one consumable comprises one or more of a) a sand filter for a sand filtration unit, b) a carbon filter for a carbon filtration unit, c) a membrane filter for a membrane filtration unit, d) a reverse osmosis filter, for a reverse osmosis filtration unit, e) a chemical supply for a water softener, f) a pressure vessel for a carbonator, g) a pressure vessel for a oxegeator, h) a pressure vessel for a nitrogenator, i) a supply of additive for a pH conditioner, or j) a supply of flavor for a flavourer, k) a supply of energy for the chiller unit.

Preferably the at least one consumable is removably attachable to the flow modifier.

Preferably the liquid control apparatus comprises a battery power supply, and the liquid control apparatus is powered solely by the battery power supply.

Preferably the liquid control apparatus is connectable to a mains power supply to provide electrical power to operate the liquid control apparatus.

Preferably the flow modifier comprises connection ports for connection to at least one flow modifier expansion unit to provide additional selective modification to the ducted flow of liquid delivered from the at least two liquid sources.

Preferably a flow modifier expansion unit comprises at least one of (a)-(k) of claim.

Preferably the flow modifier comprises an outlet to and inlet from each expansion port.

Preferably the flow modifier comprises only an inlet from an expansion port.

Preferably the expansion unit operates to selectively modify the liquid flow by either dosing a substance into the liquid flow of the flow modifier or by introducing a substitute liquid flow to the liquid modifier.

In another aspect, the present invention may be said to broadly consist in a consumable for use with a liquid control apparatus for selectively modifying ducted flow of liquid delivered from at least two liquid sources to one liquid supply outlet or respective liquid supply outlets, the consumable comprising as an assembly for unitary use with the liquid control apparatus, a supply housing for containing a material or substance for use by the liquid control apparatus in selectively modifying the ducted flow of liquid, a battery power source, and two externally presented electrical connectors of the battery power source to interface with the liquid control apparatus to provide an electrical power source to the liquid control apparatus.

Preferably at least two of the supply housing, battery power source, and electrical connectors are provided for use with the liquid supply unit as separate elements, but are assembled together for use with the liquid control apparatus.

Preferably the supply housing, battery power source, and electrical connectors are provided for use with the liquid supply unit as a single integral unit.

Preferably the liquid control module of the liquid control apparatus comprises corresponding electrical connectors to electrically interface with the electrical connectors of the consumable.

Preferably the supply housing comprises a pressure vessel for containing a pressurized fluid to be dispensed from the consumable to the liquid control apparatus for use in selectively modifying ducted flow of liquid.

Preferably the supply housing comprises a reservoir of additive or treatment liquid to be dispensed from the consumable to the liquid control apparatus for use in selectively modifying the ducted flow of liquid.

Preferably the supply housing comprises a filter for passing through of liquid in selectively modifying the ducted flow of liquid.

Preferably the supply housing is configured to fluidly couple with the liquid control apparatus for use in selectively modifying ducted flow of liquid, and the electrical connectors are configured to electrically connect with the liquid supply apparatus for providing electrical power to the liquid supply apparatus.

Preferably either fluidly coupling the supply housing or electrically connecting the electrical connectors to the liquid supply apparatus also results in the other of the fluid connection of the supply housing or electrical connection of the electrical connectors.

Preferably the supply housing comprises a fitting for fluidly coupling with the liquid control apparatus and the electrical connectors are concentrically spaced outwards of the port.

Preferably the supply housing comprises a substantially cylindrical pressure vessel and the fitting for fluidly coupling with the liquid control apparatus is aligned with an elongate axis of the pressure vessel.

Preferably the electrical connectors are provided on or project from an external surface of the substantially cylindrical pressure vessel.

Preferably one of the electrical connectors of the consumable or a corresponding interfacing portion of the liquid supply apparatus are of a substantially continuous circumferential form, such that the electrical connectors of the consumable and the corresponding interfacing portion of the liquid supply apparatus may be electrically connected at any rotational orientation of the pressure vessel about its elongate axis.

Preferably the electrical connectors of the consumable each comprise an electrical contact projecting radially beyond an outer surface of the pressure vessel and the corresponding interfacing portion of the liquid supply apparatus comprises two ring-shaped electrical connectors.

Preferably electrical power for the fluid control apparatus is provided solely by the consumable of as herein described.

Preferably the liquid control apparatus is a liquid control apparatus as claimed in any one of claims as herein described.

In another aspect, the present invention may be said to broadly consist in an apparatus comprising a chamber for use in the modifying a ducted flow of liquid delivered from a liquid source by the dissolution of a gas into the liquid, the chamber comprising, between an inlet for liquid from the liquid source and an outlet for liquid to a liquid supply outlet, a liquid flow path of greater length than a direct distance between the inlet and outlet, and disposed at least partly within the liquid flow path a gas diffuser comprising a gas inlet from a pressurized gas supply and a plurality of gas outlets to the liquid flow path.

Preferably discrete volumes of the liquid are modified by the apparatus.

Preferably for the modification of a discrete volume of liquid, the inlet for liquid and outlet for liquid are closed off following a substantial filling of the chamber with the ducted flow of liquid delivered from the liquid source.

Preferably following the modification of a discrete volume of liquid, the inlet for liquid and outlet for liquid are opened such that inlet liquid may purge volume of liquid to the liquid supply outlet.

Preferably upon a purging of a volume not greater than the discrete volume, the inlet for liquid and outlet for liquid are closed off to provide for the modification of a further discrete volume of liquid.

Preferably the apparatus comprises a plurality of chambers each configured to modify discrete volumes of liquid to, when modified, be suitable for dispensing to the liquid supply outlet.

Preferably the plurality of chambers cooperate in staged action of the modification of discrete volumes of liquid such that they may provide a continuous flow of modified liquid to the liquid supply outlet.

Preferably the ducted flow of liquid may be continuously modified by the apparatus by modification occurring concurrent with a) the outlet of liquid from the chamber to the liquid supply outlet and b) the inlet of liquid from the liquid source into the inlet for liquid of the chamber.

Preferably the liquid source is a mains water supply, and the supply pressure of the mains water supply alone forces liquid flow through the chamber and to the liquid supply outlet.

Preferably the liquid flow path comprises one or more baffles, the baffles configured to at least one of a) increase the length of the liquid flow path, and b) increase the turbulence of the flow through the liquid flow path.

Preferably the one or more baffles comprise at least one helical baffle to create a helical liquid flow path between the inlet for liquid and outlet for liquid of the chamber.

Preferably the diffuser comprises a longitudinal element and the at least one helical baffle extends at least in part around the diffuser.

Preferably the diffuser comprises a helical element, the helical element located within helical liquid flow path of the at least one helical baffle.

Preferably the one or more baffles comprise perforations to allow liquid flow there through and consequently to promote the turbulent flow and increase dissolution of the gas into the liquid flow.

Preferably the diffuser is a hollow fiber membrane.

Preferably the diffuser is a carbonation stone, and the pressurized source of gas is a pressurized source of carbon dioxide for carbonation.

Preferably apparatus is for use in the flow modifier of a liquid control apparatus as herein described.

In another aspect, the present invention may be said to broadly consist in a method of modifying the ducted flow of liquid from at least two sources of liquid delivered under pressure via a flow modifier that can modify the flow of liquid received from at least one said source, to at least one outlet, the method comprising, in response to at least one flow sensed downstream of a flow modifier operative on flow of liquid from at least one said sources of liquid downstream of the flow modifier, modifying the flow of liquid of at least one said source of liquid at said flow modifier.

Preferably the at least one flow sensed comprises a predetermined characteristic of flow rate and/or flow duration.

Preferably the ducted flow is modified in response to a flow sensed of the ducted flow of liquid from two of the at least two sources of liquid.

Preferably the ducted flow is modified in response to a flow sensed of the ducted flow of liquid from each of the at least two sources of liquid.

Preferably the predetermined characteristic comprises a characteristic of flow of each of the flow sensed ducted flows.

Preferably at least one characteristic of flow comprises a fluctuation of flow.

Preferably the fluctuation of flow comprises a change between a first flow threshold and a second flow threshold.

Preferably the first flow threshold is a) a zero or substantially zero flow, or b) a full or substantially full flow, and the second flow threshold is the other of (a) or (b).

Preferably the fluctuation between the first flow threshold and second flow threshold occurs within a predetermined time limit.

Preferably the fluctuation of flow comprises a pattern of fluctuations.

Preferably the pattern of fluctuations comprises a plurality of changes between a first flow threshold and a second flow threshold.

Preferably the first flow threshold is a) a zero or substantially zero flow, or b) a full or substantially full flow, and the second flow threshold is the other of (a) or (b).

Preferably the pattern of fluctuations comprise a simultaneous a) switching of flow of one ducted source at least once from a zero flow to a full flow, and b) a zero flow of at least one of the other ducted sources.

Preferably in (b) there is a simultaneous zero flow of each of the other at least two ducted sources.

Preferably the pattern of fluctuations comprise a simultaneous a) switching of flow of one ducted source at least once from a zero flow to a full flow and back to a zero flow, and b) a zero flow of at least one of the other ducted sources.

Preferably in (b) there is a simultaneous zero flow of each of the other at least two ducted sources.

Preferably the pattern of fluctuations occur within a predetermined time limit.

Preferably each of the fluctuations of the pattern of fluctuations occur within a predetermined time limit.

Preferably the predetermined time limit is less than 5 seconds.

Preferably the predetermined time limit is less than 2.5 seconds.

Preferably the predetermined time limit is less than 1 second.

Preferably flow sensed comprises one or more of flow rate.

Preferably the at least one flow sensed comprises flow rate and/or at least one flow duration.

Preferably flow rate is either a) indicative of the presence or absence of a flow, or b) is a volumetric flow rate.

In another aspect, the present invention may be said to broadly consist in an apparatus and method for fluid control, and more particularly but not solely to an apparatus and method for inline location in the fluid inlet lines of a fluid supply fixture for modifying the fluid supplies or providing alternate fluid supplies.

Preferably the fluid is a liquid.

In another aspect, the present invention may be said to broadly consist in a liquid control apparatus for selectively treating and/or substituting a liquid flow from at least one of a plurality of supply lines to a liquid supply fixture, the apparatus comprising an assembly for connection in-line with each of the plurality of supply lines, the assembly comprising an inlet and an outlet associated with each supply line and a fluid connection between each inlet and its respective outlet to allow liquid to be passed from the associated supply line to the liquid supply fixture, wherein one of the fluid connections comprises a liquid control module, a plurality of flow sensors, comprising a flow sensor associated with each one of the plurality of supply lines, and a controller, the controller configured a) to receive information from each of the plurality of flow sensors of the liquid flow on the supply line of the respective flow sensor, and b) upon the occurrence of a predetermined flow characteristic, to activate the liquid control module to treat and/or substitute the liquid flow from the liquid control module associated supply line in order to provide a treated and/or substituted liquid flow at the liquid supply fixture.

In another aspect, the present invention may be said to broadly consist in a liquid control apparatus for selectively treating and/or substituting a liquid flow from at least one of a plurality of supply lines, the liquid flow for dispensing to a user by way of a liquid supply fixture, the apparatus comprising a liquid conditioning module for connection in-line with at least one of the plurality of supply lines, the liquid conditioning module receiving a diverted liquid flow of the at least one supply line from an upstream portion of the supply line and outputting a selectively treated and/or substituted liquid flow for returning to a downstream portion of the supply line for dispensing to the user, at least one flow sensor, each flow sensor associated with one of the plurality of supply lines, and a controller, the controller configured a) to receive information indicative of the liquid flow of at least one of the plurality of supply lines from the at least one flow sensor, and b) upon the occurrence of a predetermined flow characteristic, to activate the liquid conditioning module to treat and/or substitute the liquid flow from one or more of the liquid conditioning module connected supply lines in order to provide a treated and/or substituted liquid flow at the liquid supply fixture.

Preferably the liquid conditioning module comprises a heater, the heater for heating either a) a tanked volume of liquid or b) a continuous flow of liquid.

Preferably the heater comprises a body to contain a heated volume of liquid, a primary inlet, and a primary outlet, and a heat exchanger located within the heater body and having a heat exchanger inlet and heat exchanger outlet, wherein both the primary outlet and heat exchanger outlet are in communication with the downstream portion of at least one of the plurality of supply lines.

Preferably the liquid conditioning module comprises first pump.

Preferably the first pump is to provide a high pressure and low flow rate of liquid, for example a pump having output flow rate of approximately 2 ml/s to approximately 10 ml/s and a pressure of approximately 5 bar to approximately 15 bar.

Preferably the liquid conditioning module comprises a second pump to provide a low pressure and a high flow rate of liquid, for example a pump having a flow rate of approximately 20 ml/2 to approximately 100 ml/s and a pressure of approximately 0.2 bar to approximately 4 bar Preferably the second pump is located upstream of the heater and pumps water to the heat exchanger inlet.

Preferably the first pump is located downstream of the primary outlet of the heater.

Preferably a first temperature sensor is associated with the heater and a second temperature sensor is associated with a downstream portion of the supply line between the liquid conditioning module and the point of dispensing to the user at the liquid supply fixture.

Preferably a pressure sensor is associated with the heater to sense a pressure within the body of the heater.

Preferably the liquid conditioning module comprises a pressure tank, either as part of the heater or as a separate component, the pressure tank to heat liquid and retain the liquid at least partially as tanked steam.

Preferably the pressure tank holds heated water at above 100 degrees Celsius.

Preferably the treated and/or substituted liquid flow from one or more of the plurality of liquid sources is further treated by a consumable at or after the liquid supply fixture before dispensing to the user.

Preferably the consumable comprises one or more of a) coffee grounds, b) tea leaves, or c) a syrup or flavouring.

Preferably the liquid control apparatus further comprising an attachment for retaining one or more consumables to be used in the further treatment of the liquid flow, the attachment in fluid connection with an outlet of the liquid supply fixture.

Preferably the consumable is provided within a pod or capsule and wherein the attachment comprises a mechanism operable to receive a pod or capsule, to pierce the pod or capsule, and to seal around an outside of the pod or capsule such that the liquid flow to be further treated may be passed through the piercings and through the pod or capsule before dispensing to the user.

Preferably the consumable is provided directly into a receptacle of the attachment, and the attachment is operable to seal about the receptacle such that the liquid flow may be passed through the consumable and through a screen of the receptacle before dispensing to the user.

Preferably the liquid flow is heated by the heater of the liquid conditioning module and the consumable comprises coffee grounds, such that the liquid control apparatus may be operated to dispense a brewed coffee beverage.

Preferably the one or more selected from a) a or the heater, b) a or the first pump, c) a or the second pump, and d) a or the pressure tank are provided as part of a separate expansion unit for connection to the liquid conditioning module. Preferably the liquid flow is diverted from the at least one supply line to the liquid control apparatus and returned to a downstream portion of the supply line for dispensing to the user by a diverter.

Preferably the diverting of the liquid flow of the at least one supply line to which is connected in-line comprises a selective diversion, such that the liquid flow may be selectively directed a) to the liquid conditioning module for subsequent passing to a downstream portion of the supply line for dispensing to a user, and/or b) directly to the downstream portion of the supply line for dispensing to a user.

Preferably the predetermined flow characteristic of the flow sensors comprises one or more, or one or more simultaneous or sequential combinations, either instantaneously or for a predetermined time period, of a) a constant flow of at least one flow sensor, including a constant substantially zero flow and a constant substantially maximum flow, b) a fluctuation of flow of at least one flow sensor, c) a pattern of fluctuations of flow of at least one sensor.

Preferably the predetermined flow characteristic comprises a simultaneous substantially zero flow sensed of a first liquid supply line and a plurality of fluctuations between a substantially zero flow, a substantially maximum flow, and a return to a substantially zero flow sensed of a second liquid supply line.

Preferably there are a plurality of predetermined flow characteristics, each predetermined flow characteristic comprising a different number of fluctuations between the substantially zero flow, substantially maximum flow, and return to the substantially zero flow of second liquid supply line.

Preferably each of the plurality of predetermined flow characteristics operates the liquid control apparatus to provide a different predetermined selective treatment and/or replacement of a liquid flow from at least one of the plurality of supply lines.

In a further aspect, the present invention may be said to broadly consist in a beverage brewing expansion kit comprising an expansion module comprising heater and a pump, and an attachment for retaining one or more consumables to be used in a further treatment of a liquid flow originating from the liquid conditioning module of a liquid control apparatus.

The beverage brewing expansion kit for use with the liquid control as described herein.

In a further aspect, the present invention may be said to broadly consist in a method of brewing a beverage using a liquid control apparatus, the liquid control apparatus for selectively treating and/or substituting a water flow from at least one of one or more supply lines to an outlet to a user by way of a water supply fixture, the method comprising the steps of a) sensing of a predetermined flow characteristic by one or more flow sensors each associated with the one or more supply lines,
b) activating a pump to prime a supply line and preferably the water supply fixture with a flow of heated water from the liquid control apparatus, and
c) activating a pump to force the heated water through a consumable contained within an attachment at an outlet of the water supply fixture.

Preferably step (c) utilises a first pump to provide a high pressure and low flow rate of liquid, for example a pump having output flow rate of approximately 2 ml/s to approximately 10 ml/s and a pressure of approximately 5 bar to approximately 15 bar.

Preferably step (b) utilises a second pump to provide a low pressure and a high flow rate of liquid, for example a pump having a flow rate of approximately 20 ml/2 to approximately 100 ml/s and a pressure of approximately 0.2 bar to approximately 4 bar.

Preferably the pump to prime the supply line is deactivated dependent on a second predetermined flow characteristic.

Preferably the pump to force the heated water through the consumable is deactivated dependent on a third predetermined flow characteristic.

Preferably the pump to force the heated water through the consumable is deactivated dependent once a predetermined volume of water has been pumped by the pump, preferably as sensed by the flow sensor or sensors associated with the supply lines.

Preferably at any point in the method upon the sensing of a fourth predetermined flow characteristic any pumping is ceased.

Preferably a pressure in the supply line is sensed, and if the sensed pressure decreases by a predetermined amount any pumping is ceased.

Preferably a or the predetermined flow characteristic is provided by an operation of the water supply fixture by the user.

The method as described herein, when practiced on the liquid control apparatus as described herein.

Preferably the predetermined flow characteristic of the flow sensors comprises one or more, or one or more simultaneous or sequential combinations, either instantaneously or for a predetermined time period, of a) a constant flow of at least one flow sensor, including a constant substantially zero flow and a constant substantially maximum flow,
b) a fluctuation of flow of at least one flow sensor,
c) a pattern of fluctuations of flow of at least one sensor.

Preferably the predetermined flow characteristic comprises a simultaneous substantially zero flow sensed of a first liquid supply line and a plurality of fluctuations between a substantially zero flow, a substantially maximum flow, and a return to a substantially zero flow sensed of a second liquid supply line.

Preferably there are a plurality of predetermined flow characteristics, each predetermined flow characteristic comprising a different number of fluctuations between the substantially zero flow, substantially maximum flow, and return to the substantially zero flow of second liquid supply line.

In a further aspect, the present invention may broadly consist in a beverage preparation attachment for retaining one or more consumables to be used in the treatment or further treatment of the liquid flow, the attachment in fluid connection with an outlet of a liquid supply fixture and adapted to receive a flow of water therefrom, treat the flow, and deliver the flow to an outlet of the attachment, the attachment comprising a receptacle for receiving and containing the consumable, a mechanism operable on the receptacle between an open condition at which the receptacle can be loaded or unloaded with the consumable and a closed condition at which the receptacle is at least partially within a liquid flow path from the outlet of the liquid supply fixture and to the outlet of the attachment.

Preferably the consumable is provided in a capsule, and the attachment punctures a loaded capsule upon the operation of the mechanism to the closed condition.

Preferably the receptacle further comprises a screen through which the liquid flow passes in order to be dispensed at the outlet.

Preferably the consumable comprises one or more of a) coffee grounds, b) tea leaves, or c) a syrup or flavouring.

Preferably the flow of water received from the liquid supply fixture is one or both of a heated water flow and a pressurised water flow.

Preferably the attachment receives the either or both heated and pressurised water flow upon the operation of the liquid supply fixture to provide a predetermined flow characteristic of a flow of water within one or more liquid supply lines connected to the liquid supply fixture.

Preferably the attachment further comprises one or more of a) a heater to optionally heat the flow of water received from the liquid supply fixture, and b) a pump to pressurise the flow of water received from the liquid supply fixture.

Preferably the attachment comprises an internal power source to power either or both of the heater and/or the pump.

In a further aspect, the present invention broadly relates to a beverage preparation attachment as described herein for use with a liquid control apparatus as described herein.

In a further aspect, the present invention broadly relates to an attachment interface device for connecting at a first end to a tap outlet of a tap such that a fluid flow from the tap outlet may pass to the first end and from a second end of the interface device, the connector comprising a first end interface for connecting with the tap outlet, and a second end interface for optionally connecting with an attachment having an attachment interface.

Preferably the attachment is selected from one of a plurality of attachments.

Preferably one of the second end interface and the attachment interface comprises a male portion and the other comprises a female portion.

Preferably the first end interface comprises a thread for threaded connection with a corresponding thread of the tap outlet.

Preferably the attachment interface device comprises at least one sensor to sense a type or identifier of an attachment which is connected at the second end interface.

Preferably the attachment interface device is operable to broadcast the sensed type or identifier, or an information dependent on the sensed type or identifier, of an attachment which is connected at the second end interface.

Preferably the broadcast is to a liquid control apparatus for selectively treating and/or substituting a liquid flow from at least one of a plurality of supply lines to the tap, and wherein the broadcast controls a state of operation of the liquid control apparatus including but not limited to a) the operation of a predetermined treatment and/or substitution, b) the selection of a predetermined flow characteristic necessary to provide one or more functions of the liquid control apparatus, and/or c) the operation of at least one valve of the liquid control apparatus.

Preferably the attachment interface device may be for use with a liquid control apparatus as described herein.

Preferably the attachment interface device comprises an internal power source for powering the at least one sensor and the broadcast.

Preferably the internal power source is user replaceable.

Preferably the internal power source is able to be charged, at least in part, from a flow of fluid through the attachment interface device.

Preferably the attachment interface device is for use with a liquid control apparatus and an attachment, the attachment interface device for supplying a treated and/or substituted flow from the liquid control apparatus to the attachment for use or dispensing at the attachment.

Preferably the attachment comprises a steam cleaning apparatus, and the attachment interface device connects an inlet of the steam cleaning apparatus to a flow of steam and/or heated liquid from the liquid control apparatus.

Preferably the attachment comprises a beverage preparation attachment for preparing a beverage, and the attachment interface device connects an inlet of the beverage preparation apparatus to flow of heated and/or pressurised liquid from the liquid control apparatus.

Preferably the beverage preparation attachment comprises a beverage preparation attachment as described herein.

Preferably the attachment is to provide an optional or selective treatment and/or modification of a fluid flow from the tap outlet before it is dispensed to a user.

Preferably the attachment interface device is for permanent connection by its first end interface with the tap outlet.

In a further aspect, the present invention broadly relates to a universal connector for association, at a first end of the connector, with an outlet of a tap, the universal connector having a second end comprising a standardised connection for connecting with any attachment having a corresponding standardised connection, wherein the universal connector is operable in at least a) a first mode, wherein an attachment is not coupled to the second end and any fluid flow from the tap outlet is dispensed directly to a user from the second end, and
b) a second mode, wherein an attachment is coupled to the second end and any fluid flow from the tap outlet is dispensed to the coupled attachment.

Unless the context clearly indicates otherwise, it is contemplated that any of the preceding statements may be combined together in any desired combination to arrive at various arrangements of features and functionality within the scope of the invention.

The term "axis" as used in this specification means the axis of revolution about which a line or a plane may be revolved to form a symmetrical shape. For example, a line revolved around and axis of revolution will form a surface, while a plane revolved around and axis of revolution will form a solid.

As used herein the term "and/or" means "and" or "or", or both.

As used herein "(s)" following a noun means the plural and/or singular forms of the noun.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention may become apparent from the following description which is given by way of example only and with reference to the accompanying drawings.

BRIEF DESCRIPTION OF THE DRAWINGS

Preferred embodiments of the invention will be described by way of example only and with reference to the drawings, in which:

FIGS. 24 and 25 show two embodiments of a liquid control apparatus and a beverage attachment for use with a liquid supply apparatus.

FIG. 26A shows a prior art sink and drainage assembly.

FIG. 26B shows the sink and drainage assembly of FIG. 26A with an in-line drainage connection for a liquid control apparatus according to the invention.

FIGS. 29A and 29B show views of a tap attachment connected to a tap.

FIGS. 30A and 30B show views of a tap attachment in closed and open conditions.

DETAILED DESCRIPTION OF THE DRAWINGS

Figure 1:
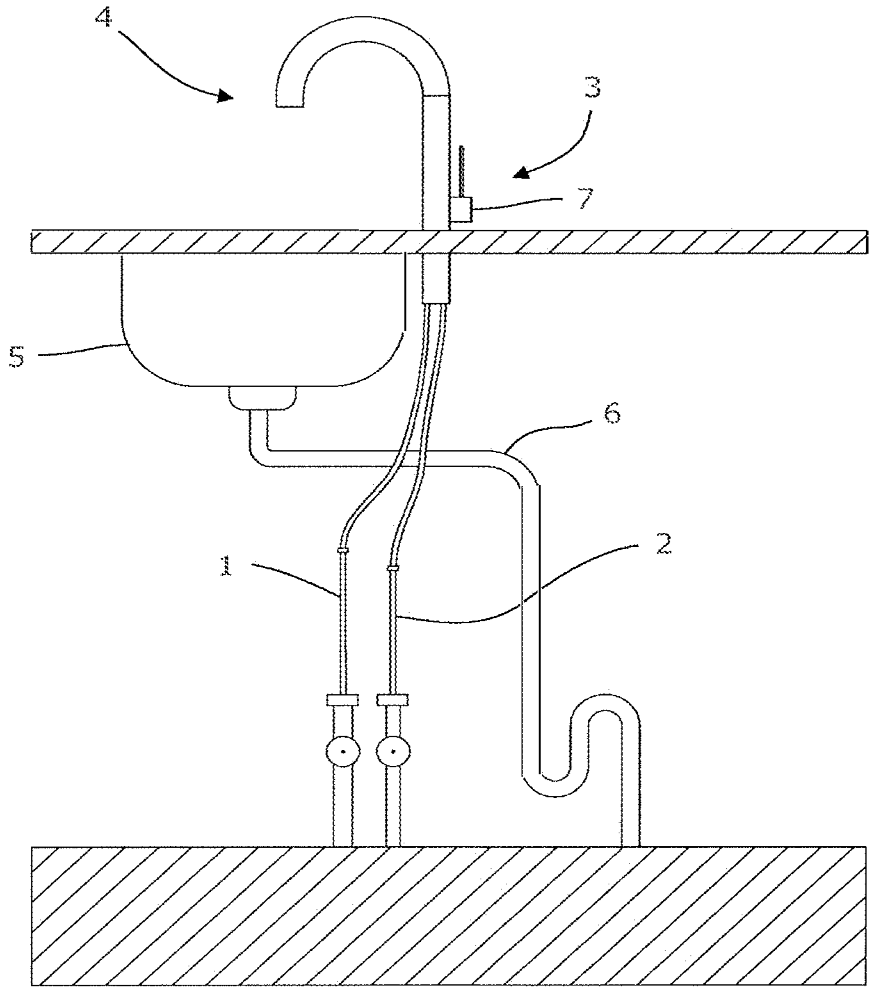
FIG. 1 shows a prior art plumbing system and liquid supply lines.

FIG. 1 shows a prior art configuration for the supply of two liquid sources 1, 2, to a flow controller 3 for dispensing from a liquid supply outlet 4 to a user. For example the system shown in FIG. 1 may be commonly utilized in a bathroom or kitchen providing a cold water supply 1 and hot water supply 2 for dispensing to a user. The flow controller 3 may commonly be in the form of a plumbing fixture such as a tap associated with each line, or as is shown in FIG. 1 a mixer 7 for mixing the liquid inputs of the two liquids sources 1, 2.

Such a prior art liquid dispensing system may also comprise a basin 5 and waste water plumbing 6 for containing and removing dispensed liquid.

The invention will now be described by way of example and with reference to the figures. The present invention relates in one aspect to a liquid control apparatus 8. The liquid control apparatus 8 is for selectively modifying ducted flow of liquid delivered from at least two liquid sources, dependent on flow sensed of the ducted flows.

Figure 2A:
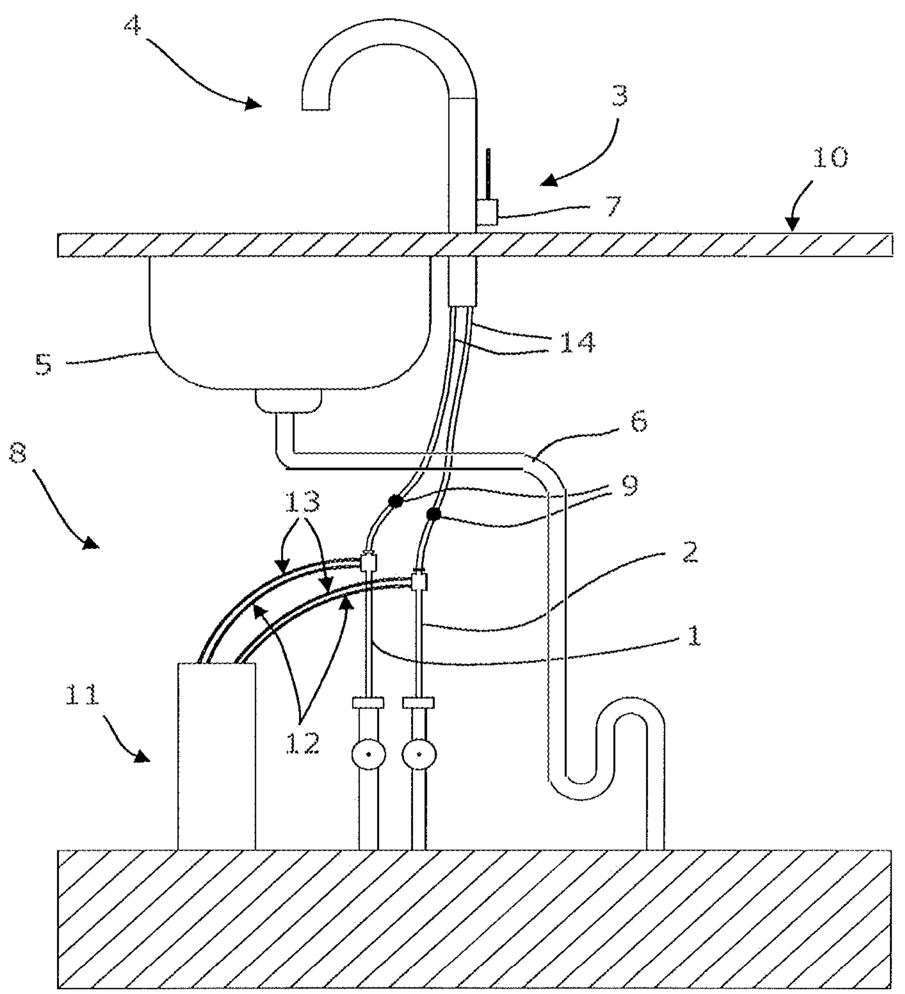
FIG. 2A shows a liquid control apparatus of the present invention installed on the plumbing system of FIG. 1.

Shown in FIG. 2A is an embodiment of a liquid dispensing system according to the present invention. The system of FIG. 2A comprises two liquid sources 1, 2, a flow controller 3, and a liquid supply outlet 4 as described in relation to FIG. 1. In addition, the system of FIG. 2A comprises a liquid controlled apparatus 8. The liquid control apparatus 8 is for selectively modifying ducted flow of liquid delivered from at least two liquid sources, in the case of FIG. 2A the liquid sources 1 and 2. The ducted flow of liquid is to be delivered from the at least two liquid sources to one liquid supply outlet 4 as shown in FIG. 2A. Alternatively in other embodiments the flow of liquid may be delivered from the at least two liquid sources to respective liquid supply outlets.

The liquid control apparatus 8 is for use with a flow controller 3. In other embodiment of the invention the liquid control apparatus 8 may comprise a flow controller 3.

The flow controller 3 is to be able to receive the at least two ducted flows as at least two flow controller input streams. The flow controller 3 is able to independently control the flow rate of the at least two ducted flows through the flow controller for ducted output from the flow controller. The output from the flow controller 3 is to be one liquid supply outlet 4 or respective liquid supply outlet 4 where the flow from the at least two liquid sources 1, 2 is mixed at or downstream of the flow controller 3 and upstream of the liquid outlet 4. Alternatively, where the ducted flows are for mixing after the liquid supply outlets 4, the at least two ducted flows through the flow controller are ducted for output from the flow controller 3 to respective said liquid supply outlets 4.

As seen in the configuration of FIG. 2A, the liquid control apparatus 8 comprises a flow controller 3 in the form of a single handled mixer 7. At the mixer 7 the two liquid sources 1, 2 are flow rate controlled and mixed, then outputted from the liquid supply outlet 4.

The liquid control apparatus 8 further comprises a sensor 9 for each of the at least two ducted flows. For example in the configuration of FIG. 2A, the liquid control apparatus 8 comprises a sensor 9 for each of the ducted liquid sources 1, 2.

The sensor or sensors 9 are preferably any form of sensor such as can provide flow data, or from the output of which flow data may be calculated, extrapolated, or estimated. For example, the sensors 9 may be in the form of conventional flow sensors.

Alternatively or in addition, the sensors 9 may be in the form of pressure sensors. When the liquid source 1, 2 is a pressurised source, or where the liquid control apparatus 8 provides a pressurisation, the pressure in the liquid supply lines will change dependent on the operation of the flow controller or liquid supply fixture 4.

For example, where the liquid sources are either or both a pressurised water source, the operation of the tap 4 to provide a flow of water will cause the pressure in the line to decrease as the flow rate increases from zero according to Bernoulli's equation.

Similarly, the cessation of a flow by the tap 4 will cause an increase in the pressure on the respective supply line to increase.

Such changes in pressure may be sensed by a pressure sensor, and used to indicate a particular flow condition such as an initiation of flow, a cessation of flow, or particular flow rate.

While the sensors 9 may variously be referred to herein as flow sensors 9, it will be appreciated that they may comprise conventional flow sensors or any other sensor capable of sensing flow or from which a flow may be calculated, extrapolated, or estimated.

For example, the sensors or flow sensors 9 may in the form of mechanical flow meters, pressure-based flow meters, variable-area flow meters, optical flow meters, thermal mass flow meters, vortex flow meters, sonar flow meters, or laser Doppler flow meters.

The flow sensors 9 are to be preferably provided upstream of the flow controller 3. For example in the configuration of FIG. 2A, the flow sensors 9 may be located anywhere below the region of the counter top 10. However, particularly in configurations where the flow controller does not mix the two ducted flows before outletting them, the flow sensors 9 may be located at or downstream of the flow controller 3.

The liquid control apparatus 8 also comprises a flow modifier 11. The flow modifier 11 is located upstream of the flow sensor 9, and downstream of the at least two liquid sources. The flow modifier 11 is able to receive the at least two ducted flows from the at least two liquid sources as flow modifier input streams 12. The flow modifier 11 selectively modifies at least one of the flow modifier input streams 12 dependent on flow sensed at each of the flow sensors 9.

The flow modifier 11 then outputs each of the flow modifier input streams 12 as flow modifier output streams 13. The flow modifier output streams 13 are for delivery to the flow controller 3 as flow controller input streams 14. The flow modifier output streams 13 each feed the respective ducted flows leading to the flow controller 3.

Figure 2B:
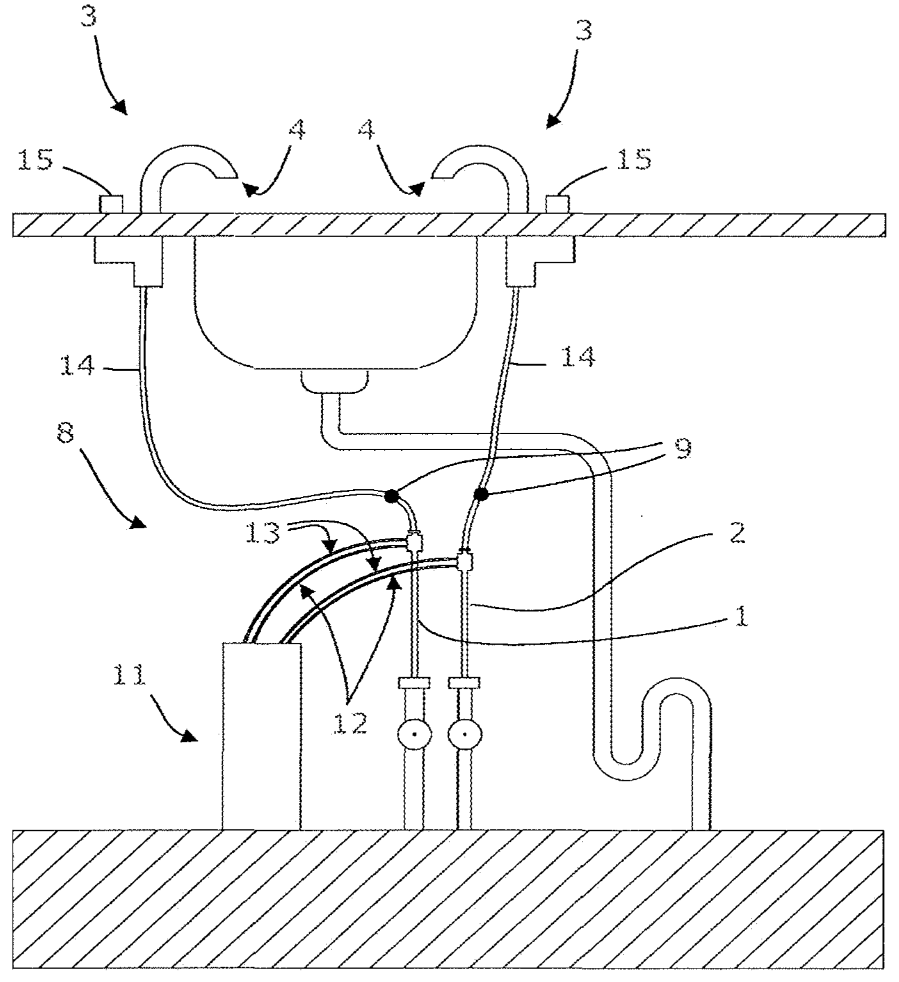
FIGS. 2B-D show a liquid control apparatus of the present invention installed on various different configurations of plumbing systems and liquid supply lines.
Figure 2C:
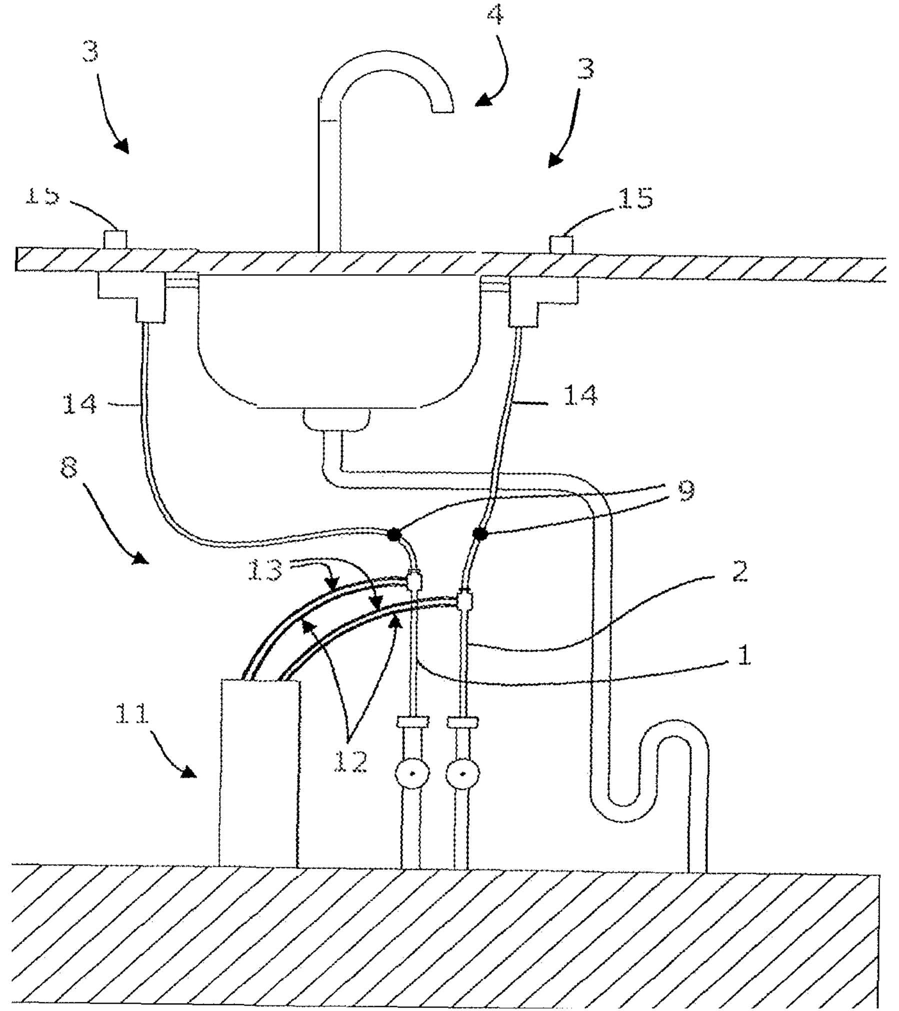
Figure 2D:
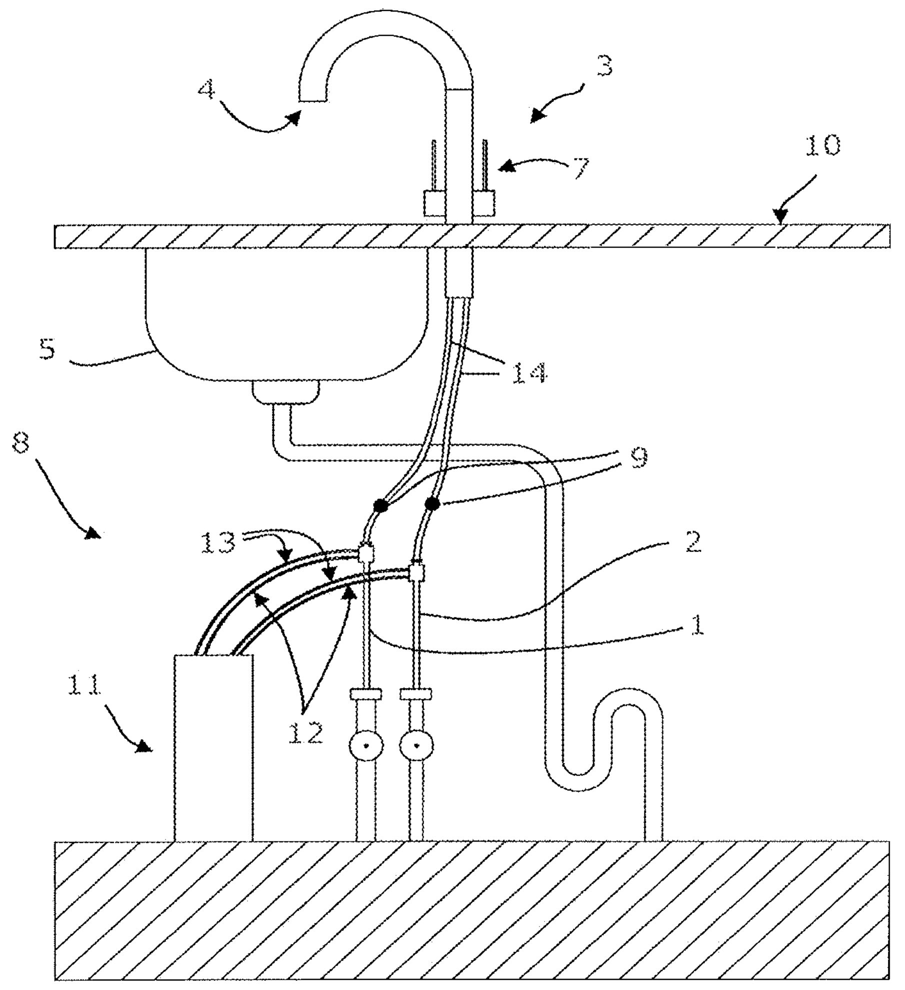

FIGS. 2B to 2D show application of a liquid control apparatus 8 according to the invention with various configuration of liquid supply outlets 4 and flow controllers 3.

In FIG. 2B a liquid control apparatus 8 is associated with the ducted supplies from two liquid sources 1, 2 which lead to two separate flow controllers 3 and liquid supply outlets 4. In this configuration the flow controllers 3 are each in the form of taps 15, which individually regulate the flow of liquid from each of the liquid sources. Liquid is separately outputted from each tap 15 to a separate liquid supply outlet 4.

In FIG. 3C the configuration is shown with taps 15 of each liquid source 1, 2 as in FIG. 2B, except that the outputs of the taps 15 are ducted together for distribution from a single liquid supply outlet 4.

FIG. 2D shows a configuration of a single flow controller 3 comprising a dual handled mixer 7. The dual handled mixer 7 is able to provide independent control over the flow rate of each of the liquid sources 1, 2 as supplied to the mixer 7 as the flow controller input streams 14. The individually controllable flow controller input streams are dispensed from a single liquid supply outlet 4.

Figure 4A:
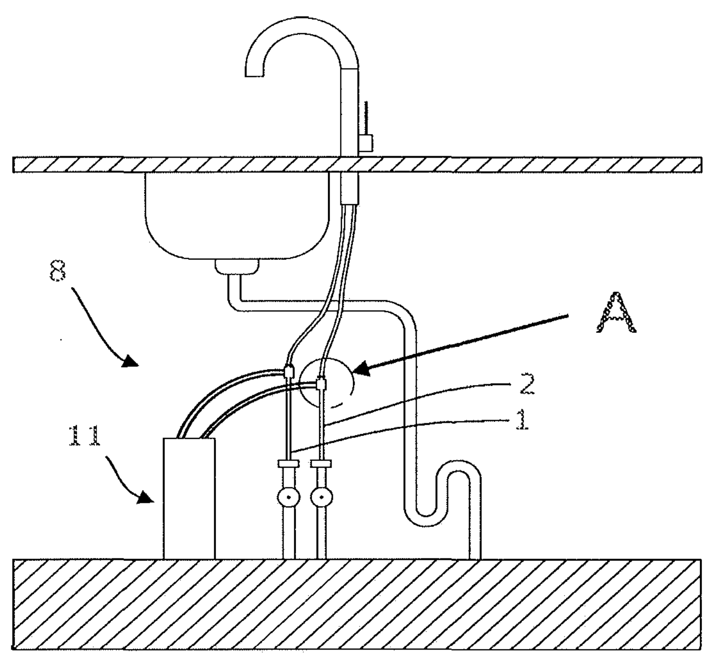
FIG. 4A shows a view of a plumbing system and a liquid control apparatus of the present invention.
Figure 4B:
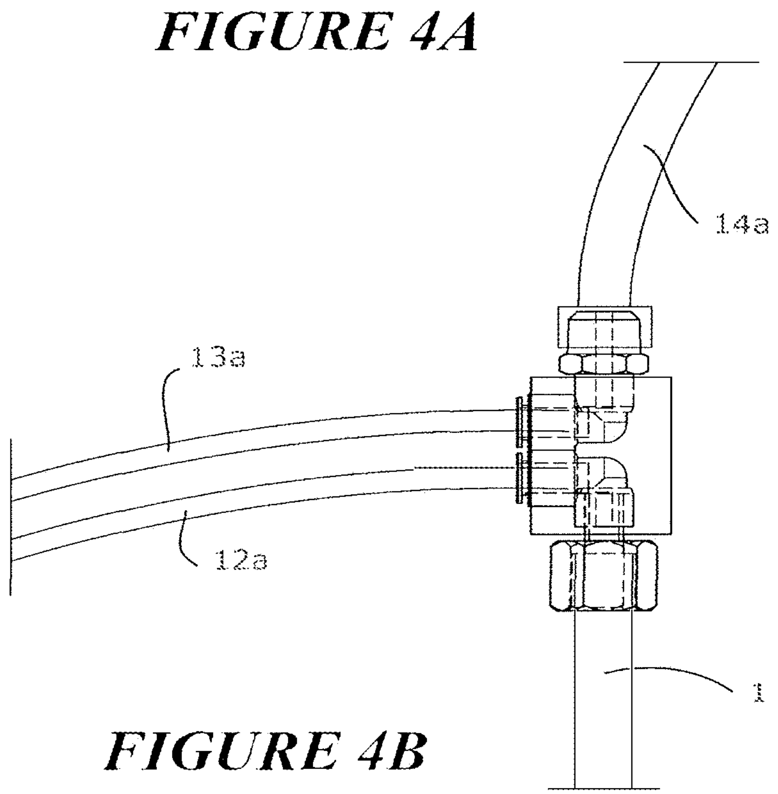
FIG. 4B shows a detailed view of the portion circled and labelled A in FIG. 4A.
Figures 5, 6:
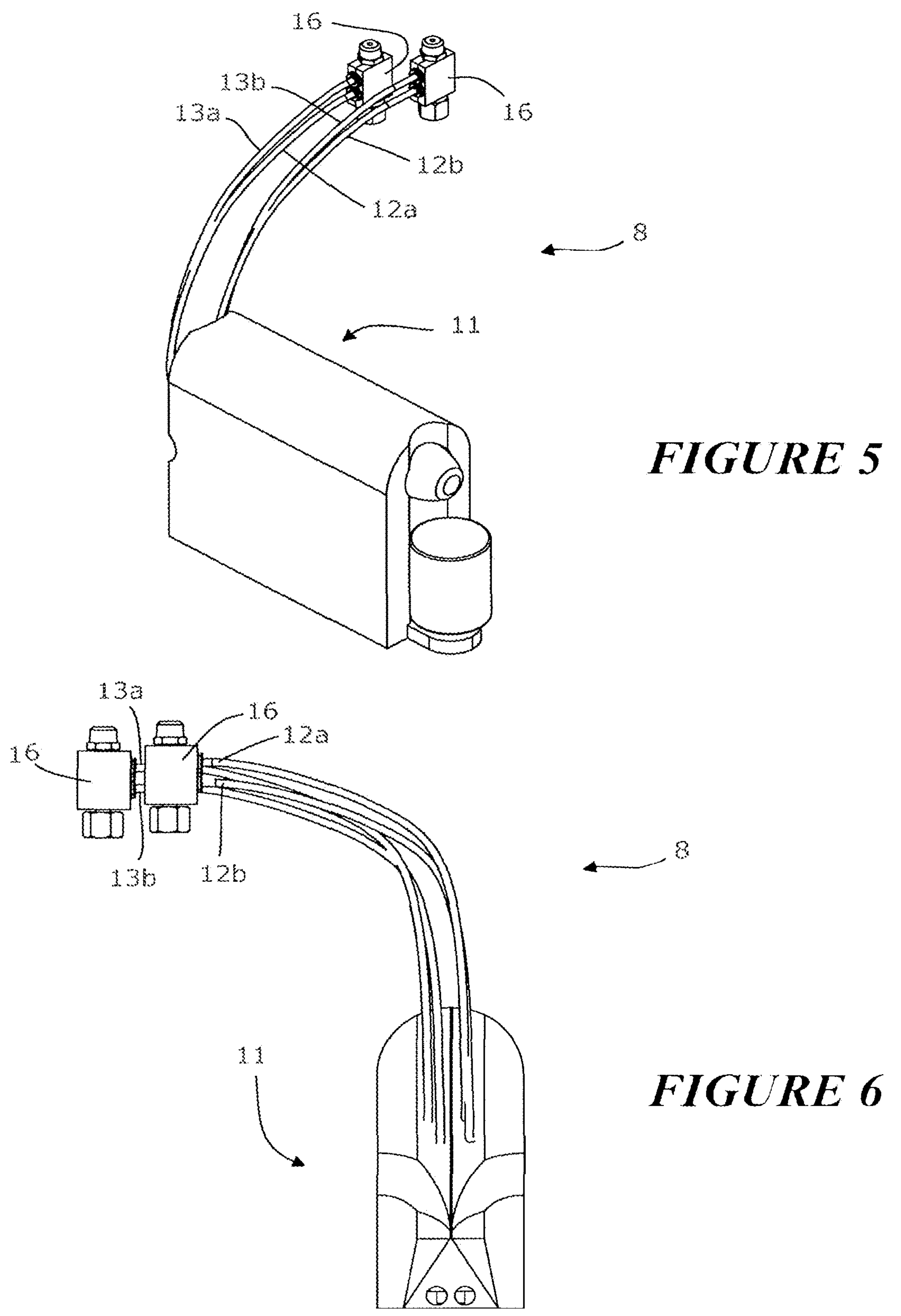
FIG. 5 shows a view of a liquid supply apparatus of the present invention.
FIG. 6 shows another view of a liquid supply apparatus of the present invention.

FIG. 4B shows a detailed view of the portion A indicated in FIG. 4A. In FIG. 4B the ducted supply from the first liquid source 1 is shown. This ducted supply is diverted at a flow diverter 16 to the first flow modifier input stream 12*a*. The first flow modifier input stream 12*a* passes through and is selectively modified by the flow modifier 11. It is then outputted as a first flow modifier output stream 13*a*. At the flow diverter 16, it is passed to the flow controller input stream 14*a*, which passes the liquid flow on to the flow controller 3.

Figure 3:
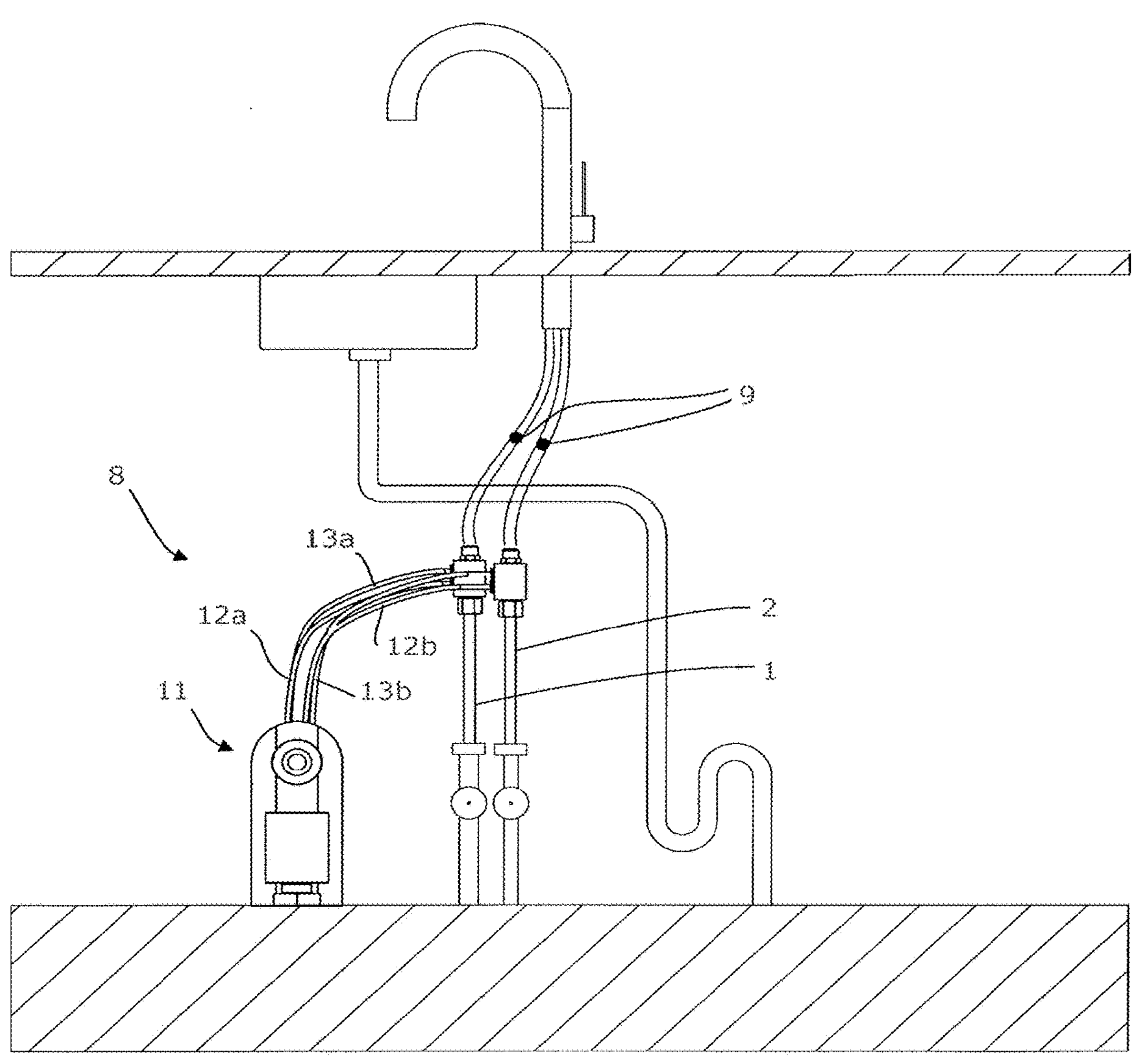
FIG. 3 shows a more detailed view of the configuration of FIG. 2A.

A more detailed view showing the first and second flow modifier input streams 12*a* and 12*b*, and the first and second flow modifier output streams 13*a*, 13*b* of the respective first liquid source 1 and second liquid source 2 is shown in FIG. 3.

While the flow modifier 11 is to be located upstream of the flow sensors 9, in practice the flow sensors 9 may be provided within a combined housing or as a single unit with the box of the flow controller 11 such as is shown in FIG. 3. By such a configuration the flow sensors may be installed on the liquid inlet lines by virtue of the connection only of the diverters 16, and without requiring any additional plumbing or installation. In other less preferred forms the flow sensors 9 may be provided at any other location upstream of the flow controller 3.

The liquid control apparatus 8 selectively modifies at least one of the flow modifier input streams dependent on flow sensed at each of the flow sensors 9.

The flow sensors 9 are provided on each of the at least two ducted flows from the at least two liquid sources 1, 2, at a point upstream of the flow controller 3. For example, this means that the flow sensor 9 are to be provided upstream of the taps 15 or mixer 7.

The flow sensors 9 above each ducted flow measure the flow of that ducted liquid source. Because the liquid flow from each of the liquid sources is controlled by the flow controller 3, which is to be operated in the form of taps or a mixer for example by a user, the flow sensed at the flow sensor 9 is indicative of a user's input at the flow controller 3. For example, if a user selects cold by opening the cold tap for opening a mixer at the cold position, the flow sensor 9 of the ducted flow of the cold water liquid source 1 will register a flow rate. Upon the occurrence of particular flow conditions indicated by the flow sensors 9, the flow modifier 11 may be activated to modify the flow through it of one or more of the liquid sources fed through its respective flow modifier input streams 12.

Because the flows registered by the flow sensors 9 are determined by the operation of the flow controller 3 by a user, the operation of the flow controller by a user can be used to provide the flows at the flow sensors 9 upon which the flow modifier 11 may selectively modify one or more of the liquid flows.

This configuration allows for the dispensing of modified fluid flows from the liquid supply outlet to a user without requiring any further input device. The inputs to selectively modify the ducted flows are provided by a user's input at an existing flow controller 3, such as a tap, set of taps, or a mixer.

Because the liquid control apparatus 8 for installation in-line with each ducted liquid source, plumbing installation and capital expenditure may also be limited. In the preferred form, no further changes to the plumbing or faucet hardware of an existing water supply system are required other than the in-line installation of the diverters 16. With only the installation of the diverters 16, selective modifications of the liquid sources may be provided to a user at the outlet. For example, one of the cold water or heated water sources may be modified to carbonate it, to filter it, or to boil it. Any number and combination of potential modifications are envisaged within the scope of the invention, and further configurations will presently be described.

In a preferred embodiment, the flow modifier 11 of the liquid control apparatus 8 selectively modifies at least one flow modifier input stream 12*a* or 12*b* dependent on a predetermined flow characteristic of the flow sensor 9 of each of the ducted flows of two liquid sources.

According to a primary embodiment of the invention, the flow modifier 11 is not activated to selectively modify a flow modifier input stream under flow sensor 9 sensed flow conditions associated with regular hot and cold water usage. For example, the flow modifier 11 is preferably not activated in response to a simple on-and-off usage of either for a combination of both of the liquid flows from the liquid sources 1 and 2.

To provide an unmodified flow of cold water, the flow modifier 11 will not selectively modify the cold water flow from the flow modifier input stream 12*a*, but rather will pass it out through the flow modifier output stream 13*a*, to the flow controller input stream 14*a* and to the flow controller 3 for dispensing to a user.

A similar operation will apply in respect of an opening of the hot water source by the follow controller 3. Liquid will be passed from the second liquid source, through the flow modifier input stream 12*b*, out the flow modifier output stream 13*b* and through the flow controller input stream 14*b* to the flow controller.

If a user operates the flow controller 3 to allow flow from each of the flow controller input streams 14, but without providing a predetermined flow characteristic, ducted from each of the liquid sources 1, 2 may similarly be simultaneously passed through their respective flow pathways, not modified by the flow modifier 11 and passed to the flow controller for dispensing.

Thus the predetermined flow characteristic upon which modification is selectively commenced is preferably not a flow characteristic of the flow sensors 9 associated with at least these types of regular hot, cold, and hot/cold water usage by a user.

Such non-regular flow condition may comprise regular, repeated, or rapid fluctuations of flow of at least one ducted flow. Such a fluctuation may be for example that they change between two flow thresholds. For example, the flow of at least one ducted source may be reduced from one level to another level such as full flow to a half flow. The fluctuation may be sensed at one or a plurality or each of the flow sensors 9. For example, the fluctuation may be a fluctuation from a first threshold to a second threshold such as reduction from full flow to half flow of both a hot line and cold line, such as would occur with the setting of a mixer to a central position.

An example of a fluctuation of flow upon which the flow modifier 11 may be dependent for activation is a repeated fluctuation or pulsing of flow of one fluid source. To achieve this for example the user may repeatedly turn on and turn off the cold water tap, or the mixer at the cold-only position. This would provide a fluctuation of flow on the cold water line, but a concurrent zero flow condition on the hot water line. The turning on and off may be between full and zero flow conditions, or may be only respective increases and decreases in flow.

The same or a different selective modification could be selected by the user repeatedly turning on and off the hot water tap, or the mixer at the hot-only position. This would provide a fluctuation of flow on the hot water line, but a concurrent zero flow condition on the cold water line. Similarly, the same or a different selective modification could be selected by a user repeatedly turning on and off both taps or the mixer at a mid-position between hot and cold.

Particular numbers of on and off fluctuations of flow on one line and concurrent zero flow on the other, or particular numbers of concurrent fluctuations of both lines may comprise different predetermined flow characteristics and be used to select different modifications. For example, two on-off pumps on the cold-only setting may activate a first selective modification, such as a carbonation. Three on-off pumps on the cold-only setting may active a second selective modification, such as chilling. In the same configuration, or in a different configuration, two on-off pumps on the hot only setting may activate another selective modification, such as boiling of the liquid source.

Any number or combination of user inputs at the flow controller 3 may utilised to activate a selective modification by the flow modifier 11 within the scope of the invention, of which the foregoing provides only examples.

In order to reduce or prevent false positives by the unintentional activation of a selective modification by the flow modifier 11, the predetermined flow characteristic upon which the flow modifier is dependent may be required to occur within a predetermined time limit.

The predetermined flow characteristic will now be described more generally in relation to example embodiments of the invention. The predetermined flow characteristic for selective modification of the at least one flow modifier input stream 12*a* or 12*b* may comprise a fluctuation of flow, as described above. This fluctuation of flow may be sensed at least one flow sensor 9 of at least one of the at least two ducted flows.

In some embodiments the predetermined flow characteristic comprises a fluctuation of flow sensed at one flow sensor 9, and any other predetermined flow sensed at the other flow sensor 9. In other configurations the predetermined flow characteristic comprises a fluctuation flow of one ducted flow, and a substantially constant flow at the other or others of the at least two ducted flows. This substantially constant flow may be a zero or non-zero flow.

In other embodiments, the predetermined flow characteristic of the flow sensors 9 comprises a fluctuation of flow sensed at the flow sensor 9 of two or more of the at least two ducted flows, and a zero or substantially zero flow at any other flow sensors 9.

According to the invention a fluctuation of flow preferably comprises a change between a first flow threshold and a second flow threshold. The first and second flow threshold may be any thresholds of flow. In preferred embodiments the first flow threshold and second flow threshold are selected from a zero or substantially zero flow and a full or substantially full flow.

The predetermined flow characteristic upon which the flow modifier 11 selectively modifies a ducted flow modifier input stream 12*a* or 12*b* may be required to occur within a predetermined time limit. For example, a particular fluctuation of flow, such as between a first threshold and a second threshold, may be required to occur within a predetermined time limit in order for the flow modifier 11 to selectively modify either or both of the flow modifier input streams 12*a*, 12*b*. Such a predetermined time limit may be any desired length of time, but is preferably less than 5 seconds or even more preferably less than 2.5 seconds, or even more preferably less than 1 second.

Where the flow sensed at the flow sensors 9 upon which the flow modifier input streams are selectively modified comprises a fluctuation of flow, the fluctuation of flow may further comprise a pattern of fluctuations. Such pattern of fluctuations comprise a plurality of changes between a first flow threshold and second flow threshold. As previously described, the first flow threshold and second flow threshold may be any thresholds of flow, but in preferred embodiments are selected from a zero or substantially zero flow, and a full or substantially full flow.

As described in relation to fluctuations of flow, the patterns of fluctuations of flow may also be required to occur within a predetermined time limit in order for the activation of the selective modification of a flow modifier input stream 12*a*, 12*b* by the flow modifier 11.

In various embodiments either one or more than one of the flow modifier input streams 12 may be selectively modified by the flow modifier 11. Where more than one flow modifier input stream is able to be selectively modified, each input stream may be modified dependent on its own predetermined flow characteristic. For example, a first flow modifier input stream 12*a* may be able to be selectively modified dependent on a first predetermined flow characteristic of flow sensed at each flow sensor 9, and a second flow modifier input stream 12*b* is able to be selectively modified dependent on a second predetermined flow characteristic of flow sensed at each flow sensor 9. Whether a single or multiple input streams are able to be selectively modified, they are modified dependent on a predetermined flow characteristics or predetermined flow characteristics of flow sensed at each flow sensor 9.

These individual predetermined flow characteristics may comprise fluctuations of flow sensed by the flow sensor 9 of at least one of the at least two ducted flows, as has previously been described. Each of these predetermined flow characteristics may also comprise a pattern of fluctuations, as has also been previously described.

The sensed flow upon which the flow modifier 11 is dependent for activation may comprise a fluctuation of flow or pattern of fluctuation of flow at one or more of the flow sensors 9. The flow modifier 11 may then be dependent on a particular flow sensed at the remaining flow sensors 9. For example, activation may require a fluctuation or pattern of fluctuation of flow of the cold water line, and a concurrent zero flow condition of the hot water line. This may indicate a fluctuation or pulsing of the cold water tap or the mixer on the cold only setting. By the selection of particular fluctuations of flow or patterns of one or more combinations of the ducted flows a user instruction to activate the flow modifier may be reasonably accurately distinguished from regular usage conditions.

Where the flow modifier 11 can provide for the modification of more than one of the flow modifier input streams 12, or can provide for more than one modification of each input stream, different predetermined flow characteristics may be utilized to activate each distinct modification.

The selective modification may also be ceased dependent on flow sensed at each flow sensor 9. In some embodiments the ceasing of the selective modification may be dependent on a further predetermined flow characteristic of each of the at least two ducted flows. This further predetermined flow characteristic for the ceasing of modification may be a ceasing of flow sensed at each flow sensor 9.

In a preferred form the mapping of predetermined flow characteristics to different selective modifications may be programmable by a user.

The modification of a flow by the flow modifier 11 may be one or more of a treatment of the flow, in addition to the flow, or a replacement of the flow. Commonly used types of modifications may include for example:

- gas dissolution into the liquid, such as carbonation or ozonation,
- filtration,
- heating,
- addition of a substance to the liquid, or
- replacement of the liquid with another liquid.

The replacement of the liquid with another liquid may for example involve substituting a flow of water with a liquid flow from a keg of beer, a supply of wine, or some other liquid source.

The flow modifier 11 may be able to be connected to one or more flow modifier expansion units. A flow modifier expansion unit can provide further or alternative selective modifications of liquid flow. Further details of expansion units are described in relation to FIGS. 20 and 21.

The present invention also relates to a consumable for use with a liquid control apparatus 8. As previously described, the liquid control apparatus 8 is for selectively modifying ducted flow of liquid delivered from at least two liquid sources 1, 2 to one liquid supply outlet 4 or respective liquid supply outlets.

Figure 7:
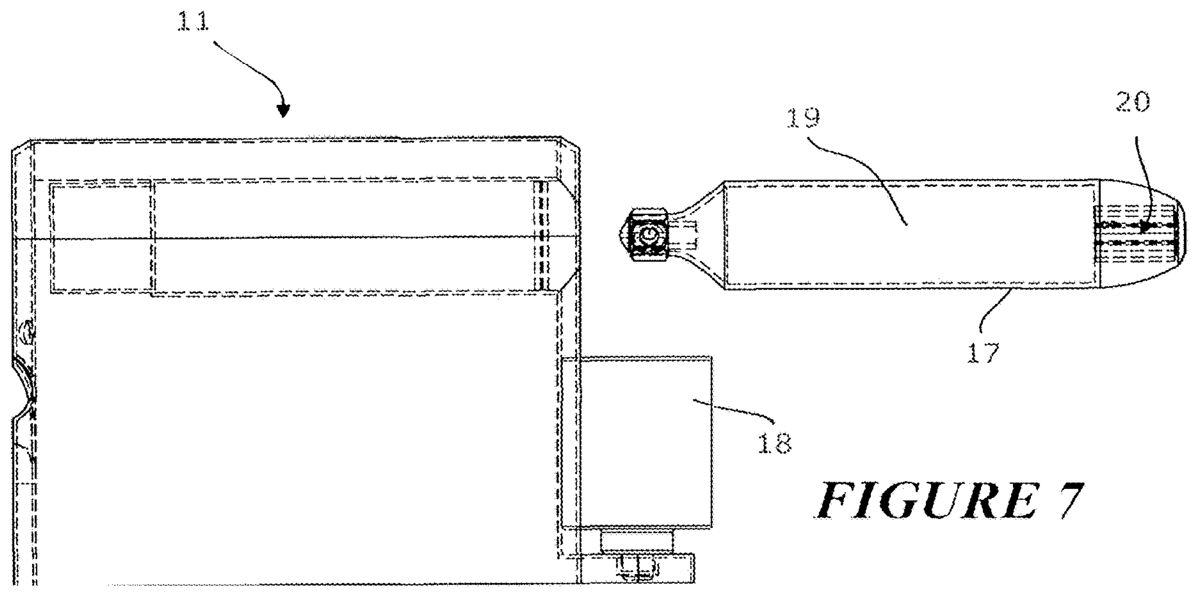
FIG. 7 shows an exploded view of various components of an embodiment of the liquid supply apparatus of the present invention.

With reference to FIG. 7, a consumable 17 is shown. The consumable 17 comprises a supply housing 22 for containing a material or substance for use by the liquid control apparatus 8 and selectively modifying the ducted flow of liquid. Then the example of FIG. 7, the consumable 17 is in the form of a gas cylinder or a supply of a pressurized gas for use in the modification of a ducted flow of liquid.

The consumable 17 also comprises a battery power source 20. The battery power source 20 is preferable for providing an electrical power source to the liquid control apparatus 8. The consumable 17 comprises two externally presented electrical connectors 21 of the battery power source 20. The electrical connectors 21 are for interfacing with the liquid control apparatus 8 to provide an electrical power source to the liquid controller apparatus for a part thereof.

Figure 8:
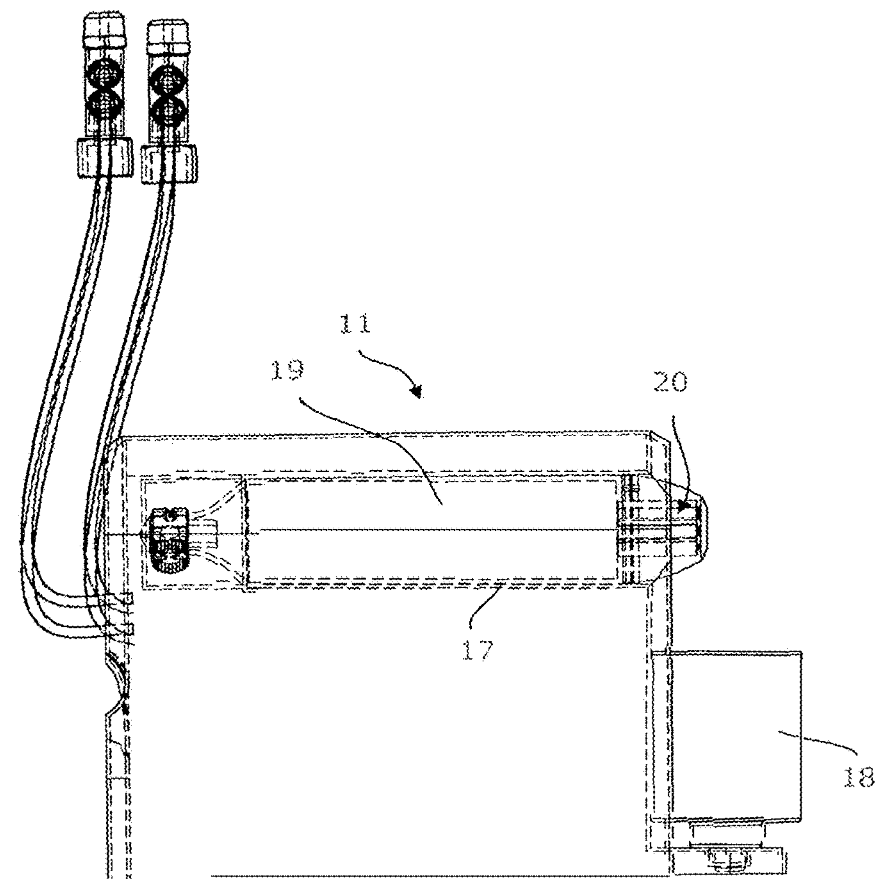
FIG. 8 shows another view of the embodiment of FIG. 7.

FIG. 7 shows a supply housing 22 of a consumable 17 in the form of a gas supply canister with a battery power source 20 ready for connection to the flow modifier 11. FIG. 8 shows the assembly of FIG. 7, wherein the consumable 17 has been connected with the flow modifier 11 for supplying the pressurized gas from the supply housing 22 and supplying electrical power through the electrical connectors 21 of the battery power source 20.

While shown in FIGS. 7 and 8 as comprising a pressurized gas supply, the supply housing 19 of a consumable 17 according to the invention may comprise any number of other types of supply for use in the modification of a ducted flow. For example, the supply housing 22 may comprise a sand filter for sand filtration unit, a carbon filter for a carbon filtration unit, a membrane filter for a membrane filtration unit, or a reverse osmosis filter for a reverse osmosis filtration unit. In other forms the supply housing 22 may comprise a chemical supply for a water softener, a supply of additive for a pH conditioner, a supply of flavor for a flavourer, or a supply of energy for a chilling unit. Where the supply housing 19 is in the form of a pressured vessel for supplying a gas, it may supply any form of gas commonly used in the conditioning of a liquid. These include but are not limited to carbon dioxide, oxygen, nitrogen or ozone.

Other secondary consumables 18 may be provided for use with a flow modifier 11 for selectively modifying a ducted flow. These secondary consumables 18 may also comprise a battery power source and electrical connectors as described in relation to the consumable 17. Alternatively they may not comprise these elements. For example, as seen in the embodiments of FIGS. 5 to 8, the flow modifier 11 is connected with a secondary consumable 18. The secondary consumable 18 comprises a supply housing 22 for containing a material or substance for use by the liquid control apparatus and selectively modifying a ducted flow of liquid, such as a filter.

The supply housing 22 of a secondary consumable 18 may comprise any of the configurations described in relation to the supply housing 22 of the consumable 17, or may also comprise any other commonly used substance or material for use in conditioning or treatment of a liquid flow. For example, in the embodiments of FIGS. 7 and 8, the secondary consumable 18 may comprise a filter or providing a secondary selectively modification of a fluid flow by passing it through a filter.

Figure 9:
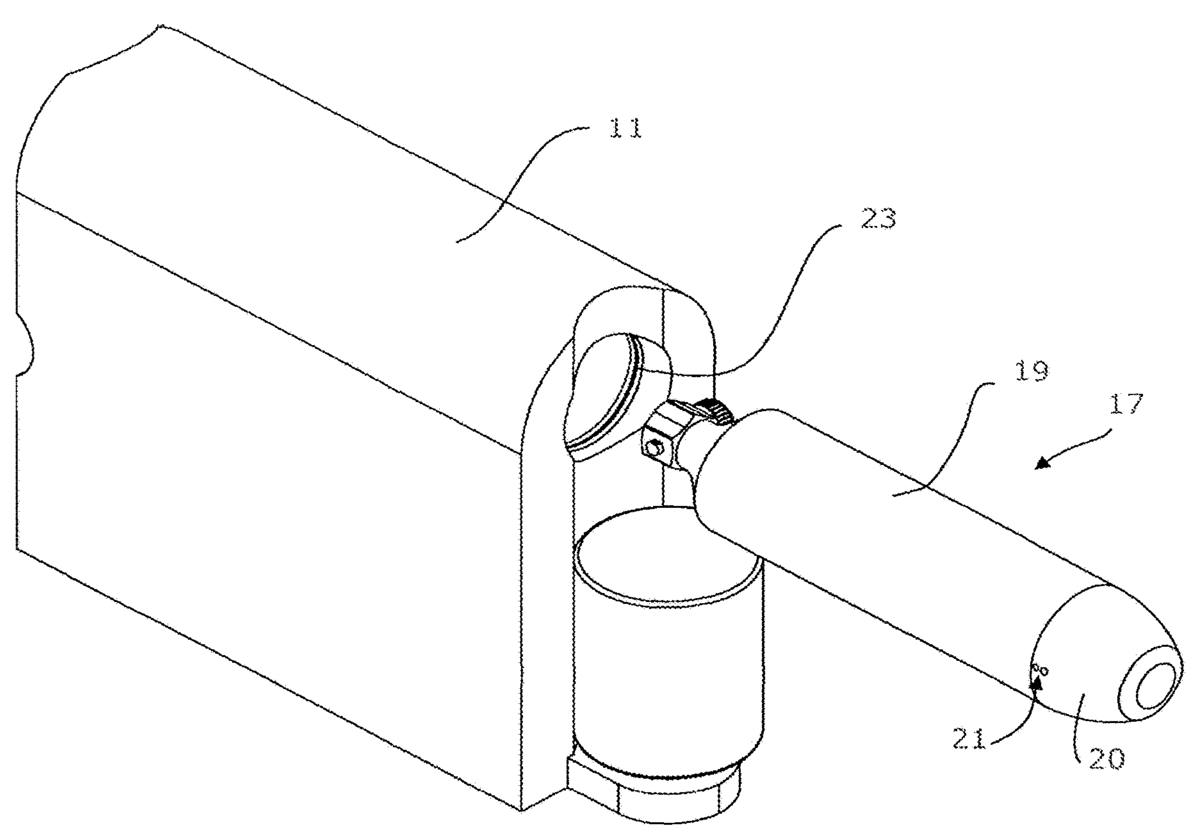
FIG. 9 shows a perspective view of an embodiment of the liquid supply apparatus of the present invention.
Figure 10:
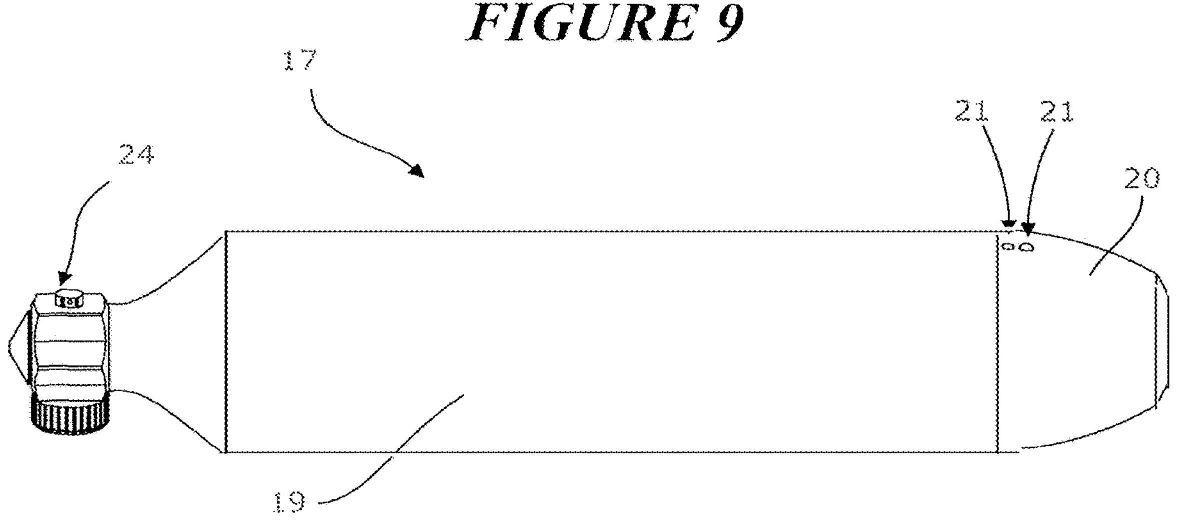
FIG. 10 shows a view of a consumable according to the present invention.

FIGS. 9 and 10 show further details of the consumable 17 as in relation to FIGS. 7 and 8, the supply housing 22 of the consumable 17 is in the form of a pressurizable gas cylinder.

Seen in FIGS. 9 and 10 are the electrical connectors 21 of the battery 20. The electrical connectors 21 may be provided on a housing of the battery 20 as shown, or they may be provided at any other externally presented surface of the consumable 17.

Also seen in FIG. 9 are the corresponding electrical connectors 23 of the flow modifier 11. The electrical connectors 3 are for electrical connection with the electrical connectors 21 of the consumable 17. As seen in FIG. 9 the electrical connectors 23 of the flow modifier have a substantially circumferential form, so as to extend around the circumference of the consumable 19. This configuration may be desirable to allow electrical connection between the connectors 21, 23 at any rotational orientation of the consumable 17 about a longitudinal axis of the supply housing 19. In other forms the electrical connectors 21 may extend about the circumference of the consumable 17, and the electrical connectors 23 of the flow modifier 11 may be provided at a discreet location.

The electrical connectors 21 may project radially beyond an out most radial extent of the consumable 17.

In a preferred form where a consumable 17 is provided for use with the flow modifier 11 of a liquid control apparatus 8, the electrical power for the fluid control apparatus is provided solely by the battery source 20 of the consumable 17.

The supply housing 19 preferable comprises a fitting 24 for fluidly coupling with the liquid control apparatus. As seen if FIG. 10 wherein the supply housing 19 of the consumable 17 is in the form of a pressure vessel for the supply of pressurized gas, the fitting 24 is in the form of a gas supply fitting. Such gas supply fittings as commonly available include threaded, bayoneted, or push fit fittings.

Figure 11:
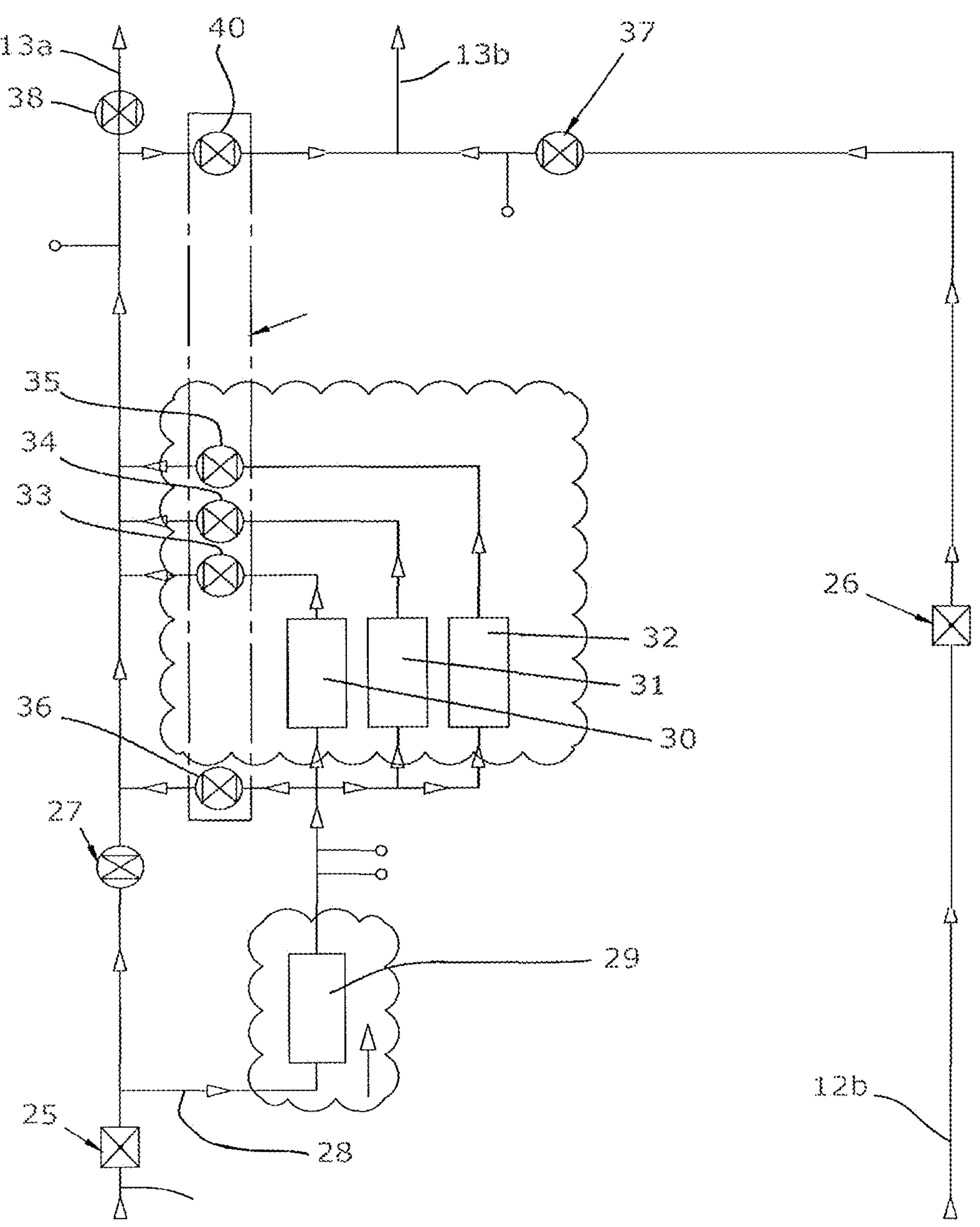
FIG. 11 shows an example piping and instrumentation diagram of an embodiment of the liquid supply apparatus of the present invention.

FIG. 11 shows a piping and instrumentation diagram of an embodiment of a liquid control apparatus 8 according to the invention. In the diagram of FIG. 11 the liquid control apparatus 8 is capable of outputting a modified liquid flow on either or both of the flow modifier output streams 13*a*, 13*b*.

At the most upstream point the flow modifier input stream 12*a* and 12*b* are plumbed into the existing liquid supply plumbing. A flow sensor 25 is provided on the first flow modifier input stream 12*a*. This input stream may for example be the cold water line. The liquid flow may travel either directly through a normally open solenoid 27 to the first flow modifier output stream 13*a*. Alternatively, it may be diverted to a secondary flow path 28. Located in the secondary flow path 28 may be a preconditioner 29. The preconditioner may provide any commonly available form of conditioning of a flow of liquid, such as sand filtering, carbon filtering, UV filtering, reverse osmosis filtering, water softening, or chilling. Further downstream is provided at least one flow modification unit. In the diagram of FIG. 11 three flow modification units 30, 31, and 32 are provided. Flow through each flow modification unit and on to the flow modifier output stream 13*a* is controlled by a respective one of a set of normally closed valves 33, 34, and 35. If only preconditioning by the preconditioner 29 is desired, the flow may alternatively be directed through the normally closed valve 36 to the flow controller output 13*a*. Direction of the flow modifier input stream 12*a* through either or both of the preconditioner 29 and flow modifier units 30, 31, 32 is controlled by the normally opened valve 27.

On the other side of the diagram of FIG. 11 the flow modifier input stream 12*b* is taken as an input. A flow sensor 26 is provided on this input.

In a standard configuration the flow modifier input stream 12*a* is a cold water line, the flow modifier input stream 12*b* may be a heated water line.

In the configuration shown in FIG. 11, the flow modified input stream 12*a* may be selectively modified and then dispensed from either or both of the flow modifier outputs 13*a*, 13*b* dependent on the control of the valves 38, 40, and 37.

In such a configuration flow sensed on each line due to a user's input at the flow controller 3 may result in the selective modification of the flow modifier input stream 12*a*, which may then be dispensed to the flow controller 3 on either the flow modifier output stream 13*a*, or the flow modifier output 13*b*.

Figure 12:
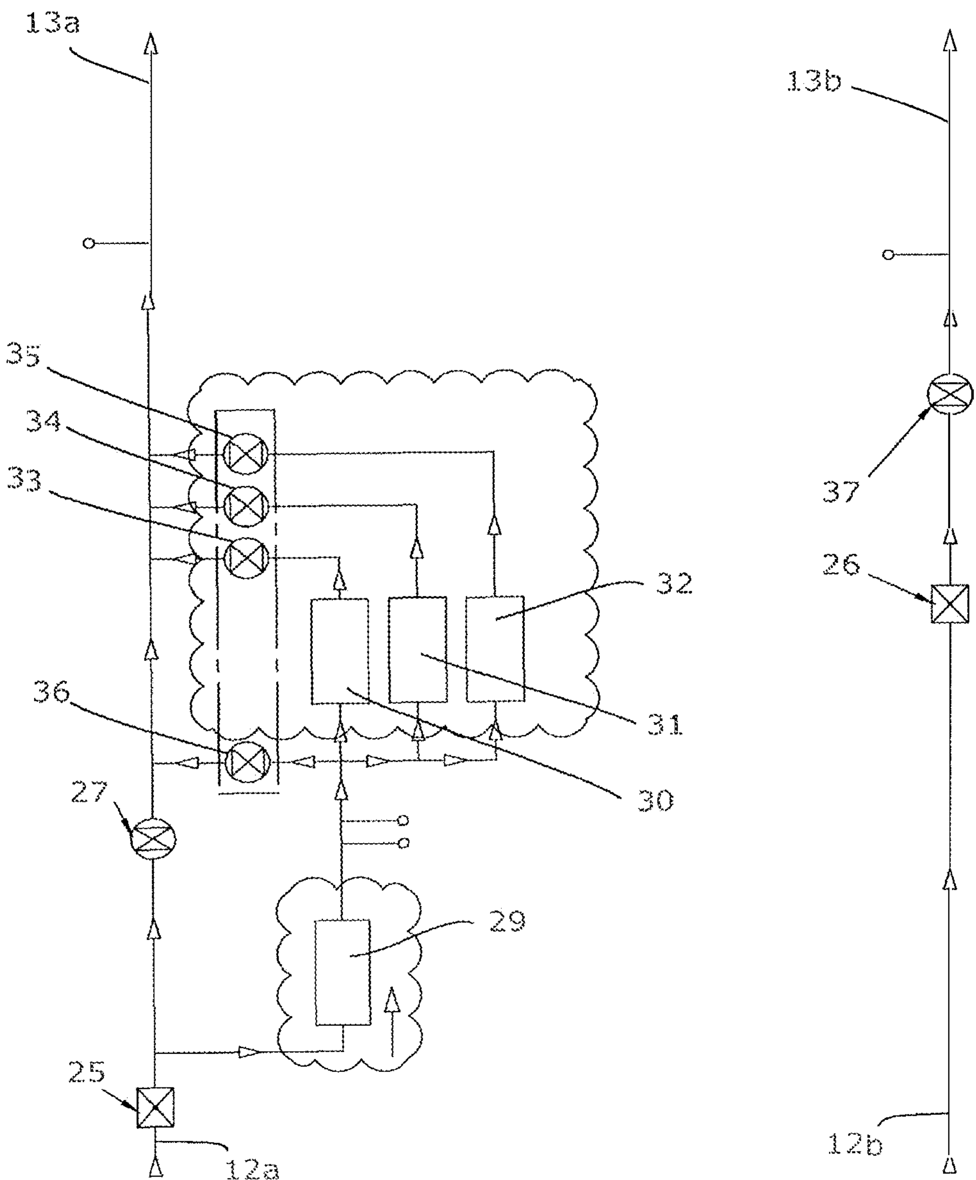
FIG. 12 shows another example piping and instrumentation diagram of an embodiment of the liquid supply apparatus of the present invention.

FIG. 12 shows a further piping and instrumentation diagram. This diagram shows the configuration of another embodiment of the liquid control apparatus 8 of the present invention. The configuration of each of the hot and cold lines is substantially similar as has been described in relation to FIG. 11.

However, in the diagram of FIG. 12 the flow from the flow modifier input stream 12*a* which may be selectively modified by the preconditioner 29 and/or one of the flow modified units 31, 32 may only be dispensed from the flow modifier output stream 13*a*. In this configuration any user input at the flow controller 3 will only be able to result in the outputting of a modified fluid flow from the first flow modifier output 13*a*.

The valves described in relation to FIGS. 11 and 12 may be any commonly available form of valve, but are preferably in the form of solenoid valves.

Where a flow modifier 11 is able to selectively modify a flow by dosing a gas into the liquid for dissolution into the liquid, the flow modifier 11 may comprise a chamber 39.

Figure 13:
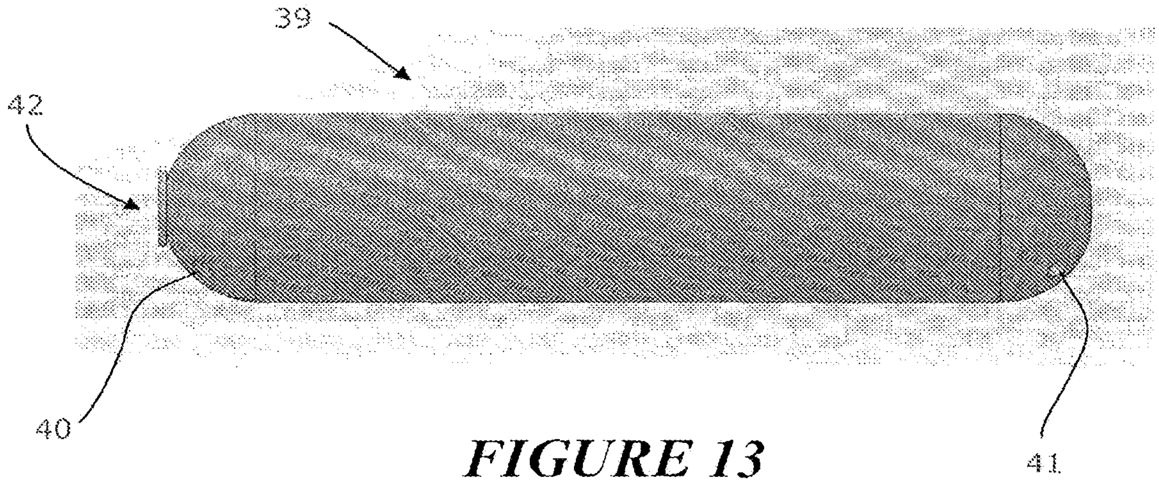
FIG. 13 shows a gas dissolution chamber according to the invention.
Figure 14:
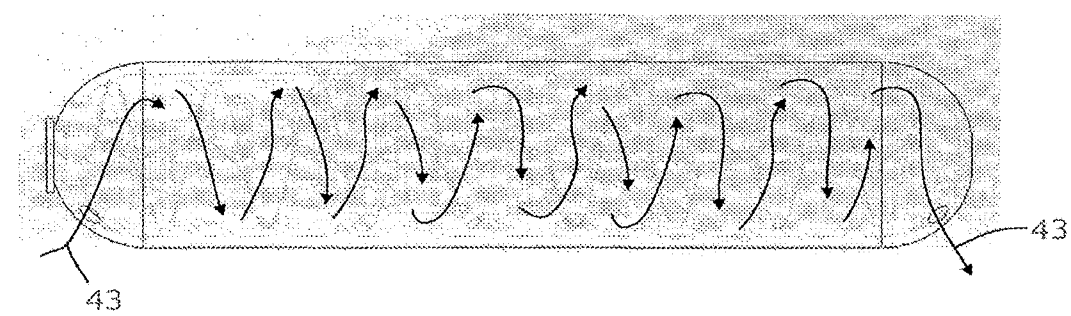
FIG. 14 shows the chamber of FIG. 13 with an example liquid flow pathway illustrated.

A chamber 39 is shown in FIG. 13. The chamber 39 comprises an inlet 40 for liquid from the liquid source and an outlet 41 for liquid to the liquid supply outlet 4. Between the inlet 40 and the outlet 41 there is preferably a liquid flow path which is of greater length than a direct distance between the inlet and outlet. An example of such a flow path is shown by the arrows 43 of FIG. 14.

Figure 15:
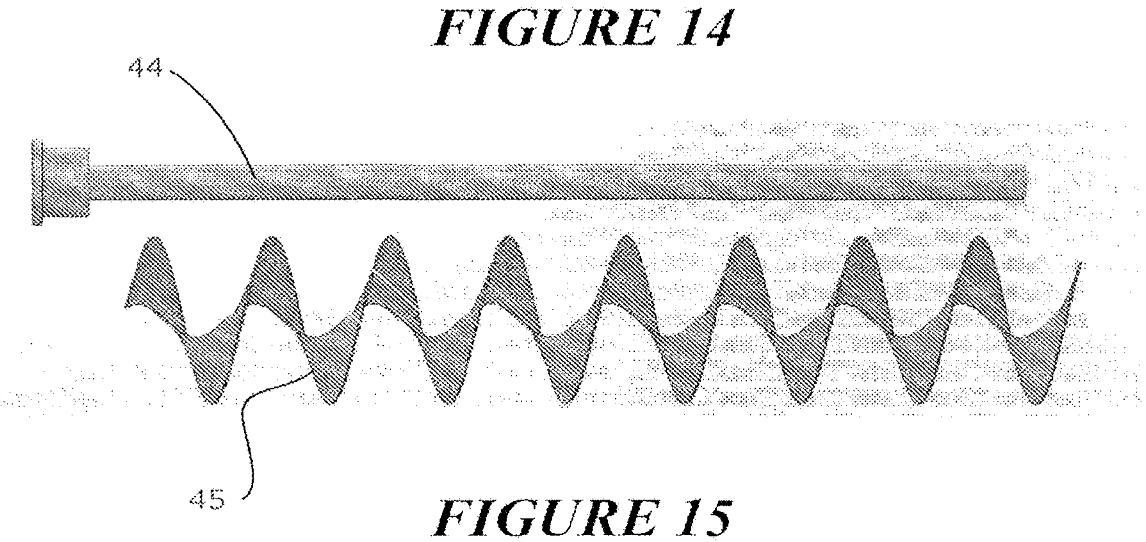
FIG. 15 shows components for installation within a chamber according to an embodiment of the chamber.

The chamber 39 also comprises a gas inlet 42, and a gas diffuser 44 provided at least partly within the chamber 39. The gas diffuser 44 receives a flow of pressurised gas from the gas inlet 42 and distributes the gas from a plurality of gas outlets into the liquid flow path 43. A gas diffuser 44 is shown in FIG. 15. The gas diffuser 44 may preferably be provided as a carbonation stone, having a multiplicity of pores for distributing the gas into the liquid.

Also shown in FIG. 15 is a baffle 45 for location within the chamber 39 in order to define at least in part the liquid flow path between the inlet 40 and outlet 41. As seen in FIG. 15 the baffle 45 comprises a helical baffle to define a helical liquid flow path.

Figure 16:
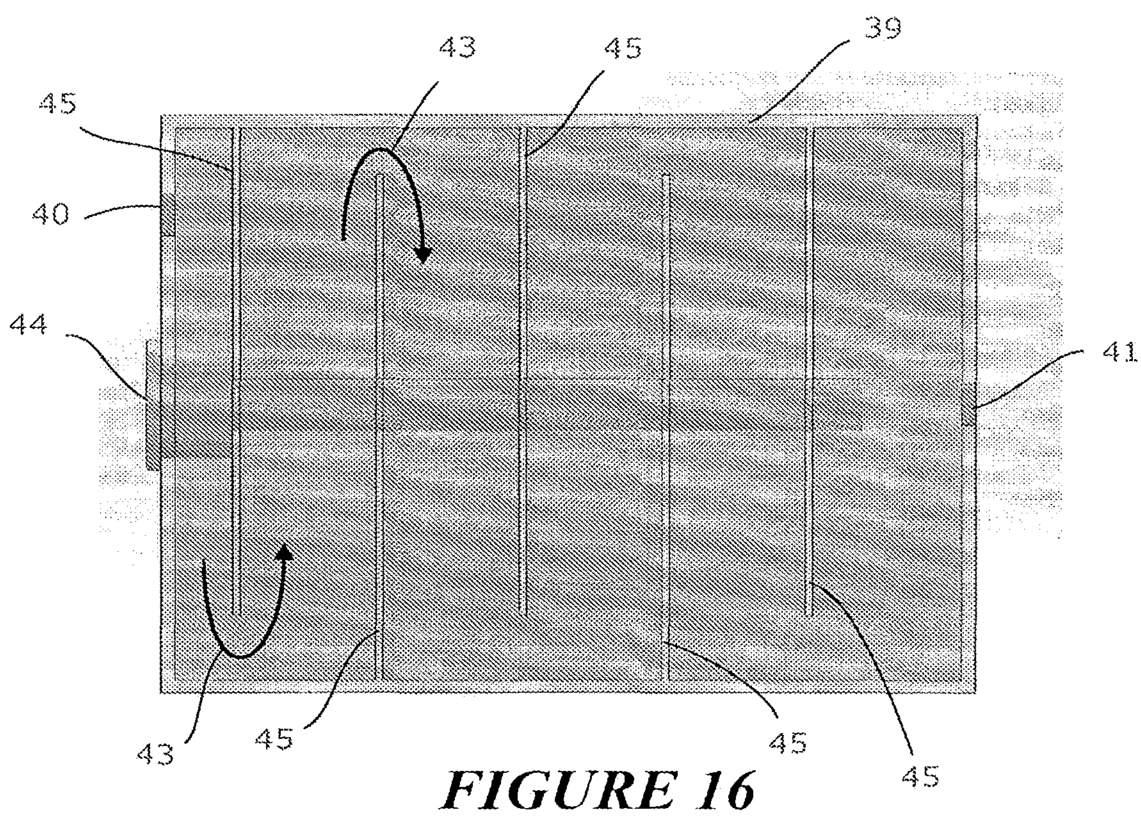
FIGS. 16 and 17 shows views of another embodiment of a chamber according to the invention.
Figure 17:
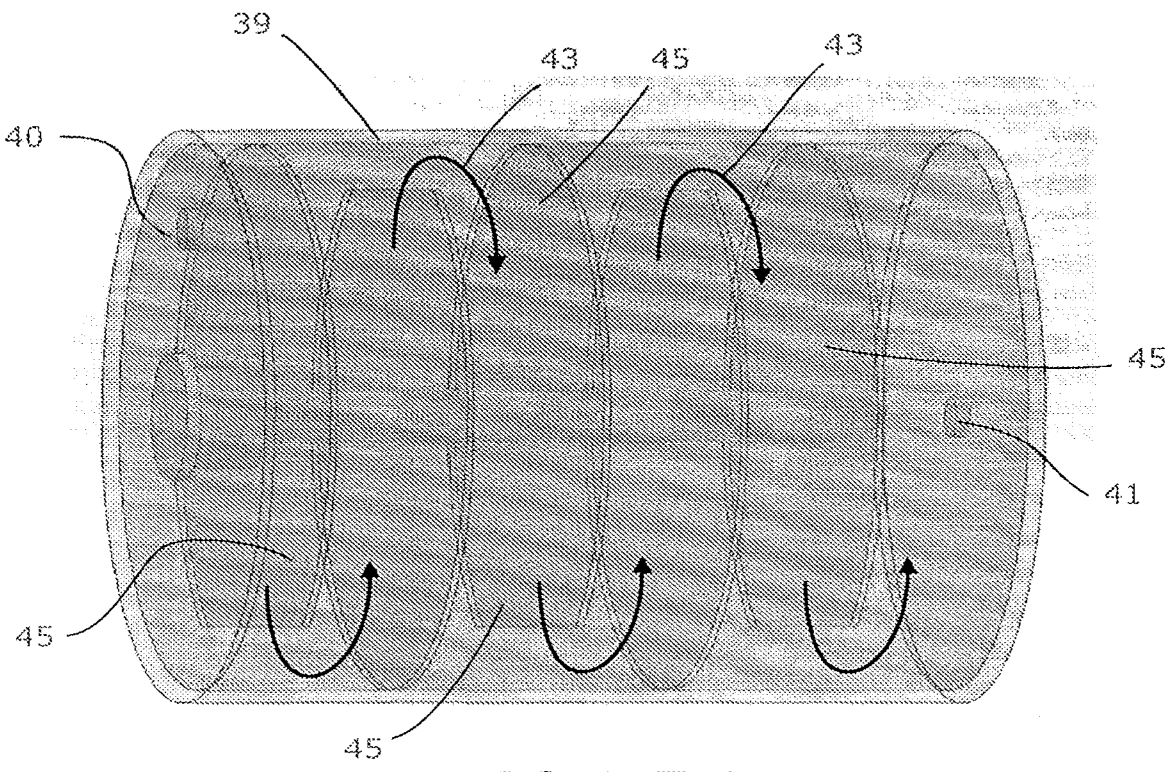

In other embodiments the baffle 45 may comprise a plurality of baffles 45, such as shown in FIGS. 16 and 17. As with the helical baffle of FIG. 15, baffles 45 of FIGS. 16 and 17 act to provide an increased distance of flow path 43 between the inlet 40 and outlet 41. The baffle or baffles 45 may also serve to increase the turbulence of the flow through the liquid flow path 43, in order to increase dissolution of gas into the liquid.

The chamber 39 may operate by modifying discrete volumes of liquid at a time. Where a discrete volume is to be modified at a time, the inlet 40 and outlet 41 of the chamber 39 are to be closed off following a substantial filling of the chamber with the duct flow of liquid delivered from the respective liquid source 1 or 2. A pressurised gas may then be introduced through the gas port 42 and outleted through the gas diffuser 44 for dissolution into the volume of liquid held within the chamber 39. Once a predetermined amount of gas has been dissolved into the liquid, the inlet 40 and outlet 41 are to be opened to allow liquid supply pressure from the inlet 40 to purge the volume of liquid from the chamber 39.

By the provision of a defined flow path 43, such as by a baffle 45 or set of baffles, the fresh inlet liquid from the inlet 40 may be substantially prevented from mixing with the volume of liquid held within the chamber 39.

Alternatively, the ducted flow of liquid may be continuously modified by the dissolution of gas into it as it flows through the chamber 39 between the inlet 40 and outlet 41.

Where the baffle 45 is in the form of a helical element the gas diffuser 44 may be provided in the form shown in FIG. 15. Alternatively the gas diffuser 44 may be provide as a helical element within the flow path 43 created by the helical baffle 45.

Figure 18:
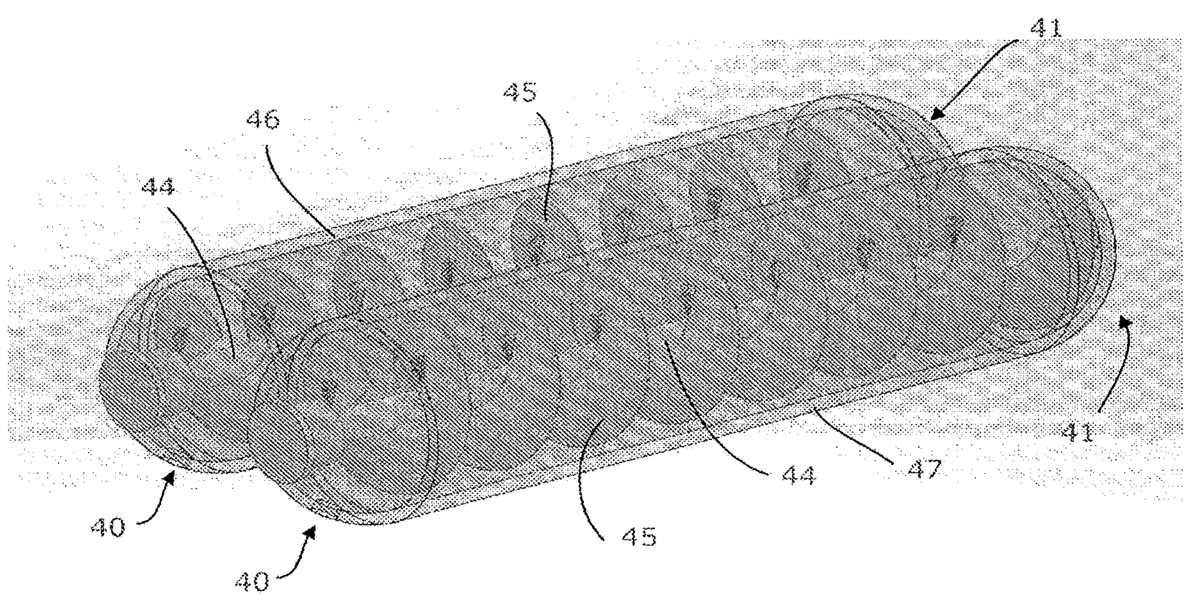
FIG. 18 shows an assembly of chambers according to another embodiment of the invention.
Figure 19:
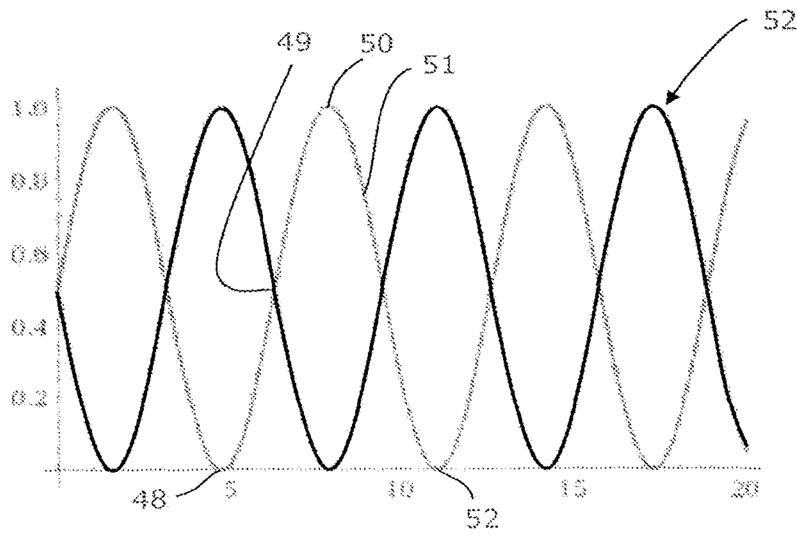
FIG. 19 shows a flow characteristic of an assembly of chambers according to an embodiment of the invention.

A flow modifier 11 may comprise one or more chambers 39. Shown in FIG. 18 is a first chamber 46 and a second chamber 47. The chambers of this embodiment comprise inlets 40, outlets 41, gas diffusers 44 and helical baffles 45. The first chamber 46 and second chamber 47 may be substantially separate. Alternatively they may be combined, such as by sharing at least part of a chamber wall.

Where the modification of liquid flow occurs by the modification of discrete volumes of liquid within a chamber 39 it is preferable that a plurality of chambers 39, such as the first chamber 46 and second chamber 47 of FIG. 18 are provided. When used in combination, a plurality of chambers may allow for the continuous dispensing of modified liquid. The operation of such a process is shown in the graph of FIG. 19. The horizontal axis represents a time scale and the vertical axis indicates between 0 and 1 the ratio or volumetric ratio of modified liquid that is in the chamber. A full cycling of a first chamber is shown by the arrows 48 to 52.

At a point shown by arrow 48 the first chamber has been emptied of modified liquid, which has been replaced by fresh unmodified liquid. At this point the inlet 40 and outlet 41 of the chamber are closed, and gas is introduced through the gas diffuser 44 for dissolution into the liquid volume. As time continues, such as at the point indicated by the arrow 49, the gas dissolves into the liquid until at point 50 the liquid reaches its desired proportion of dissolved gas. At this point the inlet 40 and outlet 41 are to be opened to cause a driving of the modified liquid from the chamber by the pressure at the inlet 40.

By providing a second chamber and operating it out of phase with the first chamber, as indicated by the arrow 52 and FIG. 19, a continuous outlet of modified liquid may be provided between the two outlets 41 of each of the chambers.

As has been described the flow modifier 11 according to the invention may be able to provide one or more selected modifications to at least one flow modifier input stream 12. However, in order to provide for the customisation of selectable modifications available to a user, to provide further options, or to update the options according to the trends of the time, one or more flow modifier expansion units may be provided.

Figures 20, 21:
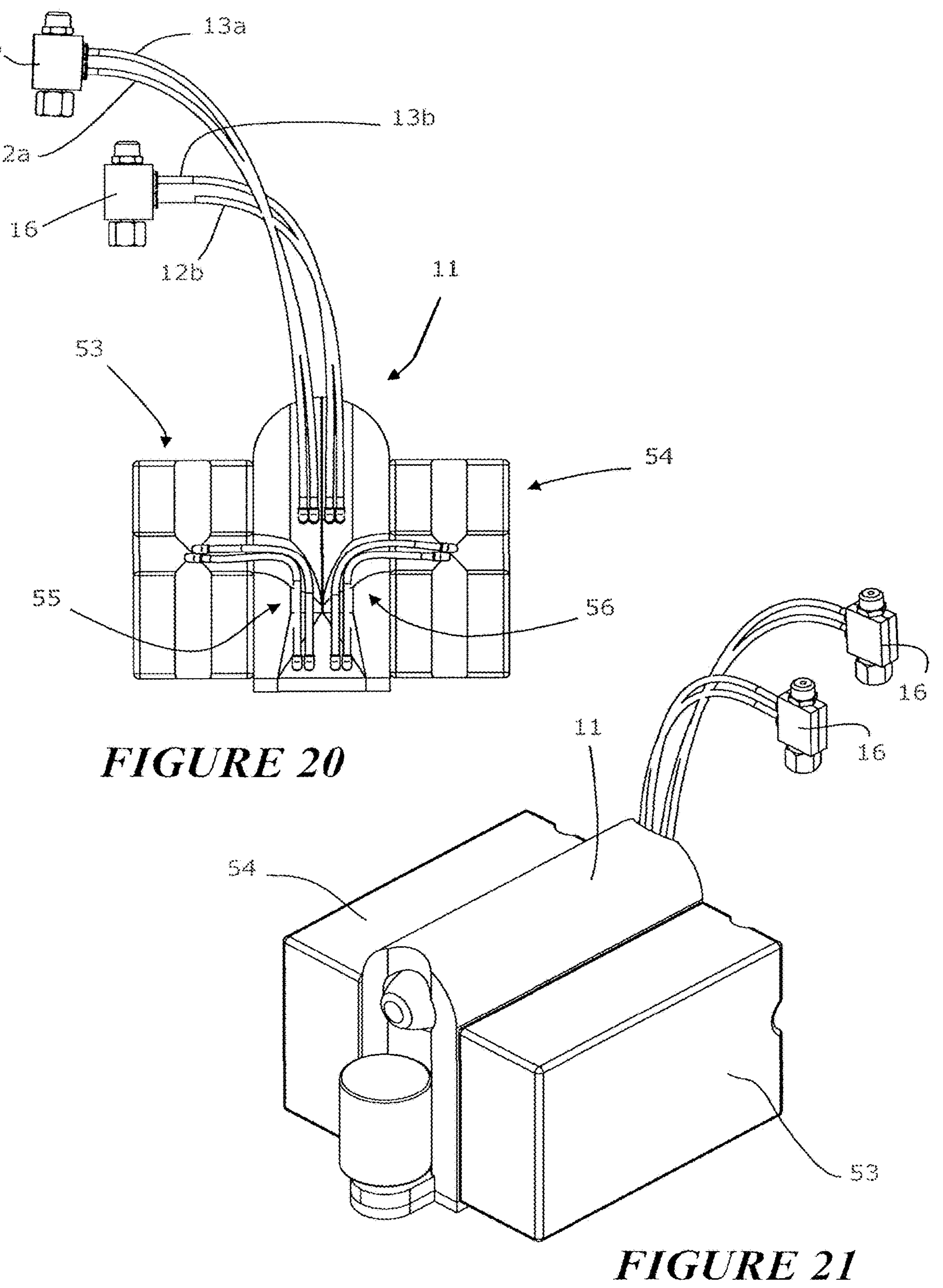
FIG. 20 shows a view of a flow modifier according to an embodiment of the invention.
FIG. 21 shows another view of the flow modifier of FIG. 20.

FIGS. 20 and 21 show two views of a flow modifier 11 connected to two flow modifier expansion units 53 and 54. Each of the flow modifier expansion units may provide some further selected modification. For example, expansion unit 53 may provide instant boiling of a flow modifier input stream 12 and expansion unit 54 may provide for chilling of a flow modifier input stream 12.

A flow modifier 11 preferably comprises one or more connection ports so that one or more expansion units may be directly ducted to the flow modifier 11. For example, as shown in FIG. 20 the expansion units 53 and 54 are connected by the respective ducted connections 55 and 56 directly to the flow modifier 11. Such a configuration has the advantage that additional selected modifications may be provided without any further changes to the plumbing of the liquid sources. As seen in FIGS. 20 and 21 the expansion units 53 and 54 are able to provide further selected modifications through the connections of the existing flow diverters 16.

In a further aspect, the invention relates to a diverter 16 and to a method of installation of a liquid control apparatus using one or more diverters 16. As described previously, the diverter 16 is for in-line installation with the liquid supply lines of a water distribution system.

The diverter 16 receives an input from a liquid supply line, and passes it to a liquid modifier outlet. At the liquid modifier outlet the diverter 16 is able to fluidly couple with a duct which passes the liquid to the liquid modifier 11 for selective modification.

The selectively modified fluid is then returned to the diverter 16 through a duct which is able to be fluidly connected to the diverter 16 at a secondary input of the diverter. The diverter then directs this secondary input of selectively modified fluid back into the downstream portion of the liquid supply line upon which it is installed.

The diverter 16 enables the operation of a liquid supply apparatus 8 as previously described without any modification to the plumbing or other hardware of the liquid distribution system than the in-line installation of the diverter.

The diverter is preferably able to be threadingly engaged with a liquid supply line of a liquid source, such as between an existing threaded connection of a water supply pipe and a flexible hose which leads to the flow controller 3.

Multiple diverters 16 may be provided in a combined form, rather than providing individual diverters for each liquid line.

In another aspect, the invention relates to a method of modifying the ducted flow of liquid from at least two sources of liquid. The at least two sources are preferably delivered under pressure. The modification is by a flow modifier 11 as described herein, which can modify the flow of liquid received and outputted to at least one outlet. According to the method, the flow of liquid of at least one said source of liquid at said flow modifier is modified in response to at least one flow sensed upstream of a flow controller operative on the follow of liquid from one of the liquid sources and downstream of the flow modifier.

According to the method the flow in response to which the at least one said source of liquid is modified in response to may comprise a predetermined flow characteristic as herein described.

The flow in response to which the at least one said source of liquid is modified in response to is preferably a flow sensed at each of the flow sensors 9.

The flow sensors 9 of the liquid control apparatus 8 as described herein may comprise any commonly available flow sensor. Preferably the flow sensors 9 are capable of sensing a flow rate, where the flow rate is either indicative of the presence or absence of a flow, or is a volumetric flow rate.

While in various preferred forms electrical power for the liquid control apparatus 8 is to be provided by the battery power source 20 of a consumable 17, a mains power supply may additionally or in alternative be provided. A mains power supply may be required for particular flow modifications, such as the chilling or instant boiling of water.

The liquid control apparatus 8 may be equipped with any commonly available form of electronic communication means such as WiFi, LoRa, Bluetooth, etc. These communication means may be utilized for additional functionality, such as communicating to a user the status of consumables 17 or 18, ordering replacement consumables from a provider, or communicating device status or fault messages to a user or provider.

The liquid control apparatus 8 may be equipped with a feedback device for providing feedback to a user to indicate that a flow modification has been commenced or ceased, or the nature of the flow modification which has been commenced or cased. The feedback device may provide one or more of visual, tactile, or audible feedback. For example, where the flow modification is to provide a boiling water output, the liquid control apparatus may provide a flashing light or an audible warning to a user.

While commonly referred to as a liquid control apparatus, various other terms may be used to refer to such a system such as a liquid modification device or a liquid treatment or conditioning system. Similarly, the part referred to as a flow modifier may also be known as a liquid conditioning module, liquid treatment module, or other such variants.

It will be understood that the flow controller may be any form of plumbing fixture such as a tap or set of taps, a single-outlet mixer or any other forms of plumbing outlets for dispensing liquids as are known in the art. The flow controller may also be known by other terms, such as a liquid outlet device or liquid supply fixture.

A further embodiment or variation of the other embodiments described herein will now be described, at least in part with reference to FIG. 2A.

A liquid control apparatus 8 is for selectively treating and/or substituting a liquid flow. The liquid flow may be passed from at least one of a plurality of supply lines 1, 2, for ultimate dispensing to a user by a liquid supply fixture 3.

While shown in FIG. 2A as comprising a single tap with a mixer 7, the liquid supply fixture 3 may be any form of plumbing fixture suitable for delivering a liquid to a user.

The liquid control apparatus 8 comprises a liquid conditioning module 11. The liquid conditioning module 11 is for in-line connection with at least one of the plurality of supply lines, such as the supply lines 1, 2 shown in FIG. 2A. The liquid conditioning module 11 receives a diverted liquid flow of the at least one supply line. This flow is received from an upstream portion of the line. The liquid conditioning module 11 outputs a selectively treated and/or substituted flow from to a more downstream portion of the supply line, relative to where the liquid conditioning module 11 receives the flow. The outputted flow is for dispensing to a user, either directly or subsequently to some further treatment and/or substitution.

At least one flow sensor 9 is provided. Each at least one flow sensor 9 is associated with a supply line. In some forms only one flow sensor 9 may be provided, this flow sensor 9 in association with only one supply line such as supply line 1 of FIG. 2A. In other forms, a plurality of flow sensors may be provided. For example, at least one sensor may be provided associated with the supply line 1 and in addition or alternatively at least one flow sensor may be provided associated with the supply line 2.

A controller 60 is associated with the liquid control apparatus 8. The controller 60 is configured to receive information from the at least one flow sensor 9. The information received is to be indicative of a flow of liquid in the supply line with which the flow sensor is associated.

The controller 60 is operable, upon the occurrence of a predetermined flow characteristic in the flow information provided from the at least one flow sensor 9, to activate the liquid conditioning module to treat and/or substitute the liquid flow from one or more of supply lines which are connected to the liquid conditioning module 11. The treated and/or substituted liquid flow or flows may then be provided to a user at the liquid supply fixture 3.

An application for the liquid control apparatus 8 may be on the water lines of a domestic or commercial plumbing system, such as may be found for example in a kitchen. While other applications are contemplated within the scope of the invention and also described herein, the liquid control apparatus 8 will now be described in relation to is application on plumbed water lines.

In some applications, such as in a kitchen, it may be desirable to provide for a heating of water to be supplied to a user. This heating may involve a heating of a liquid phase water, including to a boiling phase, or may also involve a heating to a steam phase. To this end, the liquid conditioning apparatus 11 may have a heater 61 as shown in any of FIGS. 22A-K.

FIGS. 22A-K show simplified flow diagram views of at least a part of a liquid conditioning apparatus 8. For example, the shown below-bench componentry may represent only one part of a liquid conditioning module 11. Other parts of the liquid conditioning module 11 as otherwise described herein may be incorporated with the embodiments of any of FIGS. 22A-K.

An example of such a configuration is shown in FIGS. 24 and 25, wherein the liquid conditioning module 11 comprises the heater 61 and associated parts and also other hardware such as for providing other treatments and/or replacements of liquid flows.

Both the heater 61 with its associated parts as will be described and any other hardware for providing other treatments and/or replacements of liquid flows such as the pumps 63 and/or 64, temperature sensors, and pressure sensors may be provided as a single liquid conditioning module 11, or variously as parts of the liquid conditioning module 11 or one or more expansion units. Example expansion units 53 and 54 are shown in FIGS. 20 and 21.

The heater 61 comprises a body to contain a volume of water to be heated. The heater 61 may be a heater for heating either a tanked volume of water, or for heating a continuous flow of water.

In some configurations the heater 61 may further comprise one or more heat exchangers 62 such as is shown for example in FIGS. 22E-I. The heater 61 may have a primary inlet for receiving inlet water from the liquid source 1 or 2 and a primary outlet for dispensing heated water. Where the heat exchanger 62 is present, it may be disposed in the body of the heater and comprise a ducted pathway between a heat exchanger inlet and a heat exchanger outlet.

For example, in each of FIGS. 22E-H the primary inlet of the heater 61 is plumbed to the liquid source 2, while the heat exchanger 62 is plumbed to the liquid source 1.

Alternatively, as seen in FIG. 221, the heat exchanger 62 and heater 61 may both be plumbed to the same liquid source 1.

The output of the heat exchanger 62 may pass either directly or indirectly through the same ducted pathway as the outlet of the heater 61, or may pass along a separate ducted pathway.

By this configuration of a heat exchanger 62 and heater 61, source water may be passed through the heat exchanger 62 from its inlet to its outlet and at least partially heated by the water in the heater body, yet not mixed with the water within the heater body. Such a configuration may be desirable for a number of reasons to be described subsequently, including but not limited to providing for the heating of two different liquids by one heater 61 or providing two heated liquid flows at two different temperatures or flow rates.

For some applications it may be desirable to provide a plurality of heaters 61, such as is seen in FIG. 223. These heaters 61 may be plumbed to the same liquid source 1 or 2, or as seen in FIG. 223 may be plumbed to different water sources. For example, liquid source 1 may be a domestic cold water supply, and liquid source 2 may be a domestic hot water supply.

Preferably the heat exchanger is provided as a coil or other shape so as to provide for increased surface area for heat exchange, and/or to provide for a desired distribution of the coil within the heater body to ensure effective heat transfer.

The liquid conditioning module 11 may also comprise one or more pumps. Such pumps may be included as part of embodiments also comprising a heater 61, or may be provided independent of a heater 61.

The liquid conditioning module may have first pump 63. It may also have a second pump 64. The pumps may be able to provide the same output characteristics, or alternatively they may provide different output characteristics. For example, the first pump 63 may be for providing a high pressure and low flow rate of liquid while the second pump 64 is for providing an at least relatively low pressure and high flow rate of liquid.

For example, the first pump 63 may have an output flow rate of approximately 2 ml/s to approximately 10 ml/s and a pressure of approximately 5 bar to approximately 15 bar. More particularly it may have an output flow rate of approximately 6 ml/s and a pressure of 9 bar.

The second pump 64 may have a larger flow rate. The second pump 64 may have a flow rate approximately an order of magnitude greater than the first pump 63 as exemplified above. For example, the second pump may have a flow rate of approximately 20 ml/2 to approximately 100 ml/s. The second pump 64 may also have an output pressure of approximately 0.2 bar to approximately 4 bar. More particularly it may have an output flow rate of approximately 60 ml/s and a pressure of approximately 0.5 bar to 2 bar.

These pumps 63 and 64 may be the same type of pump, or may be different types of pumps. For example, the first pump 63 may be provided as a vibratory pump. The second pump 64 may be provided as a vane pump.

Where one or both a first pump 63 and second pump 64 are provided, the pumps may be positioned in various different positions within the liquid flow paths of the liquid conditioning module 11.

Figures 22A, 22B, 22C, 22D:
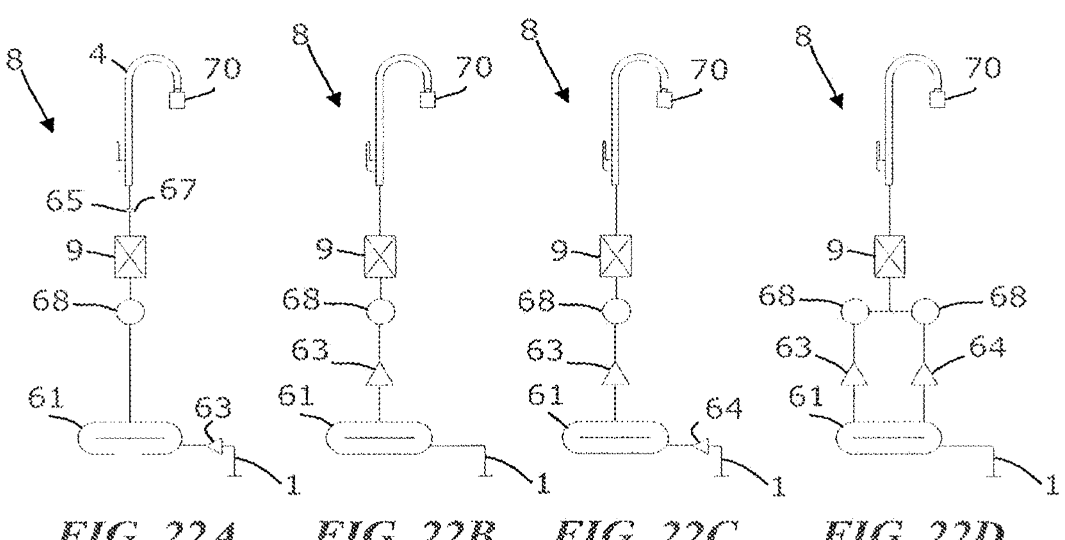
FIGS. 22A-K show exemplary flow diagrams of different embodiments of a liquid control apparatus, and particularly at least some parts of such embodiments involving the use of a heater.
Figures 22E, 22F, 22G, 22H:
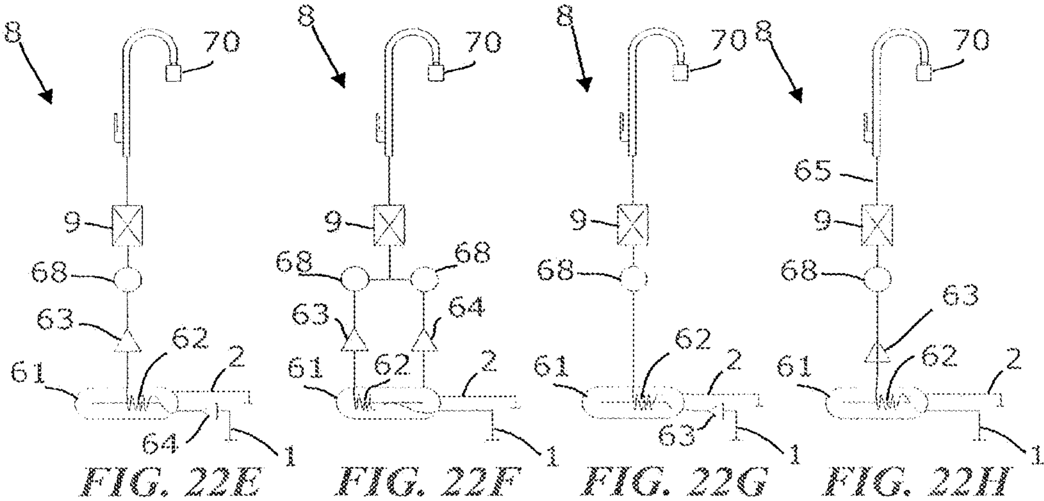

For example, in FIG. 22C or 22E the second pump 64 is located upstream of the heater 61, to pressurise water before it enters the heater 61. This allows the second pump 64 to pump water at a lower temperature than the first pump 63 which is shown downstream of the heater 61. Pumping of lower temperature water may result in less wear on the pumps. It may also allow the use of pumps not requiring a tolerance to high temperature water.

However, in some configurations it may be desirable to provide the heater 61 upstream of the pumps 63, 64. This may allow for a lower pressure capacity heater 61. Such a configuration is seen in FIG. 22D or 223.

The first pump 63 and second pump 64, where present, may be mounted in any number of possible configurations upstream or downstream of the one or more heaters 61, and plumbed to the same or different liquid sources. FIGS. 22A-K illustrate some such potential configurations.

In FIG. 22B, a single first pump 63 is provided downstream of the heater 61. In FIG. 22C, the first pump 63 is supplemented by a second pump 64 located upstream of the inlet to the heater 61.

In FIG. 22C, two pumps 63 and 64 are provided in parallel on outlets of the heater 61.

One or more non-return valves 68 may be utilised as necessary within the heating and/or pressurising system. For example, in FIGS. 22D, 22F, and 223 non-return valves 68 are used to prevent the flow of one pump returning backwards up the other pump line. Similarly, in for example FIG. 22A or 22E, a non-return valve 68 may also be utilised.

Each of FIGS. 22A-K show the application of a pressure sensor 9 on a portion of the ducted flow to provide flow information to the controller 60.

At least one temperature sensor may be used the liquid control apparatus 8. These sensors may allow the controller 60 various functions such as control over the temperature to which water is heated, control over the temperature of water which is dispensed to a user, or information on the temperature drop between the heater 61 and a liquid supply fixture 4.

For example, a first temperature sensor 65 may be provided at some location on the water line between the heater 61 and the dispensing point of the liquid supply fixture 4. Such a configuration is shown variously in FIGS. 22A, 22I and 22K. Particularly where only a single first temperature sensor 65 is used, it may be preferable to locate the temperature sensor 65 in as close proximity as possible to the dispensing point of the liquid supply fixture or tap 4.

Figures 22I, 22J, 22K:
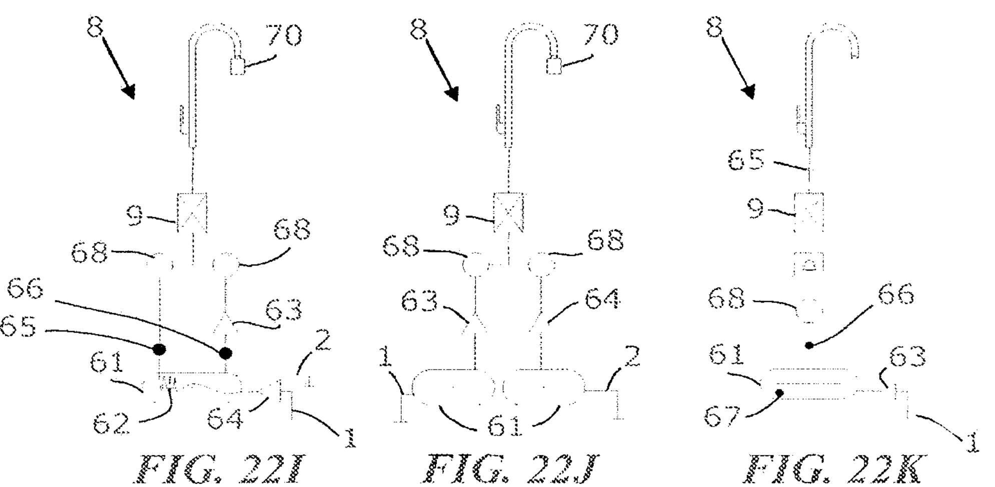

A second temperature sensor 66 may also be provided at some location on the water line between the heater 61 and the liquid supply fixture 4. Where both first and second temperature sensors 65, 66 are provided, they may preferably be located so as to measure the temperature of different parts of the system. For example, as seen in FIG. 221, the first temperature sensor 65 is located on the primary outlet of the heater 61, while the second temperature sensor 66 is located on the outlet of the heat exchanger 62. In FIG. 22K a first temperature sensor 65 is located adjacent the liquid supply fixture 4 and a second temperature sensor 66 is located just upstream of the heater 61.

One or more temperature sensors may also be located within other components of the system, such as within the heater 61.

While examples of the use of one or two different temperature sensors have been described, any plurality of temperature sensors in any combination of different locations are contemplated within the scope of the invention such that they enable the various functionalities of the liquid control apparatus 8.

Similarly to as has been described in relation to temperature sensors, the apparatus may comprise one or more pressure sensors 67. The pressure sensors 67 may be integrated with the one or more temperature sensors 65, 66.

A pressure sensor 67 may be provided within the heater 61.

In some configurations the apparatus comprise instead of the heater 61 or in addition to the heater a pressure tank to optionally heat water and store the heated water at an increased pressure. The pressure tank may contain water under pressure in both a liquid phase and a gas phase as steam. To this end the pressure tank may store liquid water at a temperature of over 100° C.

Where a pressure tank is provided, a pressure sensor 67 within the pressure tank may particularly be desirable.

A beverage preparation attachment 70 is shown by way of example in FIGS. 23A-J. The beverage preparation attachment 70 is for retaining one or more consumables to be used in the treatment or further treatment of a liquid flow. The attachment 70 may connect at any portion of one or more liquid supply lines downstream of the liquid conditioning module 11. Preferably, the attachment 70 is for connection to an outlet of a liquid supply fixture 4.

The attachment is able to receive a flow of liquid, most commonly water, from the outlet. The water is treated by the consumable, and then delivered to an outlet of the attachment where it is dispensed to a user.

The use of the attachment 70 may be in combination with a liquid control apparatus 8 as herein described, or may be for use independent of such an apparatus. For example, the attachment 70 may be for connection with the outlet of a liquid supply fixture or tap 4 such as is shown in FIG. 1.

Or, the attachment 70 may be for use on a liquid supply fixture 4 which is upstream coupled with a liquid control apparatus 8, such as is shown in the examples of FIGS. 22A-J. In such a configuration, the attachment is operable to provide a further treatment by the consumable, in addition to any upstream treatment and/or substitution provided by the liquid conditioning module 11 of the liquid control apparatus 8.

The beverage preparation attachment 70 comprises a receptacle 71 for receiving and containing at least one consumable 69.

Such a consumable 69 may be any substance suitable for providing a desired treatment, such as an addition to provide flavour, colour or other characteristics. For example the consumable may be one or more of coffee grounds, tea leaves, a syrup, a flavouring, or a gas for dissolution in the liquid.

The beverage preparation attachment 70 further comprises a mechanism operable on the receptacle between an open condition and a closed condition. In the open condition the receptacle 71 can be loaded or unloaded with a consumable 69. In the closed condition the receptacle is at least partly within a liquid flow path through the attachment. The liquid flow path runs from the outlet of the liquid supply fixture 4 to the outlet of the attachment 70.

By being disposed in the flow path, the consumable 69 may treat the flow, and thus provide the desired treatment to the dispensed liquid.

The receptacle 71 may further comprise a screen for retaining parts of the consumable having a grain size larger than the pore size of the screen, but allowing the passage of grains smaller than the pore size.

The consumable 69 may be provided in a pod or capsule 72. This may be the form of a sealed capsule, which may be desirable for ensuring the transport and preservation of the consumable 69. For example, such pods or capsules 72 are widely known in the art for use in the brewing of espresso coffee beverages.

The attachment when moved to the closed condition preferably punctures the capsule. The liquid flow may then be passed through the capsule in order to be treated by the consumable 69 before dispensing. Passing the liquid through the capsule may require forcing the water under high pressure, such as can be provided by the pump or pumps 63 and 64.

Where the attachment 70 is for use in the brewing or percolating of a hot beverage such as a coffee or a tea, it may be desirable that heated and/or pressurised water is passed through the consumable 69, in such a case coffee grounds or tea leaves.

Where the attachment is for use in combination with a liquid control apparatus 8, such heating and/or pressurisation of the water may be provided for by the liquid control apparatus as previously described. Examples of an attachment 70 potentially for use with a liquid control apparatus are shown in FIGS. 23A and 23H.

Where used in combination with a liquid control apparatus, various parts required to heat or pressurise, pump, sense the pressure, temperature or flow, or power such activities may be distributed variously between the liquid control apparatus 8 and attachment 70 in any variety of different configurations.

Figures 23A, 23B, 23C, 23D, 23E, 23F, 23G, 23H, 23I:
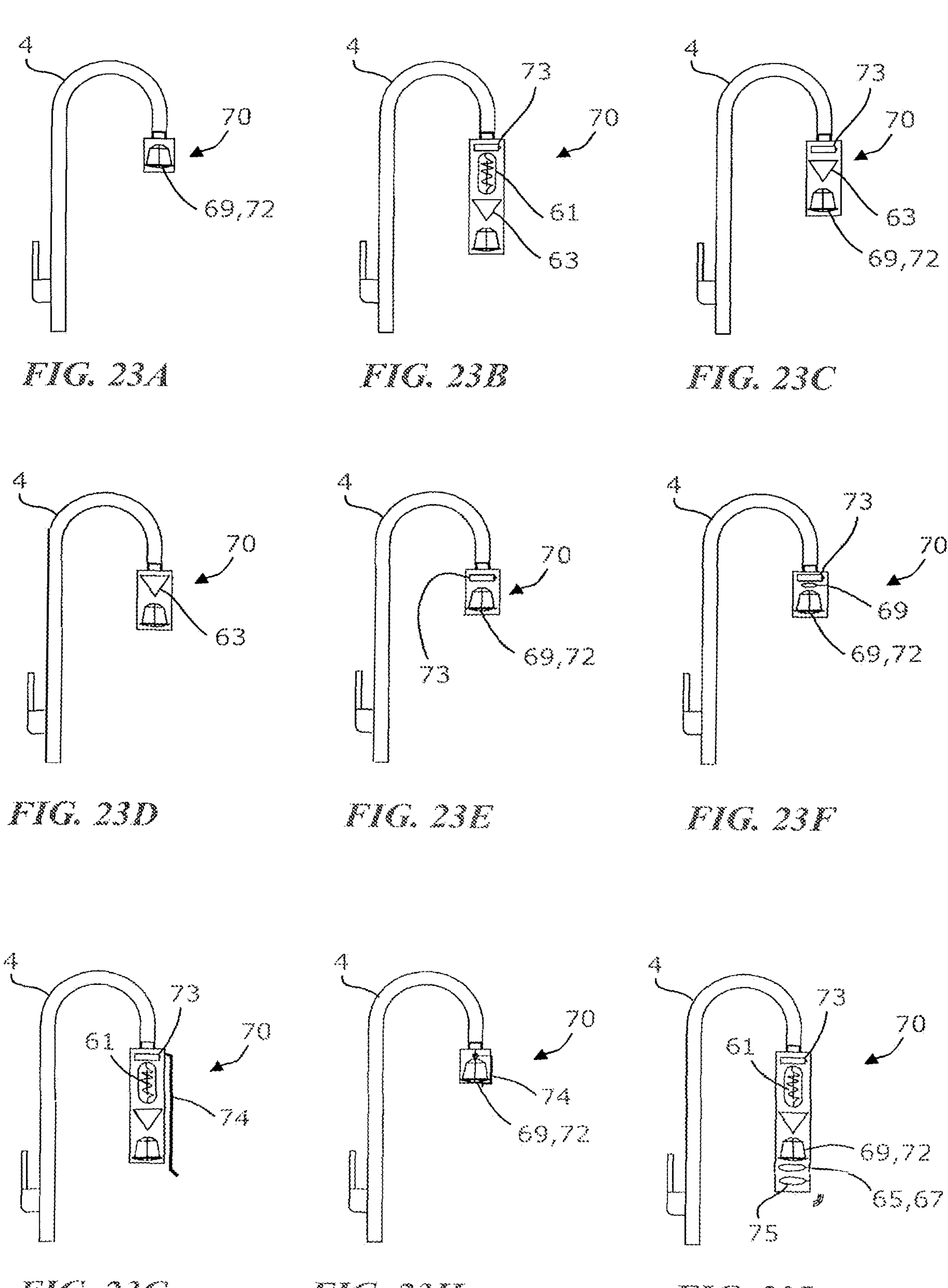
FIGS. 23A-I show embodiments of a beverage attachment for a liquid supply fixture.

For example, the attachment of FIG. 23A comprises only the receptacle and mechanism, and the heating, pressurising, pumping, and sensing as required are provided by a underbench liquid control apparatus 8 (not shown).

In FIG. 23D, any heating may be provided upstream of the liquid outlet fixture 4, while the attachment 70 comprises one or more pumps 63. This pump may comprise the functionality of either of the first pump 63 and second pump 64 as previously described.

FIG. 23C shows the configuration of FIG. 23D, but where the pump 63 has its own power source 73. This power source may be connected to an external source such as a wall outlet, or preferably may be a self-contained power source such as a battery.

FIG. 23B shows the configuration of FIG. 23D, but where the attachment 70 also comprises a heater 61. By way of a heater 61, pump 63, and power source 73 the attachment 70 of FIG. 23B may be operable as a stand-alone attachment for an otherwise unmodified plumbing system, e.g. one without a liquid control apparatus 8. To this end, the attachment 70 may comprise its own controller for controlling the function of the various components.

FIG. 23E shows the configuration of FIG. 23A, but further incorporating a power source 73. The power source 73 may be for powering the mechanism for opening and closing the receptacle of the attachment, for powering any sensing circuitry such as for receiving user input and/or powering a controller, or to provide an indication of the state of the device e.g. by a light or audible display.

The attachment of FIG. 23F has one or both of a pressure sensor 67 and temperature sensor 65 in addition to the configuration of the attachment of FIG. 23E. These sensors may provide input to a controller of the attachment 70, or may alternatively provide inputs to a liquid control apparatus 8 where present.

The attachment of FIG. 23G shows the configuration of FIG. 23B, but where the attachment 70 comprises a bypass pathway 74 for liquid flowing from the outlet of the liquid supply fixture 4. The bypass pathway 74 may allow for optional bypassing of any or all of the pump, heater, and consumable of the attachment 70.

The bypass pathway 74 may thus allow the dispensing of a liquid flow from a liquid source, either directly or as modified by a liquid control apparatus 8 if present, without passing through the attachment for further treatment. For example, the bypass pathway 74 may selectively allow for the dispensing of hot water, such as for adding to a shot of espresso coffee.

FIG. 23H shows the configuration of FIG. 23A as previously described, but where the attachment comprises a bypass pathway 74.

FIG. 23I shows the attachment 70 of FIG. 23B, further comprising one or more of a temperature sensor 65 and pressure sensor 79, and also a user input sensor 75. The user input sensor 75 may be for receiving an input from the user to control the operation of the attachment.

For example, the user input sensor 75 may comprise a button or set of buttons or other physical inputs. Alternatively, the sensor 75 may be operable to receive a signal from a wirelessly connected device, such as a user's smartphone.

The inputs from the user input sensor 75 may be utilised to control the operation of the attachment 70. It may in addition or alternatively be utilised to control the operation of a liquid control apparatus 8, where provided.

The attachment 70 is preferably to be operated upon the operation of the liquid supply fixture, and more particularly the flow controller 3 of the liquid supply fixture, to provide a predetermined flow characteristic of a flow of water within one of the liquid supply lines or the liquid supply fixture itself.

The predetermined flow characteristic may be any flow characteristic such as is elsewhere herein described.

An attachment 70 and an expansion module may be provided as a beverage brewing expansion kit for a liquid control apparatus 8. The expansion module is for the liquid conditioning module, as an expansion module as herein described. The expansion module may comprise any parts necessary to supplement the functionality of the existing liquid control apparatus to provide the desired treatment and/or replacement of the liquid flow to arrive at the desired brewed beverage.

For example, the expansion module may comprise one or more pumps and a heater.

Further views of an attachment 70 connected with a liquid supply fixture or tap 3 are seen in FIGS. 29A-B and 30A-B.

FIG. 29A shows an embodiment of an attachment 70 in a closed condition. FIG. 29B shows the attachment of FIG. 29A in an open condition. An opening is visible, for allowing access into the receptacle 71.

FIGS. 30A and 30B show a cross-sectional view of an attachment 70 the receptacle 71 and a consumable contained 69 within a pod 72 are visible. FIG. 30A shows the attachment 70 in a closed condition, while FIG. 30B shows the attachment in an open condition.

FIG. 24 shows an embodiment of a liquid control apparatus 8 with a heating and pumping arrangement expanded. The remainder of the liquid control module 11 is within the box at left of the figure. The heater 61 and pump 63 function as previously described.

FIG. 25 shows a variant of the heating and pumping arrangement of FIG. 24. The arrangement has a milk reservoir 76. The milk reservoir optionally has a frothing element 76 for frothing the milk.

The milk can be passed from the reservoir 76 to the second heater 78 which may either directly heat the milk or indirectly heat it by heat exchange.

The milk can then be pumped to the attachment 70 or directly to be dispensed to the use by the pump 63.

Methods of brewing a beverage using a liquid control apparatus 8 and/or attachment 70 will now be described. Such a method preferably involves the sensing of a predetermined flow characteristic of the flow information of one or more flow sensors. These flow sensors are associated with at least one and preferably each of the liquid lines connected to the liquid supply fixture or tap 4.

Upon sensing such a predetermined flow characteristic, the apparatus 8 or attachment 70 variously are to be activated to prime their pump. The priming of the pump preferably pumps a heated and pressurised supply of water to the liquid supply fixture 4.

Where the water line or lines downstream of the heater already contains water, the step of priming may involve the discharge of the non-heated portion of the water. This discharge may be to a drain as will later be described, or may by the outlet of the liquid supply fixture 4 or the attachment 70.

For example, where the attachment 70 comprises a bypass pathway 74 the downstream non-heated water may be drained through the bypass pathway.

Once the heated water has been primed to the attachment 70, a pump is activated to the heated water through the consumable, such as coffee grounds, to create the brewed beverage. This pumping may be provided by a first pump 63 as previously described.

Either or both of the steps of priming and pumping to create the brewed beverage are preferably conditional upon either or both of the attachment 70 being in a closed condition, and a consumable being detected within the receptacle 71 of the attachment.

Further, the entire method may preferably be dependent on some user input to initiate the method. For example, this may include a command by a user for the brewing of a beverage to commence.

The step of priming may be stopped once the hot water is sensed at or near to the outlet of the liquid supply fixture 4. For example this may be sensed by a temperature sensor 65 or 66 within the attachment 70. Alternatively, the stopping of the priming step may be stopped dependent on a second predetermined flow characteristic. For example, a user may operate the flow controller 3 to provide this second predetermined flow characteristic.

Similarly, stopping the step of pumping to create the beverage may be provided by a third predetermined flow characteristic.

Alternatively, stopping may occur upon the pumping of a predetermined volume of water. For example, the pumping may stop upon the pumping of a volume of water equal to a beverage to be brewed.

The entire method may be able to be ceased at any point by the sensing of a fourth predetermined flow characteristic.

Alternatively, the entire method may be able to be ceased at any point if the pressure of one or more of the supply lines decreases by a predetermined amount.

Where appropriate, any of the first, second, third, and fourth flow characteristics may be the same characteristics or different characteristics.

A predetermined flow characteristic is preferably a characteristic of the flow information received from one or more flow sensors 9. This characteristic may comprise one or more combinations of flow sensor readings. These flow sensor readings may be simultaneous or sequential. These flow sensor readings may be either instantaneous, or occurring over a predetermined period of time.

The predetermined flow characteristic may for example comprise any one or more of the following sensor readings:

a) A constant flow of at least one flow sensor, including a constant substantially zero flow and a constant substantially maximum flow.

b) A fluctuation of flow of at least one flow sensor.

c) A pattern of fluctuations of flow of at least one flow sensor.

In an application with two liquid supply lines an example predetermined characteristic may comprise a simultaneous or substantially simultaneous zero or substantially zero flow sensed of a first flow sensor associated with the first supply line and a fluctuation of flow of a second flow sensor associated with the second supply line. The fluctuations may be a plurality of fluctuations. The fluctuations may be a fluctuation between any two flows, but preferably substantial differences in flow between a zero flow condition and a maximum flow condition.

The fluctuations may be a plurality of fluctuations between a substantially zero flow and a substantially maximum flow. The fluctuations may be a plurality of fluctuations between a substantially zero flow, a substantially maximum flow, and a return to a substantially minimum flow.

Where there are a plurality of predetermined flow characteristics, each flow predetermined characteristic may comprise of a different number of a) fluctuations between a substantially zero flow and a substantially maximum flow, and/or b) fluctuations between a substantially zero flow, a substantially maximum flow, and a return to a substantially minimum flow.

Any of the fluctuations or patterns of fluctuations may be required to be provided within a predetermined time period in order to be considered as a predetermined time period.

Preferably at least some of the predetermined flow characteristics, and in particular those associated with an initiation of a treatment and/or substitution of a liquid flow, are flow characteristics not commonly associated with the use of a hot and cold tap of a plumbed faucet, such as may be found in a kitchen.

A set of examples of possible predetermined flow characteristics and associated actions of an embodiment of a liquid control apparatus 8 will now be described. The liquid control apparatus 8 of this embodiment may be associated with a conventional tap 4 having two inlet supply lines, a cold water supply and a heated water supply. This tap 4 may have individual handles for operating a valve associated with each line. Preferably it has a single mixer operable to control the dispensing of both supply lines.

A "normal" operation of the mixer, from an off state to an on state on either full-cold, full-hot, or some combination of the two may be associated with no modification of the flow by the liquid conditioning module 8. Rather, the flow from the liquid sources 1, 2 may either directly or indirectly be passed to the tap 4.

Other operations of the mixer which would not be associated with normal use by a user may then provide various selective treatments and/or replacements.

For example, the mixer may be set at the full-cold position then in quick succession turned on, off, and back to on. This may activate a first treatment, for example a filtering of the cold water flow.

Turning the mixer when at the cold position on, then off, then on, then off, then on, effectively pumping the mixer to the on position three times in quick succession, may activate another treatment. For example, it may activate a carbonation.

The same set of operations on the mixer set to the full-hot setting may provide another set of treatments. For example, turning the mixer on twice in quick succession may activate a boiling water flow. Or, turning the mixer on three times in quick succession may activate a program associated with the brewing of a beverage.

Turning the mixer on a plurality of times, or at least fluctuating the flow a plurality of times, may be used when the mixer is in a full-flow position on one line, e.g. the cold line. Alternatively, it may be used at any desired ratio or range of ratios of flow of the two lines relative to each other.

While particular treatments have been described in this embodiment as associated with particular sets of operations of the mixer by a user, it will be appreciated that any arrangement or combination of these associations may be contemplated within the scope of the invention.

As previously described, the fluctuation may also be a fluctuation between the two lines. For example, this may include an operation of the mixer in the on position between some hot-line flow and some cold-line flow in quick succession.

Figure 27:
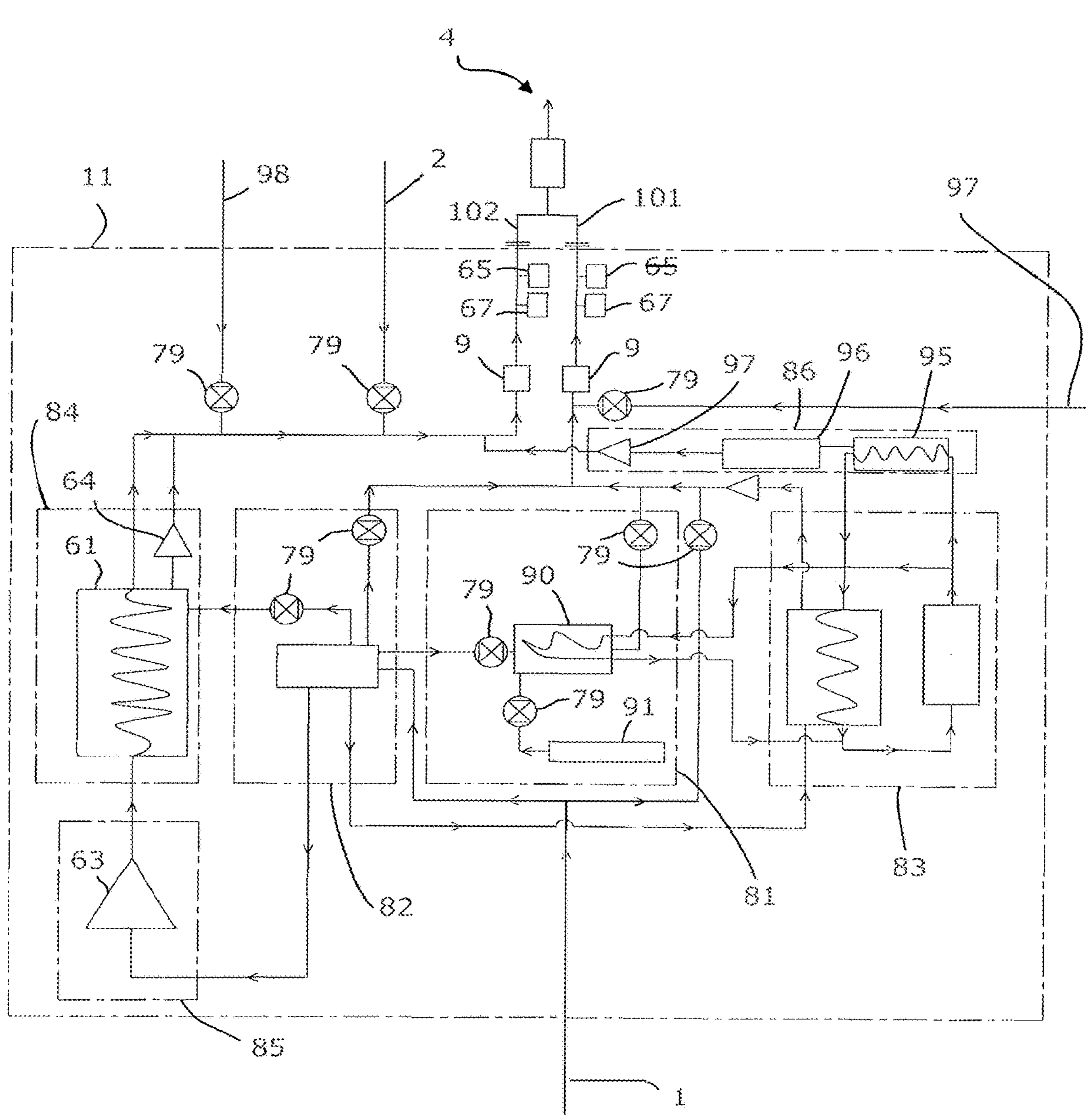
FIG. 27 shows an example piping and instrumentation diagram of an embodiment of a liquid control apparatus.

A simplified piping and instrumentation diagram of an embodiment of a liquid control apparatus 8 is shown in FIG. 27. The liquid control apparatus 8 may be for use with an attachment 70 (not shown) as herein described at the tap 4.

A liquid conditioning module 11 is shown in FIG. 27. This module is comprised of several component systems. While FIG. 27 will be described with these component systems as individual expansion modules as previously described, it will be appreciated that these component systems may be provided as parts of a unified module 11. Additionally, while FIG. 27 shows a module 11 comprising each of these sub-systems, it will be appreciated that these sub-systems may be substituted or combined in any manner within the scope of the invention.

The liquid conditioning module 11 in FIG. 27 receives input from a supply line 1 at bottom, and the liquid supply line 2 at top. In other forms, the module 11 may receive input from only one of the supply lines 1 and 2.

As seen in FIG. 27, the supply line 1 liquid is passed as an input stream to each of the various expansion modules.

The liquid conditioning module 11 of FIG. 27 outlets to downstream supply line portions 101 and 102 of the respective first supply line 1 and second supply line 2.

A first expansion module 81 is for providing carbonation or other gas dissolution of a liquid flow. As seen in FIG. 27, this first expansion module 81 comprises a carbonation tank 90 which receives inlet water and compressed gas from the gas cylinder 91. The carbonation of the supply line 1 water and its outputting to the tap 4 are selective based upon the operation of the various valves 79.

A second expansion module 82 is for providing a selective filtering of the supply water. A filter 92 is provided through which the water may be passed. The filter 92 may have multiple outlets, such that it may either directly feed the tap 4 or may feed into another expansion module. For example as seen in FIG. 27, the second expansion module 82 supplies the inlets of each of the first, third, fourth, and fifth expansion modules 81, 83, 84 and 85 respectively. This may be desirable, for example to provide a filtered flow of water for brewing a coffee.

In other forms the various expansion modules may selectively receive an input from the second expansion module 82, directly from the supply line 1, or from any other expansion module.

A third expansion module 83 is for providing a selective chilling of the water. The third expansion module 83 is shown having a cooler 93 and a cold water tank 94. The chiller 93 may for example cool the water tank 94 water by heat exchange.

The carbonation tank 90 of the first expansion module 81 may also be cooled. This cooling may be provided by an independent cooler within the first expansion module 81, or the expansion modules may be interconnected to share such resources. For example, in FIG. 27 the cooler 93 of the third expansion module 83 is able to pass coolant through the carbonation tank 90 in addition to the cold water tank 94. In FIG. 27 the cooler 93 is also shown cooling parts of the fifth expansion module (yet to be described). Such functionality may be selective as determined by the controller.

A fourth expansion module 84 is for heating or preferably boiling water. The module has a heater 61 which received water from the second expansion unit 82 and heats it as previously described. A pump 64 is shown for pumping the water from the boiling water tank of the heater 61 to the tap 4. The heater 61 is shown as also having a heat exchange coil for heating water passed to it by a fifth expansion module 85.

The fifth expansion module 85 is for providing a high pressure suitable for brewing an espresso coffee. The fifth module is shown having a pump 63 as previously described, suitable for providing a high pressure and low flow rate. The pump 63 receives input water, optionally from the filter of the second expansion unit 82, and passes its outlet to the heater 61 for heating as previously described.

A sixth expansion module 86 is also shown. The sixth expansion module 86 is for preparing milk, such as for addition to a coffee or tea or other brewed beverage. A milk container 95 is provided for containing milk. Preferably this container is able to be filled by a user.

The milk container 95 may be cooled by heat exchange, such as by the cooler 93 of the third expansion module 83 as seen in FIG. 27.

A frother and/or warmer 96 receives milk from the milk container 95 and optionally heats it or froths it. The milk may then be pumped by a pump 97 to the tap 4. The milk may be passed through a dedicated line, or may be pumped through the same line as other water.

A seventh expansion module 104 is also shown in FIG. 27. As seen in FIG. 27 this module comprises a UV filter. This filter may provide a UV screening of fluid to be outlet from the liquid conditioning module 11, such as to kill bacteria and other organic life. This filtration may preferably be selectable. While shown at the most downstream portion of the liquid conditioning module 11 such as to be able to act on the outlets of all other respective expansion modules, the seventh expansion module 104 may be located in any other desired location within the liquid control apparatus 8.

The various expansion modules may pass their outputs to either or both of the downstream first supply line 101 or downstream second supply line 102. The selection of the output location may be determined at least in part by the predetermined flow characteristic selected to initiate a particular treatment function by the liquid conditioning module 11.

The liquid conditioning module 11 may have inputs for other fluid sources on either or both liquid supply lines 1 and 2. For example, the downstream first supply line 101 may selectively receive an input from an alternate fluid source 97. Similarly, the downstream the second supply line 102 may receive an input from an alternate fluid source 98.

The selection of each of these alternate fluid sources 97, 98 and each of the supply lines 1, 2 may be determined by respective associated valves 79.

Each downstream supply line 101, 102 may have associated with it one or more temperature sensors 65, pressure sensors 67, and flow sensors 9. Additional temperature, pressure, flow, or other sensors may be provided in the liquid conditioning module 11, expansion modules, or elsewhere in the plumbing to or at the liquid supply fixture 4 as required.

Each expansion module may pass liquid through them and to the tap 4 using a pressure of the liquid supply line 1. Each or various modules may alternatively or in addition comprise pumps as needed to supply or boost pressure to aid in the treatment and/or replacement at each expansion module or provide the desired delivery characteristic at the tap 4.

At least some functionality of the liquid control apparatus 8 is to be determined dependent on the sensing of a predetermined flow characteristic within the supply lines 1 or 2, or respective downstream portions 101 and 102 of those supply lines.

In some embodiments, this functionality may include the activation of the apparatus, the selection of the treatment to be provided, or the cessation of any treatment being provided.

In some embodiments the apparatus 8 may comprise additional or alternative user inputs for control of functionality. Various examples of such user inputs are shown in FIGS. 28A-H as part of an apparatus 8 installed on a liquid supply fixture or tap 4, basin 5, and liquid supply lines 1 and 2. The apparatus 8 may be used alone or in combination with an attachment 70.

Figures 28A, 28B:
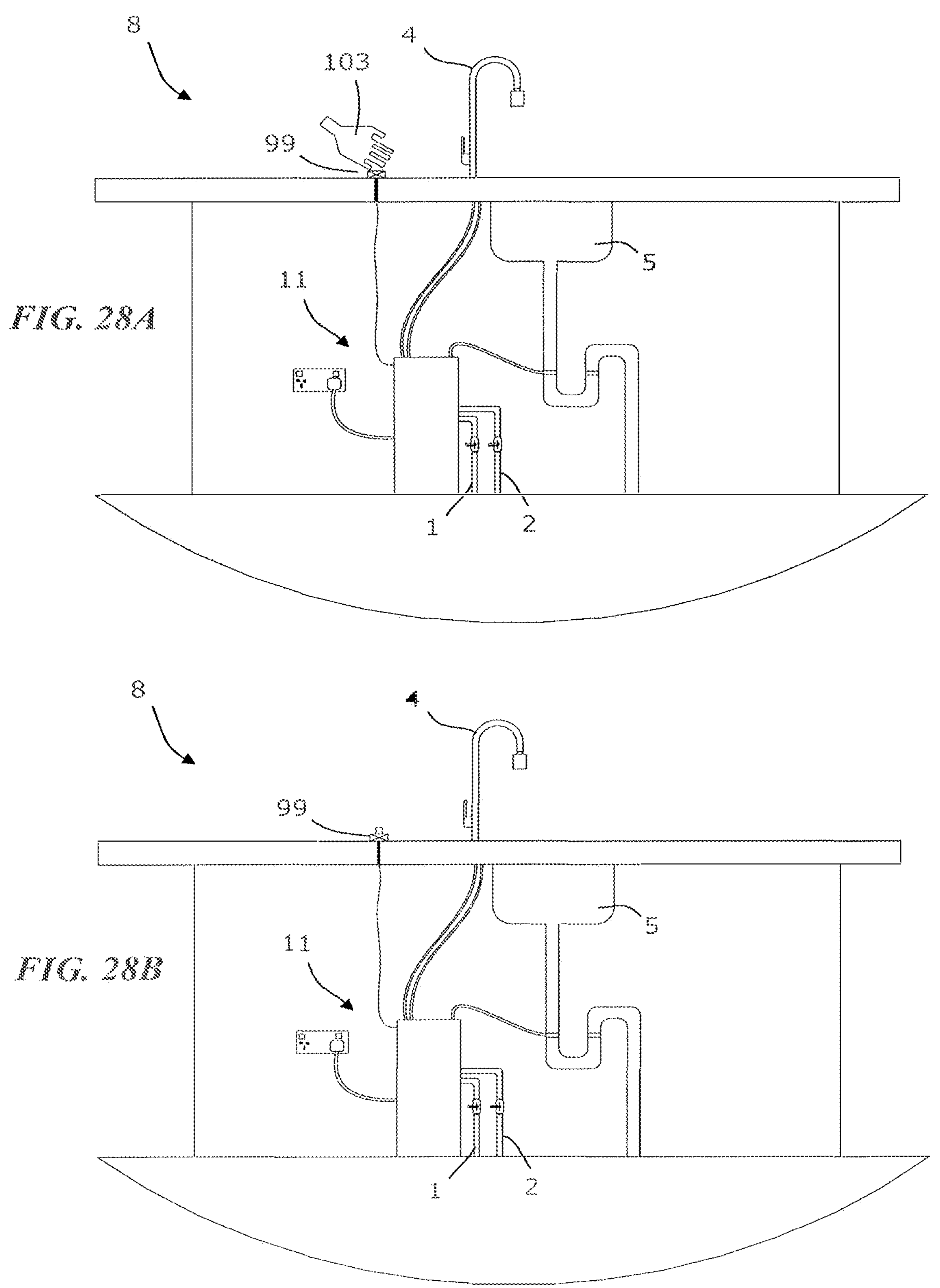
FIGS. 28A-H show various exemplary embodiments of a liquid control apparatus.
Figures 28C, 28D:
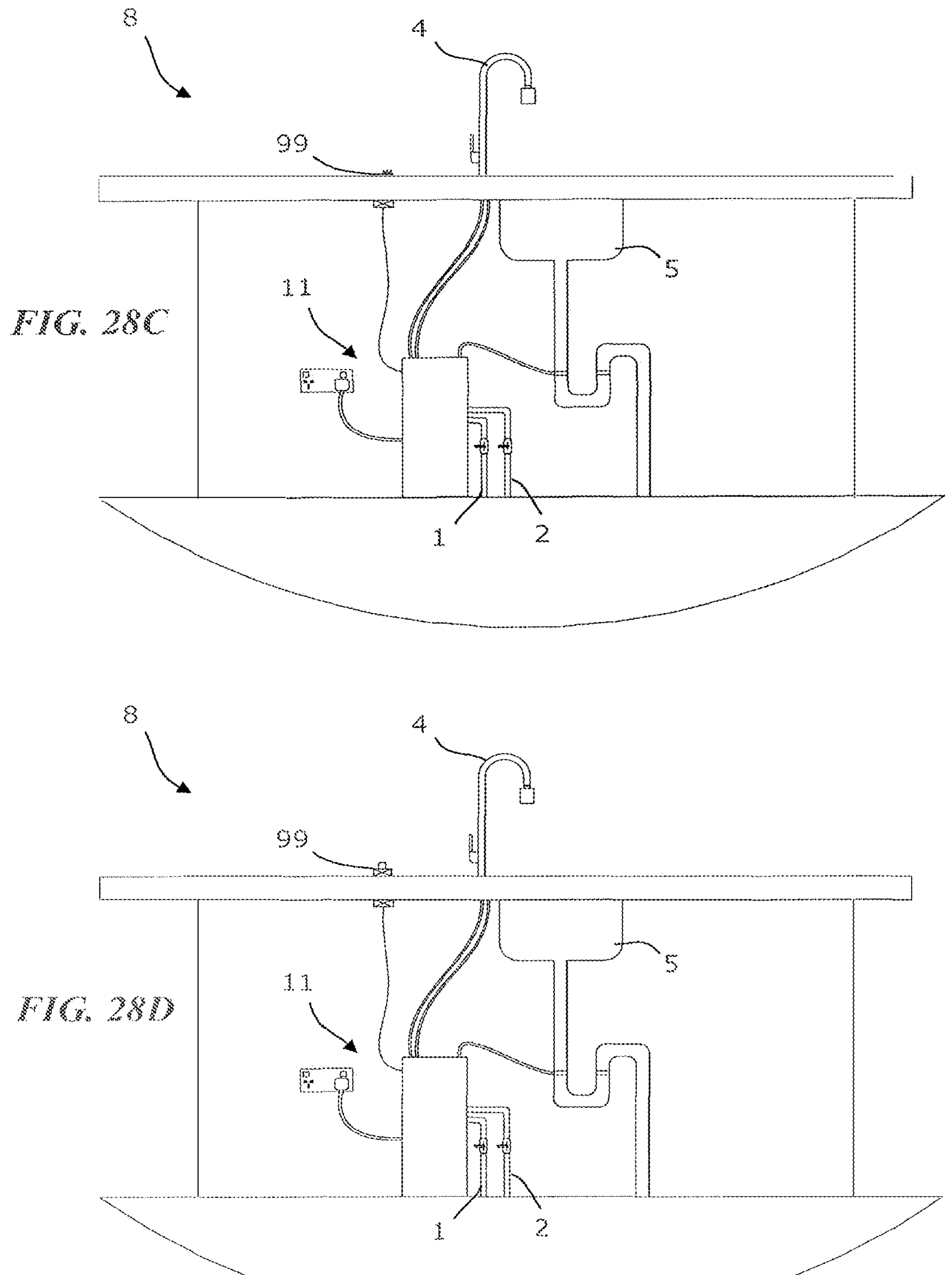

In FIG. 28A an input device 99 is connected to the liquid conditioning module 11 to receive an input from a user 103. In FIG. 28B the input device 99 is shown as a push-button. In FIG. 28C the input device 99 is shown as a bench-top device which wirelessly communicates with a receiver below the bench.

FIG. 28D shows the configuration of FIG. 28B, but where the input device 99 communicates with a receiver rather than physically passing through the bench top.

Figures 28E, 28F:
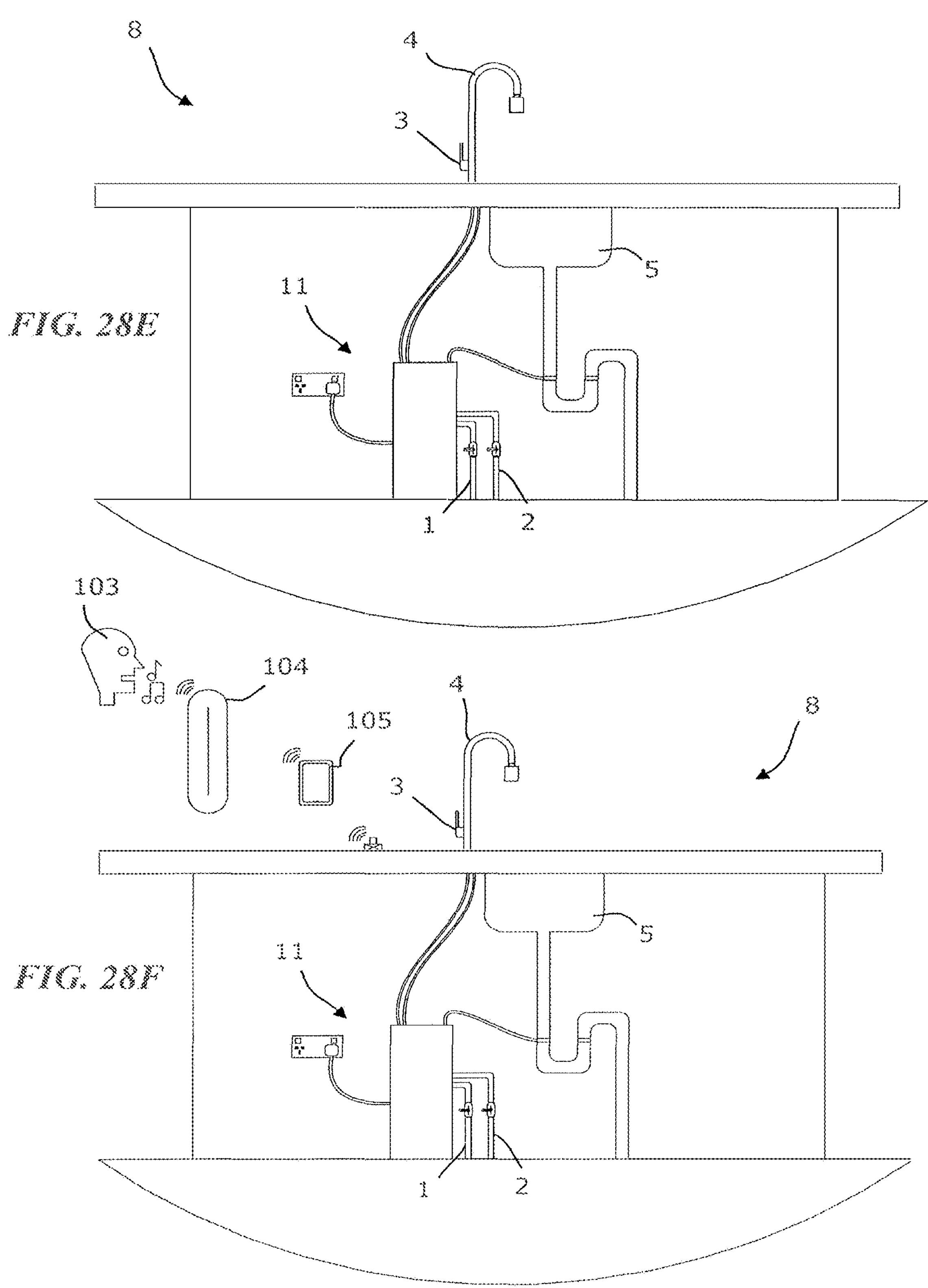
Figures 28G, 28H:
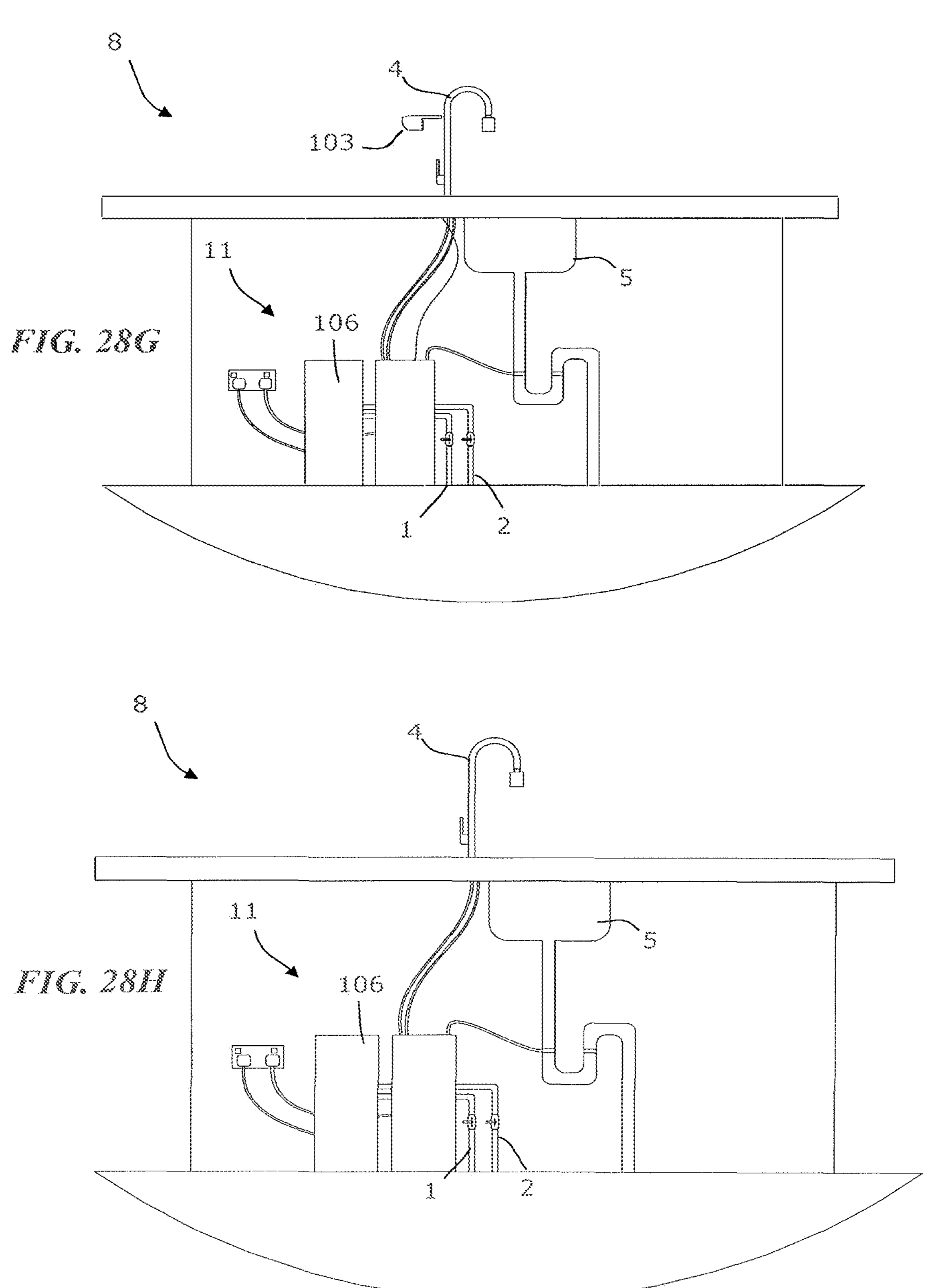

FIGS. 28E and 28H show embodiments where in the flow controller 3 of the tap 4 provides the sole input to the liquid control module 11.

In FIG. 28F the input device 99 receives an input wireless from either the voice of a user 103, a smartphone 105, or another wireless device 104 such as a smart home controller. The input device 99 may transmit these signals either by wire or wirelessly to the controller of the liquid control apparatus 8.

In FIG. 28G the liquid supply fixture 4 itself comprises the input device 99. For example, the tap 4 may have a touch sensor or other buttons. These may be operable to activate the liquid conditioning module 11 to provide a particular treatment or control other functionality as previously described.

In both FIGS. 28G and 28H the liquid conditioning module 11 is shown as also comprising an expansion module 106.

The liquid flow to a liquid control apparatus 8 is preferably diverted from the at least one supply line to the liquid conditioning module, and returned to a downstream portion of the supply line.

This diversion may utilise a diverter 16. The diverter 16, as previously described, is for in-line installation on a supply line.

While the diverter 16 may be solid-state, such that all flow of the upstream supply line is directed to the liquid conditioning module, the diversion may optionally be a selective diversion.

The diverter 16 may be controlled, either manually or by the liquid control apparatus 8, to selectively divert all or some liquid flow from the liquid source and to the liquid conditioning module. Alternatively, it may divert all or some liquid flow form the liquid source to the downstream portion of the liquid supply line directly, without passing through the liquid conditioning module.

It is common in conventional plumbed liquid supply setting, such as in a kitchen, to have a plumbing connection to a drain for disposing of waste liquids. For example, a conventional sink 110 and drain 111 are shown in FIG. 26A. The drain 111 comprises a p-trap 112 to prevent gas back-flow from the drainage system to the sink 110.

In some situations it may be desirable to connect to the drain 111 to dispense of waste fluid, but to do so from a source other than the sink 110. To this end, an in-line drain assembly 113 may be provided.

An in-line drain assembly is for installation on both sides of a p-trap 112 to allow for at least one plumbed inlet to the drain 111 in addition to a sink 110.

An in-line drain assembly 113 may comprise two parts 114 and 115 to act together as an extension of the p-trap 112 from the remainder of the drain 111. To this end, the two parts 114 and 115 may be of the same or substantially the same length. Such a configuration may be desirable to maintain an original orientation of the p-trap 112 relative to the drain 111, and not introduce any relative angular displacement between the p-trap 112 and the drain 111 either side of it.

The two parts 114 and 115 are each for interfacing on a respective side of the p-trap 112 between the p-trap 112 and the originally connected drain 111. An example of this is seen in FIG. 26B.

In some conventional p-trap arrangements the p-trap connects with the drain 111 by a screw connection. In these configurations, the two parts 114 and 115 may be threaded so as to engage on either side with a part of the drain 111 and the p-trap 112, respectively.

At least one of the two parts 114 and 115 have at least one inlet. The or each inlet to optionally receive a liquid waste.

For example, in FIG. 26B, the first part 114 has an inlet from a secondary waste line 116.

In various embodiments, a liquid control apparatus 8 and particularly the liquid conditioning module 11 may be plumbed to a drain connection. For example, it may be desirable to drain a volume of water from a line to the tap 4 before the line is primed with a desired treated and/or substituted liquid flow. This could for example take the form of draining cold water present in a water line before priming the line with heated water. Alternatively, it could take the form of purging a remaining amount of milk or other treated or substituted flow from the line to a tap 4 at the end of dispensing the treated or substituted flow.

In such configurations, an in-line drain assembly 113 as previously described may be provided in association with a liquid control apparatus 8.

A secondary waste line 116 may be for connection to the liquid conditioning module 11. Such adaptations as desired may be made to the liquid conditioning module 11 and/or any expansion modules to enable the draining and preferably selective draining of liquid flows to the downstream drain 111.

A universal connector or attachment interface device 120 is for connecting to a tap 4, and allowing the optional connection of an attachment. An example of an attachment interface device or universal connector 120 is shown in FIGS. 31A-C.

The universal connector has a first end 121 for connecting to a tap outlet by a first end interface 123. As seen in FIGS. 31A and 31C, the first end interface 123 comprises a threaded connection. This threaded connection may be in one or a range of standardised thread configurations to couple with the threads of a commercially available tap.

Figures 31A, 31B, 31C:
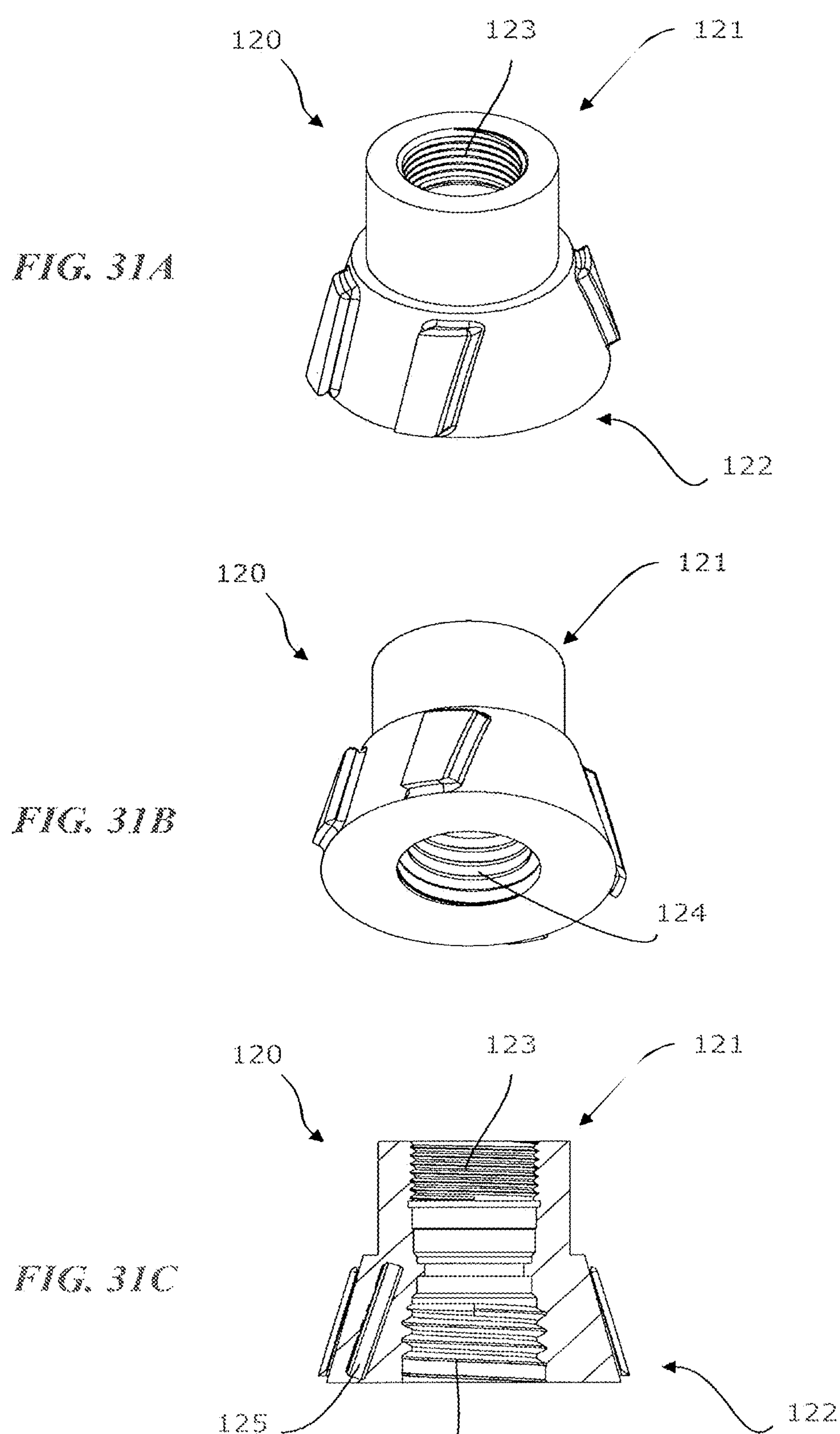
FIGS. 31A-C show views of a universal connector.

While shown in FIGS. 31A and 31C as a comprising a female threaded fitting, the first end interface 123 may comprise a male fitting or any other fitting to correspond with commonly available tap outlets.

The connector when connected to the tap outlet passes flow from the first end 121 to a second end 122.

The second end 122 may dispense flow from the tap outlet directly to a user. Alternatively, an attachment may be connected at the second end 122 by a second end interface 124 and the flow from the tap outlet is dispensed from the second and 122 to the attachment.

The attachment may be an attachment as herein described for providing an initial or a further treatment and/or substitution of flow. For example, the attachment may be a beverage preparation apparatus as herein described.

Preferably a plurality of attachments may be provided, each with an interface corresponding to the second end interface of the universal connector, such that a user may connect any of the plurality of attachments to the universal connector. Under such a configuration, a user may have a flow dispensed to them directly from the second end of the universal connector or from an attachment connected to the universal connector. Either way, the universal connector 120 remains attached to the tap outlet. Such a configuration may allow for a maximisation of user options at the liquid outlet while simplifying the operation of the system for the user.

Such a configuration may also allow for the use of future attachments, such as to provide a different treatment and/or substitution of fluid flow with the same existing plumbing system.

The second end interface with an attachment is preferably in the form of a quick-release attachment. This may take the form of any commonly available connection, such as but not limited to a threaded connection, a bayonet connection, or a snap-fit connection.

Seen in FIGS. 31B and 31C, the second end interface 124 comprises a threaded interface. As in relation to the first end interface 123, the second end interface 124 may be in a female threaded interface format as shown, or may be in a male threaded interface format as required.

The universal connector 120 may comprise at least one sensor for sensing a type or identifier of an attachment which is connected at the second end interface 124. For example, the universal connector 120 may sense a physical feature of the attachment, or may read information encoded in or on the attachment, such as electronic information by a RFID chip, a Hall Sensor, or visually encoded information such as a barcode.

For example, in the cross section of FIG. 31C a sensor 125 is shown for wirelessly reading an information of the attachment.

While the universal connector 120 may be for use independent of any other aspect described herein, in some embodiments it is contemplated that a universal connector 120 may be used in combination with a liquid control apparatus 8 as described herein.

In a configuration where the universal connector 120 is for use on a tap outlet of a plumbing system incorporating a liquid control apparatus 8, information sensed by the at least one sensor of the connector may be transmitted to the liquid control apparatus. This information may be used in the control of the functionality of the liquid control apparatus.

The at least one sensor of the universal connector 120 may also or instead sense one or more inputs from a user. For example, the universal connector may comprise a proximity sensor, such as an infrared sensor or a capacitive touch sensor. These sensors may be able to read a proximity of a user, and either directly use this information to effect some operation of the universal connector any connected attachment, or communicate this information to a liquid control apparatus to effect some operation of the liquid control apparatus.

Or, the universal connector may comprise any other form of commonly available sensor for receiving an input from a user.

For example, it may be desirable that the operation of the liquid apparatus in general or to provide a particular treatment such as a boiling water treatment is only to occur under direct user supervision. To this end, a proximity sensor at the universal connector 120 may determine if a user is within a required proximity, and only upon the sensing of the required proximity will the liquid control apparatus provide the boiling water stream.

Such a proximity may be within a distance to indicate that a user is supervising the dispensing, or may be such as to indicate direct contact by a user with the sensor or another part of the universal connector, tap, or attachment.

As a further example, a sensor of the universal connector may be able to receive a user input to control the treatment and/or substitution of a liquid flow. For example the universal connector may comprise a sensor such as previously described in relation to FIGS. 28A-H, to control some aspect of the operation of the universal connector, any associated attachment, and any liquid control apparatus in order to control the delivery of a fluid to a user, including the treatment and/or substitution of a fluid flow.

A communication that the attachment connected to the universal connector 120 is a beverage preparation attachment 70 as herein described may operate the liquid control apparatus 8 in particular ways. If a beverage preparation attachment 70 is connected at the universal connector 120 the liquid control apparatus may disregard some predetermined flow characteristics or only allow certain predetermined flow characteristics to operate the apparatus.

For example, if a beverage preparation attachment 70 is connected at the universal connector 120 any flow other than a flow associated with the preparation of that beverage may be prevented. For example where the beverage to be prepared is an espresso coffee, the liquid control apparatus 8 may ignore any activation other than to provide the high-pressure and low-flow heated water flow associated with the preparation of that beverage.

Such control by the of the liquid control apparatus 8 of its functionality dependent on the presence and/or nature of a connected attachment at the universal connector 120 may provide for improved safety for a user.

For example, if an attachment is not present or is removed, the liquid control apparatus 8 may prevent or stop the provision of a high-pressure heated water flow, a flow of steam from a boiler, or any other flow which may harm a user.

In addition to operating dependent on a sensed presence and/or nature of an attachment, the liquid control apparatus 8 may operate dependent on one or more sensed states of an attachment.

For example, where the attachment is a beverage preparation attachment 70, the operation of the liquid control apparatus 8 to provide a heated and pressurised water flow to brew an espresso from a consumable 69 may be dependent on either or both of a sensed operation of the attachment 70 to a closed condition and the sensing of the presence of a consumable 69 within the receptacle 71.

The sensing of such information may be carried out by the attachment itself, such as the beverage preparation attachment 70. This sensed information, or information derivative of it, may be transmitted to the liquid control apparatus 8 by the attachment.

Alternatively, the information be transmitted to the universal connector 120, which then transmits the information to the liquid control apparatus 8.

In either configuration, the transmission may be either wired or wireless. For example, the second end interface 124 may comprise a data connection for receiving sensed information from the attachment. Or, the universal connector 120 may receive this information wirelessly from the attachment, such as by NFC.

Alternatively, the attachment may transmit sensed information wirelessly either to the universal connector 120 or directly to the liquid control apparatus 8.

The universal connector 120 may similarly transmit information by wire or wirelessly with the liquid control apparatus 8.

In a preferred form, the universal connector 120 receives low-power transmissions from any sensors of the attachment, and re-broadcasts wirelessly this information and any information from the one or more sensors of the universal connector 120 to the liquid control apparatus 8.

By this configuration of wireless communication between the universal connector 120 and the liquid control apparatus 8 the system may integrate with an existing plumbing system with a minimum of modifications to it. For example, no wired connection would need to be provided between an under-bench liquid control apparatus 8 and the at-tap universal connector 120.

In a preferred form, any sensors of an attachment may be powered either by direct connection to the universal connector or wirelessly from it. To this end, the universal connector 120 may comprise an internal power source, such as a battery. This battery may be user-replaceable. Alternatively, it may be able to be recharged by a flow of liquid passing through the universal connector 120.

Any communication of information from a sensor to another component of a system as described herein may utilise any commonly available protocols of data transfer or encoding. For example, where information is to be communicated from a universal connector 120 or attachment to an under-bench liquid control apparatus 8 the information may be communicated wirelessly using WiFi, Bluetooth including Bluetooth low energy (BLE), by near field communication (NFC).

Figure 32:
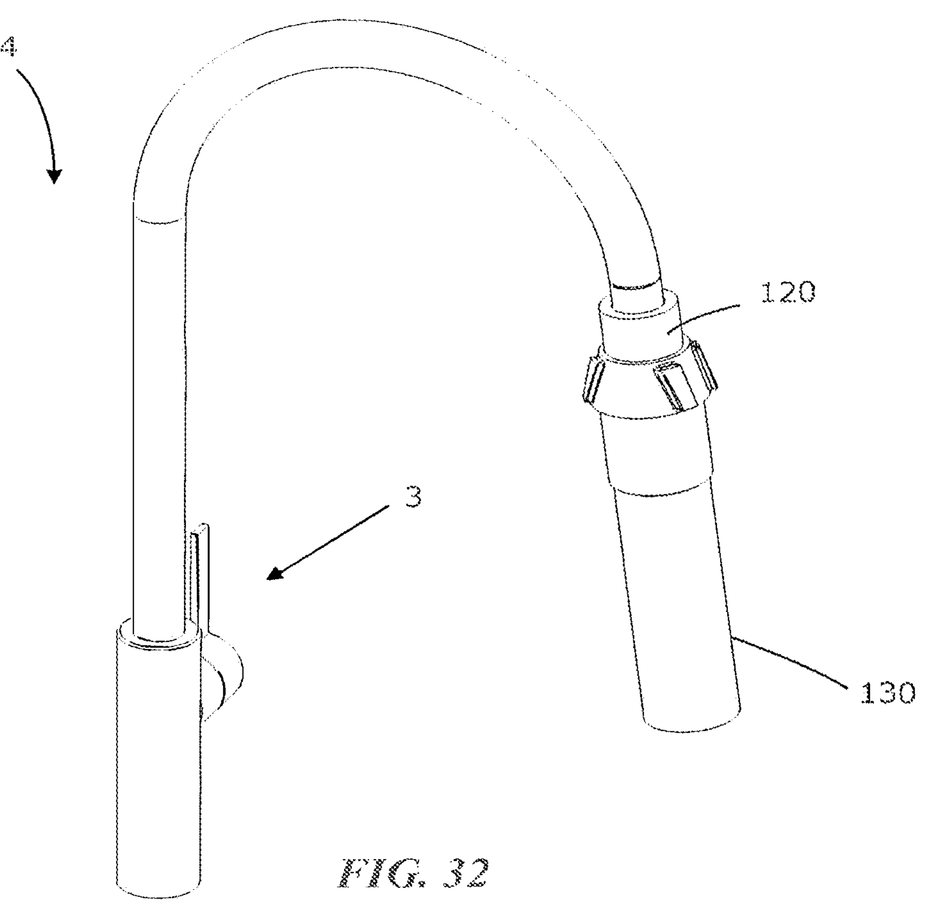
FIG. 32 shows a tap with an associated universal connector and an attachment.

FIG. 32 shows a view of a tap 4 having a mixer 3, and a universal connector 120 attached to an outlet of the tap 4. Connected to the second end 122 of the universal connector 120 is an attachment 130.

The attachment 130 may be a beverage preparation attachment 70 as herein described. Alternatively, the attachment 130 may be any attachment capable of providing a treatment and/or substitution of flow as described herein.

Figures 34, 35:
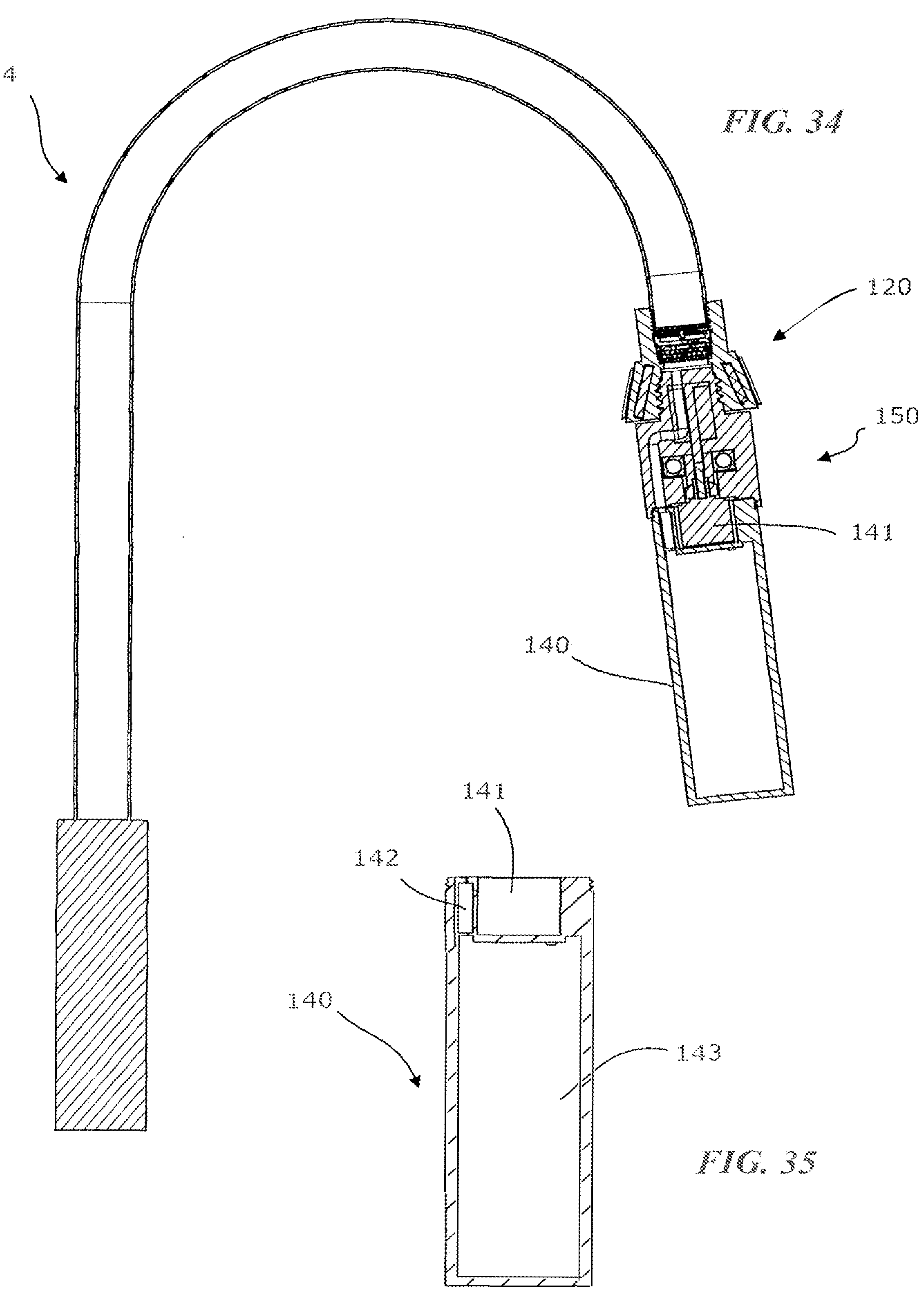
FIG. 34 shows a cross-sectional view of a tap with a universal connector, a selective diverter, and an attachment.
FIG. 35 shows a cross-sectional view of an attachment.

An alternative form of such an attachment 130 is seen in FIGS. 34 and 35 as a beverage preparation attachment 140. The beverage preparation attachment 140 is for example brewing a coffee or a tea. It has a receptacle 141 for receiving a consumable such as coffee grounds. Water can be forced through the consumable, and into the container 143 as a brewed beverage.

The beverage preparation attachment 140 also has a secondary pathway 142 by which fluid may enter the container 143 but bypass the consumable 69. This will be described in further detail presently, but may for example allow the introduction of hot water to a short black espresso in order to produce a long black.

This beverage preparation attachment 140 is shown connected to the universal connector 120 and tap 4 in FIG. 23. Any other attachment such as the beverage preparation attachment 70 may be connected to the universal connector 120 and tap 4 in a similar manner.

Also shown in FIG. 34, connected intermediate of the attachment 70 and universal connector 120, is a selective diverter 150. Further details of the selective diverter 150 are shown in FIG. 33.

The selective diverter 150 takes a single inlet 151 from the universal connector 120, then passes is able to selectively divert this input to one or more outlets.

Figure 33:
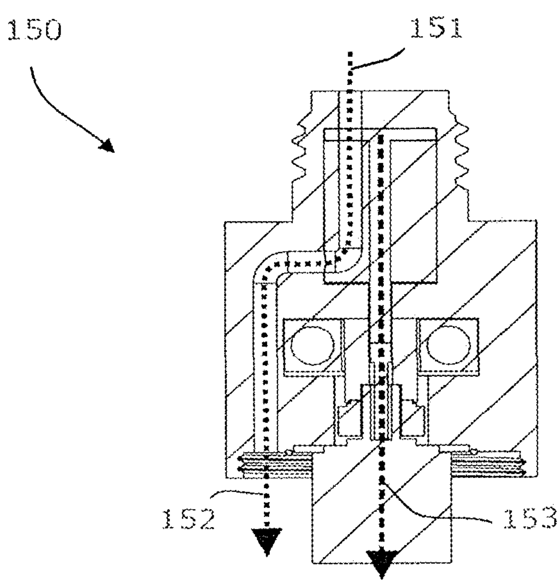
FIG. 33 shows a cross-sectional view of a selective diverter.

For example, in FIG. 33, the selective diverter 150 takes flow through inlet 151 and is operable to direct flow from the inlet 151 to either of a first outlet 152 or a second outlet 153.

This functionality may be desirable such as for providing a long black from a short black espresso shot as previously described. Hot pressurised water may first be passed from the second outlet 153 which is aligned with the receptacle 71 and consumable 69 of the attachment. This will brew the espresso coffee.

If the user desires a longer shot, further hot water may be passed through the consumable 69. However this is undesirable, as it may over-draw the shot and cause the taste of the beverage to be tainted. In this situation, the selective diverter 150 may be operated to direct the inlet 151 to outlet from the first outlet 152, which bypasses the consumable 69.

This configuration may also be desirable for the provision of any other number of beverages. For example, where a liquid control apparatus 8 is operable to provide a heated milk stream, this heated milk may similarly be directed through the second outlet 152. Or, in the example of the dispensing of an iced beverage such as an iced coffee, a chilled water stream may be dispensed through the second outlet 152.

The operation of the selective diverter 150 between various outlets may be provided by the selective diverter itself. For example, the selective diverter 150 may be powered, or powered by a connection to the universal connector 120, and thus operable to switch between different outlets responsive to a user input or an input from the liquid control apparatus 8.

Alternatively, the switching between different outlets may be provided manually by a user. For example, the user may twist a part of the selective diverter 150 to align the inlet 150 with one or more outlets.

In other configurations, at least part of the described functionality of the selective diverter 150 may be integrated with the universal connector 120. For example, the universal connector 120 may have a plurality of outlets to align with a plurality of inlets of an attachment. The universal connector 120 may then be operable either by a user manually or in a powered manner to direct the flow from the tap outlet to one or more of these outlets of the universal connector 120.

By such a configuration the described functionality of the selective diverter 150 may be provided but inline in the universal connector 150 and without a separate selective diverter 150.

While the foregoing provides examples of the use of a universal connector 120 with a liquid control apparatus 8, configurations are contemplated where the universal connector 120 is used solely with an attachment 130 on a tap 4 in order to provide a desired treatment and/or substitution.

When not associated with an attachment, the universal attachment 120 may provide for some other treatment to the liquid flowing through it. For example, the universal attachment 120 may comprise an aerator for aerating a water flow to be dispensed to a user.

Methods of use of a liquid control apparatus 8 and/or an attachment such as the attachment 70, 130, or 140 may also include the use of a universal connector 120. These methods may include methods of brewing a beverage using a liquid control apparatus 8 and/or attachment 70.

As described herein, an attachment such as an attachment 70 may be connected to the tap 4 by the universal connector 120, which is located as an intermediary between the outlet of the tap 4 and the attachment.

Under such a configuration, the methods may be dependent on other sensed or inputted information, in addition to or in place of sensing of a predetermined flow characteristic. For example, the methods may be dependent on information sensed by the at least one sensor of the universal connector 120, where the universal connector 120 comprises such sensors. In addition or alternatively, the methods may be dependent on a condition, type, or other characteristic of an attachment. Such characteristics may be sensed at the attachment or universal connector 120 as described previously, or alternatively may be sensed by some other component such as by a liquid control apparatus 8. Regardless of how information of such characteristics is sensed or communicated between various components, it may be incorporated in the methods of control or use.

For example, a plumbed system may incorporate a liquid control apparatus 8 installed in-line under the bench and a universal connector 120 connected above bench at the tap outlet. As described, an activation of the liquid control apparatus to provide a desired treatment and/or substitution is dependent on a sensed predetermined flow characteristic of at least one of the water lines. For example, the user turns a mixer connected to the two lines to a cold-only position, then in succession switches the mixer between an off state and an on state twice. This may be the predetermined flow characteristic associated with a dispensing of a drip coffee.

When used in combination with a universal connector 120, the activation of the liquid control apparatus to provide the associated pressurised and heated water flow may be dependent on a sensed connection to the universal connector 120 of the appropriate attachment. For example, such an attachment may be an attachment 140 of FIG. 35 which has a receptacle 141 for containing the consumable coffee and a container 143 for receiving the brewed beverage.

In addition to the sensed presence of a particular attachment or attachment having particular characteristics, the operation of the liquid control apparatus 8 may also be dependent on a sensed state of the attachment or universal connector.

For example, in the case of the attachment 140, the provision of the pressurised and heated water flow may additionally be dependent on the sensed presence of a consumable 69, such as in a pod or capsule, within the receptacle 141.

Or as a further example, where a selective diverter 150 is provided or the universal connector 120 comprises the function of a selective diverter 150 as previously described, the provision of the liquid may also be dependent on the operation of the selective diverter to the desired output.

In the case of the assembly of FIG. 34 and with reference to FIG. 33, this could require initially that the selective diverter 150 is operated to direct flow through the receptacle 141 by the second outlet 153 in order for the required heated and pressurised water flow to be provided, then subsequently that the selective diverter 150 is operated to direct flow through the first outlet 152 in order to provide a subsequent heated water flow such as for a long black coffee and/or a treated milk flow such as for a white coffee.

While examples have been described of the interaction of sensed values of the universal connector 120 and/or attachments in the provision of a treated and/or substituted flow by a liquid control apparatus 8, it will be appreciated that such sensed values may extend to any number of other uses in the operation of a universal connector 120 and attachment, either alone or in combination with a liquid control apparatus 8.

A sensed value such as the presence of an attachment in connection to the second end 122 of the universal connector 120 may be used to terminate the provision of a fluid flow if it is sensed that the attachment is removed. For example, were a pressurised and heated water flow being provided to a beverage preparation attachment, the disconnection of that attachment from the universal connector may terminate the water flow.

A sensed value such as the direction of flow to a second outlet 153 or a first outlet 152 may also terminate a flow, or terminate a flow and initiate a different flow. For example, in the assembly of FIG. 34 a high pressure and heated water flow may be provided when it is sensed that flow is directed to the second outlet 153 for brewing the beverage, then this flow may be changed to a relatively lower pressure heated water flow or a milk flow when it is sensed that flow is directed to the first outlet 152.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

What is claimed is:

1. A liquid control apparatus for selectively treating a liquid flow from at least one of a plurality of supply lines, the liquid flow for dispensing to a user by way of a liquid supply fixture, the apparatus comprising:

a liquid conditioning module for connection in-line with at least one of the plurality of supply lines, the liquid conditioning module receiving a diverted liquid flow of the at least one supply line from an upstream portion of the supply line and outputting a selectively treated liquid flow for returning to a downstream portion of the supply line for dispensing to the user;

at least one flow sensor, each flow sensor associated with one of the plurality of supply lines;

a controller, the controller configured:

a) to receive information indicative of the liquid flow of at least one of the plurality of supply lines from the at least one flow sensor, and b) upon the sensing of a predetermined flow characteristic, to activate the liquid conditioning module to treat the liquid flow from one or more of the liquid conditioning module connected supply lines in order to provide a treated liquid flow at the liquid supply fixture;

wherein the plurality of supply lines comprise a first supply line and a second supply line, and the at least one flow sensor comprises a first flow sensor associated with the first supply line and a second flow sensor associated with the second supply line, and wherein the predetermined flow characteristic of the flow sensors comprises one or more simultaneous or sequential combinations of:

a) a sensed constant flow of at least the first flow sensor or the second flow sensor, including a constant substantially zero flow and a constant substantially maximum flow, b) a sensed fluctuation of flow of at least one flow sensor, or c) a sensed pattern of fluctuations of flow of at least one sensor; and wherein the pattern of fluctuations of flow comprises one or more fluctuations from a substantially zero flow condition to a non-zero flow condition and a return to a substantially zero flow condition.

2. The liquid control apparatus of claim 1, wherein the diverting of the liquid flow of the at least one supply line to which the liquid conditioning module is connected in-line comprises a selective diversion, such that the liquid flow may be selectively directed either:

a) to the liquid conditioning module for subsequent passing to a downstream portion of the supply line for dispensing to a user upon the sensing of the predetermined flow characteristic, or otherwise b) directly to the downstream portion of the supply line for dispensing to a user.

3. The liquid control apparatus of claim 1, wherein the liquid control apparatus is programmable such that the predetermined flow characteristic may be programmed by a user.

4. The liquid control apparatus of claim 1, wherein the liquid control module comprises connection ports for connection to at least a liquid control module expansion unit to provide additional selective modification to the liquid flow of liquid delivered from the plurality of supply lines.

5. The liquid control apparatus of claim 1, further comprising an attachment for retaining one or more consumables to be used in the further treatment of the liquid flow, the attachment for fluid connection with an outlet of the liquid supply fixture.

6. The liquid control apparatus of claim 1, wherein the liquid supply fixture comprises a flow controller by which a user may control the dispensed flow of the plurality of supply lines, and wherein the predetermined flow characteristic is created by a user operation of the flow controller.

7. A liquid control apparatus for selectively treating a liquid flow from at least one of a plurality of supply lines, the liquid flow for dispensing to a user by way of a liquid supply fixture, the apparatus comprising:

a liquid conditioning module for connection in-line with at least one of the plurality of supply lines, the liquid conditioning module receiving a diverted liquid flow of the at least one supply line from an upstream portion of the supply line and outputting a selectively treated liquid flow for returning to a downstream portion of the supply line for dispensing to the user;

at least one flow sensor, each flow sensor associated with one of the plurality of supply lines;

a controller, the controller configured:

a) to receive information indicative of the liquid flow of at least one of the plurality of supply lines from the at least one flow sensor, and b) upon the sensing of a predetermined flow characteristic, to activate the liquid conditioning module to treat the liquid flow from one or more of the liquid conditioning module connected supply lines in order to provide a treated liquid flow at the liquid supply fixture;

wherein the plurality of supply lines comprise a first supply line and a second supply line, and the at least one flow sensor comprises a first flow sensor associated with the first supply line and a second flow sensor associated with the second supply line, and wherein the predetermined flow characteristic of the flow sensors comprises one or more simultaneous or sequential combinations of:

a) a sensed constant flow of at least the first flow sensor or the second flow sensor, including a constant substantially zero flow and a constant substantially maximum flow, b) a sensed fluctuation of flow of at least one flow sensor, or c) a sensed pattern of fluctuations of flow of at least one sensor; and wherein the controller operates the liquid conditioning module to treat the liquid flow upon the sensing of a pattern of fluctuations of one of the first flow sensor and second flow sensor and a concurrent sensing of a substantially zero flow condition of the other of the first flow sensor and second flow sensor.

8. The liquid control apparatus of claim 7, wherein the diverting of the liquid flow of the at least one supply line to which the liquid conditioning module is connected in-line comprises a selective diversion, such that the liquid flow may be selectively directed either:

a) to the liquid conditioning module for subsequent passing to a downstream portion of the supply line for dispensing to a user upon the sensing of the predetermined flow characteristic, or otherwise b) directly to the downstream portion of the supply line for dispensing to a user.

9. The liquid control apparatus of claim 7, wherein the liquid control apparatus is programmable such that the predetermined flow characteristic may be programmed by a user.

10. The liquid control apparatus of claim 7, wherein the liquid control module comprises connection ports for connection to at least a liquid control module expansion unit to provide additional selective modification to the liquid flow of liquid delivered from the plurality of supply lines.

11. The liquid control apparatus of claim 7, further comprising an attachment for retaining one or more consumables to be used in the further treatment of the liquid flow, the attachment for fluid connection with an outlet of the liquid supply fixture.

12. The liquid control apparatus of claim 7, wherein the liquid supply fixture comprises a flow controller by which a user may control the dispensed flow of the plurality of supply lines, and wherein the predetermined flow characteristic is created by a user operation of the flow controller.

13. A liquid control apparatus for selectively treating a liquid flow from at least one of a plurality of supply lines, the liquid flow for dispensing to a user by way of a liquid supply fixture, the apparatus comprising:

a liquid conditioning module for connection in-line with at least one of the plurality of supply lines, the liquid conditioning module receiving a diverted liquid flow of the at least one supply line from an upstream portion of the supply line and outputting a selectively treated liquid flow for returning to a downstream portion of the supply line for dispensing to the user;

at least one flow sensor, each flow sensor associated with one of the plurality of supply lines;

a controller, the controller configured:

a) to receive information indicative of the liquid flow of at least one of the plurality of supply lines from the at least one flow sensor, and b) upon the sensing of a predetermined flow characteristic, to activate the liquid conditioning module to treat the liquid flow from one or more of the liquid conditioning module connected supply lines in order to provide a treated liquid flow at the liquid supply fixture; and wherein there are a plurality of predetermined flow characteristics, each predetermined flow characteristic comprising a different number of sensed fluctuations between a substantially zero flow, a substantially maximum flow, and return to the substantially zero flow of one of the liquid supply lines, and wherein each of the plurality of predetermined flow characteristics is associated with the provision of a different predetermined selective treatment by the liquid control apparatus.

14. The liquid control apparatus of claim 13, wherein the plurality of supply lines comprise a first supply line and a second supply line, and the at least one flow sensor comprises a first flow sensor associated with the first supply line and a second flow sensor associated with the second supply line, and wherein the predetermined flow characteristic of the flow sensors comprises one or more simultaneous or sequential combinations of:

a) a sensed constant flow of at least the first flow sensor or the second flow sensor, including a constant substantially zero flow and a constant substantially maximum flow, b) a sensed fluctuation of flow of at least one flow sensor, or c) a sensed pattern of fluctuations of flow of at least one sensor.

15. The liquid control apparatus of claim 13, wherein the diverting of the liquid flow of the at least one supply line to which the liquid conditioning module is connected in-line comprises a selective diversion, such that the liquid flow may be selectively directed either:

a) to the liquid conditioning module for subsequent passing to a downstream portion of the supply line for dispensing to a user upon the sensing of the predetermined flow characteristic, or otherwise b) directly to the downstream portion of the supply line for dispensing to a user.

16. The liquid control apparatus of claim 13, wherein the liquid control apparatus is programmable such that the predetermined flow characteristic may be programmed by a user.

17. The liquid control apparatus of claim 13, wherein the liquid control module comprises connection ports for connection to at least a liquid control module expansion unit to provide additional selective modification to the ducted flow of liquid delivered from the plurality of supply lines.

18. The liquid control apparatus of claim 13, further comprising an attachment for retaining one or more consumables to be used in the further treatment of the liquid flow, the attachment for fluid connection with an outlet of the liquid supply fixture.

19. The liquid control apparatus of claim 13, wherein the liquid supply fixture comprises a flow controller by which a user may control the dispensed flow of the plurality of supply lines, and wherein the predetermined flow characteristic is created by a user operation of the flow controller.

* * * * *